(12) United States Patent
Saida et al.

(10) Patent No.: US 7,856,163 B2
(45) Date of Patent: Dec. 21, 2010

(54) PLANAR LIGHTWAVE CIRCUIT, DESIGN METHOD FOR WAVE PROPAGATION CIRCUIT, AND COMPUTER PROGRAM

(75) Inventors: Takashi Saida, Sagamihara (JP); Yohei Sakamaki, Atsugi (JP); Toshikazu Hashimoto, Yamato (JP); Tsutomu Kitoh, Atsugi (JP); Hiroshi Takahashi, Atsugi (JP); Masahiro Yanagisawa, Mito (JP); Senichi Suzuki, Mito (JP); Yasuhiro Hida, Atsugi (JP); Motohaya Ishii, Atsugi (JP); Munehisa Tamura, Matsudo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 461 days.

(21) Appl. No.: 10/587,446

(22) PCT Filed: Aug. 1, 2005

(86) PCT No.: PCT/JP2005/014010

§ 371 (c)(1),
(2), (4) Date: Jul. 16, 2008

(87) PCT Pub. No.: WO2006/013805

PCT Pub. Date: Feb. 9, 2006

(65) Prior Publication Data

US 2008/0273829 A1 Nov. 6, 2008

(30) Foreign Application Priority Data

| Aug. 2, 2004 | (JP) | ............................ 2004-226086 |
| Sep. 7, 2004 | (JP) | ............................ 2004-260193 |
| Sep. 15, 2004 | (JP) | ............................ 2004-269029 |
| Jan. 28, 2005 | (JP) | ............................ 2005-021742 |

(51) Int. Cl.
*G02B 6/10* (2006.01)

(52) U.S. Cl. ........................... 385/129; 385/15; 385/43; 385/50; 385/130; 385/131; 385/132

(58) Field of Classification Search ................... 385/15, 385/43, 50, 129–132
See application file for complete search history.

(56) References Cited

U.S. PATENT DOCUMENTS 4,415,227 A * 11/1983 Unger .......................... 385/43

(Continued)

FOREIGN PATENT DOCUMENTS

JP  62-017708  1/1987

(Continued)

OTHER PUBLICATIONS

Z. Weissman et al., *Analysis of Periodically Segmented Waveguide Mode Expanders*, Journal of Lightwave Technology, vol. 13, No. 10, Oct. 1995, pp. 2053-2058.

(Continued)

*Primary Examiner*—Brian M. Healy
*Assistant Examiner*—Guy G Anderson
(74) *Attorney, Agent, or Firm*—Workman Nydegger

(57) ABSTRACT

A planar lightwave circuit is provided which can be easily fabricated by an existing planar-lightwave-circuit fabrication process, which can lower the propagation loss of signal light and which can convert inputted signal light so as to derive desired signal light. A planar lightwave circuit having a core and a clad which are formed on a substrate, has input optical waveguide(s) (111) which inputs signal light, mode coupling part (112) for coupling a fundamental mode of the inputted signal light to a higher-order mode and/or a radiation mode, or mode re-coupling part (113) for re-coupling the higher-order mode and/or the radiation mode to the fundamental mode, and output optical waveguide(s) (114) which outputs signal light. The mode coupling part or the mode re-coupling part is an optical waveguide which has core width and/or height varied continuously.

13 Claims, 44 Drawing Sheets

U.S. PATENT DOCUMENTS

| | | | |
|---|---|---|---|
| 5,327,928 A | | 7/1994 | Thomason |
| 5,577,141 A | * | 11/1996 | Adar et al. .................... 385/43 |
| 5,930,437 A | * | 7/1999 | Nakai et al. ................. 385/129 |
| 6,236,784 B1 | * | 5/2001 | Ido ............................. 385/45 |
| 6,768,855 B1 | * | 7/2004 | Bakke et al. ................ 385/129 |
| 6,778,737 B2 | * | 8/2004 | Shimoda ...................... 385/43 |
| 6,782,149 B2 | * | 8/2004 | Ridgway et al. .............. 385/11 |
| 6,925,228 B2 | * | 8/2005 | Kamei et al. .................. 385/37 |
| 6,957,006 B2 | * | 10/2005 | Terakawa et al. ........... 385/146 |
| 7,397,977 B2 | | 7/2008 | Hashimoto et al. |

FOREIGN PATENT DOCUMENTS

| | | |
|---|---|---|
| JP | 02-126205 | 5/1990 |
| JP | 05-060929 | 3/1993 |
| JP | 09-297228 | 11/1997 |
| JP | 10-090537 | 4/1998 |
| JP | 11-133253 | 5/1999 |
| JP | 2002-90561 | 3/2002 |
| WO | WO 2004/059354 | 7/2004 |

OTHER PUBLICATIONS

Michael M. Spuhler et al., *A Very Short Planar Silica Spot-Size Converter Using a Nonperiodic Segmented Waveguide*, Journal of Lightwave Technology, vol. 16, No. 9, Sep. 1998, pp. 1680-1685.

Katsunari Okamoto, *Fundamentals of Optical Waveguides*, Academic Press, 2000, pp. 294-303.

B. Plaun et al., *Optimization of Waveguide Bends and Bent Mode Converters Using a Genetic Algorithm*, 25th International Conference on Infrared and Millimeter Waves (IRMMW2000), Sep. 12-15, 2000.

Office Action dated Sep. 11, 2009 from related Japanese application No. 200810130022.4.

* cited by examiner

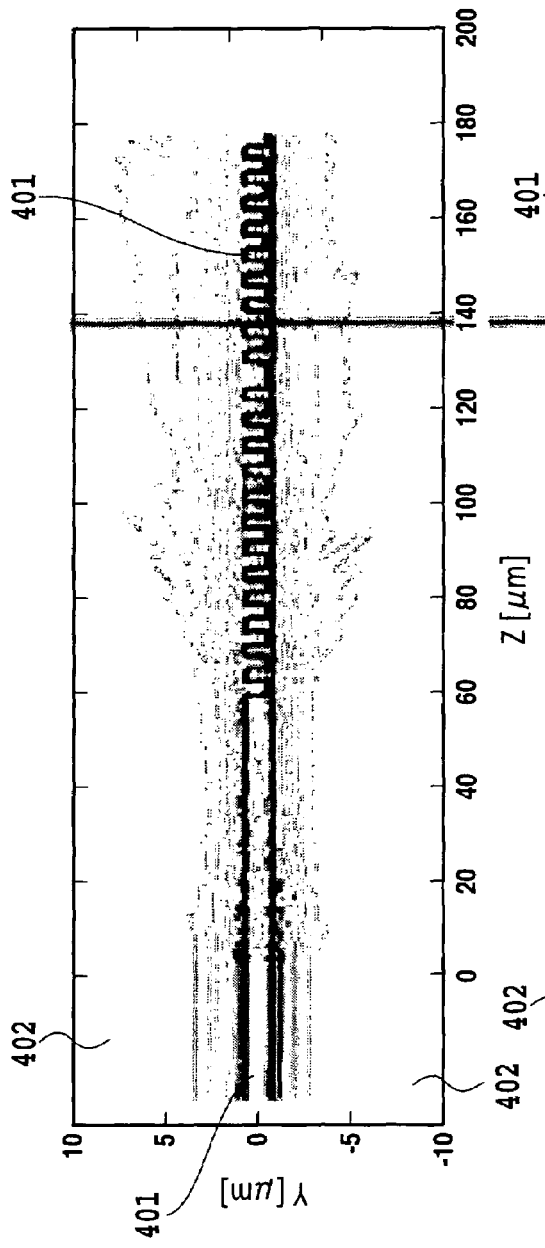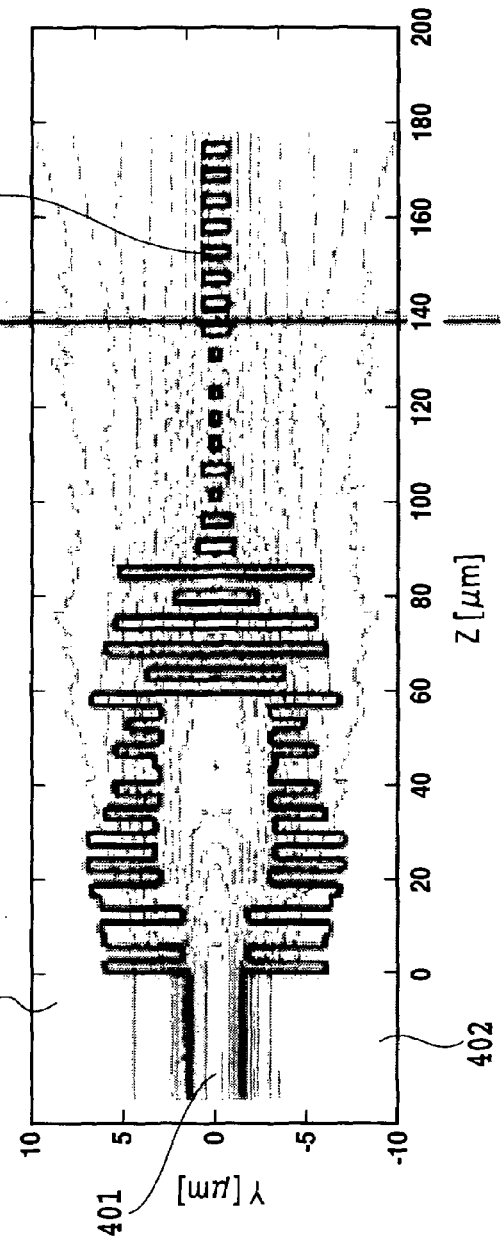
FIG. 44A
FIG. 44B

PLANAR LIGHTWAVE CIRCUIT, DESIGN METHOD FOR WAVE PROPAGATION CIRCUIT, AND COMPUTER PROGRAM

TECHNICAL FIELD

The present invention relates to a planar lightwave circuit for converting inputted signal light and deriving desired signal light, a design method for optimizing a wave propagation circuit, and a computer program for executing the design method.

BACKGROUND ART

With the still larger capacity and higher speed of an optical communication system, it has become more important to provide an optical device which carries out advanced functions at a low price. Since a lightwave circuit fabricated on a planar substrate is highly versatile in design and is excellent in mass-producibility and stability, it can provide the optical device meeting the requirement, and researches and developments have therefore been made worldwidely.

Examples of prior-art planar lightwave circuits are shown in FIGS. 40 through 42. The planar circuit shown in FIG. 40 is configured of an input optical waveguide 171, and an output optical waveguide 172 which is optically coupled to the input optical waveguide 171 (refer to, for example, Patent Document 1). The planar lightwave circuit shown in FIG. 40 has the output optical waveguide 172 designed in a parabolic shape, thereby to be endowed with the function of adjusting the field distribution of output signal light.

With the design technique, however, only the fundamental mode of input signal light and the second-order mode coupled thereto can be handled, so that a characteristic as a lens for adjusting the field distribution of the signal light has been inferior. Also, there has occurred the problem that the size of the planar lightwave circuit becomes large on account of a configuration which gradually generates the second-order mode.

Besides, there has been known a planar lightwave circuit which is endowed with a spot-size conversion function by a configuration wherein an optical waveguide of taper shape and its connection part with an optical fiber are periodically divided (refer to, for example, Non-patent Document 1).

Since, however, the optical waveguide propagating a light signal is periodically segmented, there is the problem that the reflection of signal light at each segmented surface is inevitable, and the planar lightwave circuit has had the drawback that it cannot be applied to any other use than a spot size converter.

Besides, there has been known a planar lightwave circuit which is endowed with a spot-size conversion function by a configuration wherein the width of an optical waveguide repeats increases and decreases aperiodically (refer to, for example, Non-patent Document 2).

However, the optical waveguide width repeats abrupt increases and decreases along the propagation direction of signal light, and hence, there has been the problem that the fabrication of the planar lightwave circuit is very difficult.

Shown in FIG. 41 is the configuration of a lightwave circuit including a prior-art cross waveguide. The cross waveguide is indispensable as one of basic constituents in the lightwave circuit. The lightwave circuit 260 shown in FIG. 41 includes two input optical waveguides 261, two output optical waveguides 264, and an optical-waveguide crossing portion 265 being a waveguide overlap portion which couples the two input optical waveguides 261 and the two output optical waveguides 264, respectively. The crossing angle 266 between the input optical waveguide 261 and the output optical waveguide 264 needs to be narrowed for attaining reduction in the size of an optical device. However, as the crossing angle 266 is made narrower, an optical coupling loss in the optical-waveguide crossing portion 265 increases more, to pose the problem that a crosstalk characteristic degrades more.

There has been known a cross waveguide which lowers an optical coupling loss in an optical-waveguide crossing portion in such a way that a spot size in the optical-waveguide crossing portion is made larger than a spot size in the optical waveguide outside the optical-waveguide crossing portion by making the width of the optical waveguide of the optical-waveguide crossing portion smaller than the width of the optical waveguide outside the optical-waveguide crossing portion (refer to, for example, Patent Document 2). Even in the structure of such a cross waveguide, however, there has been the problem that the effect of sufficiently lowering the optical coupling loss cannot be attained in a case where a crossing angle is smaller than 30°.

FIG. 42 shows the structural example of a prior-art optical branch circuit. With the expansion of the application fields of optical communication systems, the importance of planar lightwave circuits for branching, multiplexing/demultiplexing and switching signal light(s) has risen more and more. Especially, the optical branch circuit for branching or multiplexing the signal light(s) is indispensable as one of basic constituents in the lightwave circuit.

The optical branch circuit shown in FIG. 42 is configured of an input optical waveguide 371, an optical-waveguide branching portion 372, branched optical waveguides 373a and 373b, and output optical waveguides 374a and 374b (refer to, for example, Non-patent Document 3). The signal light inputted to the input optical waveguide 371 is branched by the optical-waveguide branching portion 372 as well as the branched optical waveguides 373a and 373b, so as to be led to the output optical waveguides 374a and 374b. The optical branch circuit as shown in FIG. 42 is also called the "Y-branch circuit" because of its shape.

As stated above, with the rapid spread of the optical communication systems, the importance of the lightwave circuit for branching an optical signal, switching optical paths, or multiplexing/demultiplexing optical signals/an optical signal every wavelength has increased. For building and providing an optical communication system of high performance, it is indispensable to design and realize a lightwave circuit of high performance.

The lightwave circuit can be designed by combining individual lightwave circuit elements such as a channel optical waveguide, a taper optical waveguide and an optical slab waveguide. However, when such a design method is employed, it is impossible to create a function which cannot be realized by the combination of the prior-art lightwave circuit elements, for example, a spot size converter of very small length. In such a case, the design of the lightwave circuit has heretofore been carried out by employing an optimization technique of cut-and-try type, such as genetic algorithm.

FIG. 43 is a chart representing a design method for a lightwave circuit as is based on a prior-art genetic algorithm (refer to, for example, Non-patent Document 4).

The prior-art algorithm in FIG. 43 includes the step 301 of giving the initial values of refractive index distributions, the step 302 of varying the refractive index distributions in accordance with the genetic algorithm, the step 303 of evaluating the varied refractive index distributions by actually propagating light, the step 304 of selecting favorable refractive index distributions, and the step 305 of judging if the obtained refractive index distributions satisfy desired characteristics. The algorithm first proceeds along the steps 301, 302, 303, 304 and 305, and when the desired characteristics are not obtained at the step 305, the steps 302 through 304 are iterated until the desired characteristics are obtained.

Here, at the step 302 of the prior-art algorithm, the refractive index distribution is altered in accordance with the genetic algorithm. Whether or not the alteration is a change in a better direction has not been known before the light is actually propagated at the step 305.

FIGS. 44A and B show a lightwave circuit (this example is a spot size converter) designed in accordance with the prior-art genetic algorithm (in, for example, Non-patent Document 2).

The lightwave circuit shown in FIGS. 44A and B has a structure in which a core 401 having a constant thickness is embedded in a clad layer 402.

When a light propagation direction is assumed to be along a z-axis, FIG. 44A is a drawing in which a refractive index distribution on a y-axis is observed from the direction of an x-axis, and FIG. 44B is a drawing in which a refractive index distribution on the x-axis is observed from the direction of the y-axis. In the prior-art lightwave circuit shown in FIGS. 44A and B, the optimization of the lightwave circuit is realized in such a way that, as shown in FIG. 44B, the refractive index distribution is divided into segments of constant lengths (3 μm in this example) in the z-axial direction, whereupon the x-axial widths of the respective segments are adjusted in accordance with the genetic algorithm.

Patent Document 1: Japanese Patent Application Laid-open No. 9-297228 (FIG. 7)

Patent Document 2: Japanese Patent Application Laid-open No. 5-60929

Non-patent Document 1: Z. Waissman with one other, "Analysis of Periodically Segmented Waveguide Mode Expanders", Journal of Lightwave Technology, October 1995, Vol. 13, No. 10 (FIG. 1)

Non-patent Document 2: Michael M. Spuhler with four others, "A Very Short Planar Silica Spot-Size Converter Using a Nonperiodic Segmented Waveguide", Journal of Lightwave Technology, September 1998, Vol. 16, No. 9 (FIG. 1 and FIG. 2)

Non-patent Document 3: Katsunari Okamoto, "Fundamentals of Optical Waveguides", 2000 Academic Press (FIGS. 7 and 15)

Non-patent Document 4: B. Plaum with three others, "Optimization of waveguide bends and bent mode converters using a genetic algorithm", 25th International Conference on Infrared and Millimeter Waves (IRMMW2000), Sep. 12-15, 2000

DISCLOSURE OF THE INVENTION

Regarding the prior-art planar lightwave circuit which is designed with the propagation mode of the optical waveguide set at the fundamental mode as described in connection with FIG. 40, there has been the problem that a light field which can be realized is limited, and regarding the prior-art planar lightwave circuit whose function is realized by the segmentation of the optical waveguide, there has been the problem that the reflected light, etc. appear due to the abrupt variation of the waveguide width, so the lightwave circuit cannot be utilized as a transmission type device. These planar lightwave circuits have had the problem that very fine optical waveguides need to be realized, so the fabrications are very difficult.

Besides, the lightwave circuit which includes the prior-art cross waveguide as described in connection with FIG. 41 has had the problem that the optical coupling loss in the optical-waveguide crossing portion is heavy.

In the prior-art optical branch circuit described in connection with FIG. 42, a branching angle 375 needs to be widened for shortening the Y-branch circuit and reducing the size thereof. In a case where the branching angle 375 is wide, the branch circuit becomes a structure in which the core width of the optical waveguide is abruptly expanded in the optical-waveguide branching portion 372. On this occasion, the higher-order mode of the signal light is excited in the optical-waveguide branching portion 372, resulting in the problem that the optical coupling loss of the signal light enlarges.

Also, there has been the drawback that the branching ratio of the signal light deviates from a desired design value and becomes unstable due to the appearance of the higher-order mode mentioned above. For these reasons, there has been a limit to further reduction in the size of the optical branch circuit. Besides, the prior-art optical branch circuit has had the drawback that, also in a case where the first-order mode mixes in the signal light, in addition to the fundamental mode, the actual branching ratio deviates from the desired design value, so the precision of the branching ratio degrades much.

In this manner, the prior-art optical branch circuit has had the problems that the optical coupling loss in the branching portion is heavy, and that the branching ratio is unstable.

According to one aspect of the present invention, there is provided an optical branch circuit of low loss and stable branching ratio as can be fabricated using the prior-art lightwave-circuit fabrication technique. Besides, according to one aspect of the invention, there is provided an optical branch circuit in which a branching angle is made wider than in the prior-art optical branch circuit and which has its size further reduced as a whole.

With the prior-art lightwave-circuit design method described in connection with FIGS. 44A and B, the cut-and-try type algorithm is employed, and it has therefore been necessary to input an input field to the lightwave circuit and evaluate an output field after the propagation each time the lightwave circuit is varied. In this manner, the prior-art lightwave-circuit design method has had the problem that the computations of wave propagations must be executed as to whether the refractive index of a certain part is to be increased or decreased, so a computing time period becomes very long.

Further, for the reason of the long computing time period, it has been very difficult to freely alter and study the lightwave circuit, with the prior-art lightwave-circuit design method.

In, for example, the prior-art lightwave circuit shown in FIGS. 44A and B, the refractive index distribution has been divided into the segments, and only the width in the x-axial direction has been varied (refer to, for example, Non-patent Document 2). The reason therefor has been that, unless such limitations are placed, the computing time period becomes too enormous to actually obtain a solution.

One aspect of the present invention consists in a planar lightwave circuit having a core and a clad which are formed on a substrate, characterized by comprising at least one input optical waveguide which inputs signal light; mode coupling means for coupling a fundamental mode which is part of the inputted signal light, to at least either of a higher-order mode and a radiation mode, or mode re-coupling means for re-coupling at least either of the higher-order mode and the radiation mode to the fundamental mode; and at least one output optical waveguide which outputs signal light; the mode coupling means or the mode re-coupling means being an optical waveguide which has at least one of a core width and height varied continuously.

According to the invention, there is provided a planar lightwave circuit which can be easily fabricated by an existing planar-lightwave-circuit fabrication process, in which the propagation loss of signal light is lowered, and which can convert the inputted signal light so as to derive desired signal light.

One aspect of the invention consists in a planar lightwave circuit including an optical waveguide lens which has a core and a clad formed on a substrate, characterized in that the optical waveguide lens comprises at least one input optical waveguide which inputs signal light; mode coupling means for coupling part of the inputted signal light to a higher-order mode and a radiation mode; mode re-coupling means for re-coupling the signal light coupled to the higher-order mode and the radiation mode by the mode coupling means, to output signal light; and at least one output optical waveguide for outputting the output signal light; the mode coupling means and the mode re-coupling means being optical waveguides each of which has at least one of a core width and height varied continuously.

According to the invention, there is provided a planar lightwave circuit including an optical waveguide lens, which can be easily fabricated by an existing planar-lightwave-circuit fabrication process and in which the propagation loss of signal light is lowered.

One aspect of the invention consists in a planar lightwave circuit including a cross waveguide in which at least two optical waveguides having a core and a clad formed on a substrate cross, characterized in that the cross waveguide comprises at least two input optical waveguides which input signal light; mode coupling means for coupling part of the inputted signal light to a higher-order mode and a radiation mode; mode re-coupling means for re-coupling the signal light coupled to the higher-order mode and the radiation mode by the mode coupling means, to output signal light; at least two output optical waveguides which output the output signal light, and an optical-waveguide crossing portion being a part at which two virtual optical waveguides rectilinearly extending from the input waveguides toward the output waveguides overlap; the mode coupling means and the mode re-coupling means being optical waveguides each of which has a core width varied continuously; the optical-waveguide crossing portion being such that a core width of an optical waveguide at a position between an end of the optical-waveguide crossing portion on a side of the input optical waveguides and a central part of the optical-waveguide crossing portion is greater than the core width of the optical waveguide at an end of the optical-waveguide crossing portion on the side of the input optical waveguides and the core width of the optical waveguide at the central part of the optical-waveguide crossing portion, and that the core width of the optical waveguide at a position between the central part of the optical-waveguide crossing portion and an end of the optical-waveguide crossing portion on a side of the output optical waveguides is greater than the core width of the optical waveguide at the central part of the optical-waveguide crossing portion and the core width of the optical waveguide at the end of the optical-waveguide crossing portion on the side of the output optical waveguides.

According to the invention, there is provided a planar lightwave circuit including a cross waveguide, which is of low loss and high crosstalk characteristic.

One aspect of the invention consists in a planar lightwave circuit including an optical branch circuit which has a core and a clad formed on a substrate, characterized in that the optical branch circuit comprises one input optical waveguide which inputs signal light; mode coupling means for coupling part of the inputted signal light to a higher-order mode and a radiation mode; mode re-coupling means for re-coupling the signal light coupled to the higher-order mode and the radiation mode by the mode coupling means, to output signal light; and at least two output optical waveguides which output the output signal light; the mode coupling means and the mode re-coupling means being optical waveguides each of which has a core width varied continuously.

According to the invention, there is provided a planar lightwave circuit including an optical branch circuit, which can be fabricated using a prior-art lightwave-circuit fabrication technique, and which is of low loss and stable branching ratio. Besides, according to one aspect of the invention, there is provided a planar lightwave circuit including an optical branch circuit, in which a branching angle is made larger than in a prior-art optical branch circuit, and which is made still smaller in size as a whole.

One aspect of the invention consists in a planar lightwave circuit including a slab type coupler which has a core and a clad formed on a substrate, characterized in that the slab type coupler comprises at least one, first input/output optical waveguide which inputs/outputs a light signal; an optical slab waveguide which is optically connected to the first input optical waveguide; and at least two, second input/output optical waveguides which are optically connected to the optical slab waveguide, and which input/output light signals; and that the second input/output optical waveguides comprise mode coupling means for coupling part of the inputted/outputted signal light to at least either of a higher-order mode and a radiation mode, and converting the coupled part into a plane wave at an end of the optical slab waveguide; the mode coupling means being an optical waveguide which has a core width varied continuously.

According to the invention, there is provided a planar lightwave circuit including a slab type coupler, which can be easily fabricated by an existing planar-lightwave-circuit fabrication process, and which is of low loss.

One aspect of the invention consists in a planar lightwave circuit including an arrayed waveguide grating filter which has a core and a clad formed on a substrate, characterized in that the arrayed waveguide grating filter comprises at least one input optical waveguide which inputs signal light; a first optical slab waveguide which is optically connected with the input optical waveguide; arrayed optical waveguides which are optically connected with the first optical slab waveguide, and which become longer with a predetermined waveguide length difference in succession; a second optical slab waveguide which is optically connected to the arrayed optical waveguides; and at least one output optical waveguide which is optically connected to the second optical slab waveguide; and that each of the arrayed optical waveguides comprises mode re-coupling means for re-coupling a higher-order mode and a radiation mode to the signal light, at a part optically touching the first optical slab waveguide; and mode coupling means for coupling the signal light to the higher-order mode and the radiation mode, at a part optically touching the second optical slab waveguide; the mode coupling means and the mode re-coupling means being optical waveguides each of which has a core width varied continuously.

According to the invention, there is provided a planar lightwave circuit including an arrayed waveguide grating filter, which can be easily fabricated by an existing planar-lightwave-circuit fabrication process, and which is of low loss.

One aspect of the invention consists in a method wherein a wave propagation circuit for obtaining a desired output field from an input field is designed by employing a computer, characterized by comprising a refractive-index-distribution initialization step of storing initial values of a refractive index distribution of a propagation medium in the wave propagation circuit, in storage means of the computer; a step of setting any position of the transmission medium in a wave propagation direction thereof, as an optimized position; an optimized-position input/output-field computation step of computing a field in a case where the input field has propagated forwards from an inlet of the wave propagation circuit to the optimized position, and a field in a case where the desired output field has propagated backwards from an output of the wave propagation circuit to the optimized position, and then storing the fields in the storage means of the computer; and a refractive-index-distribution alteration step of adjusting the refractive index distribution at the optimized position so that wavefronts of the field in the case where the input field has propagated forwards and the field in the case where the desired output field has propagated backwards may agree; the optimized-position setting step, the optimized-position input/output-field computation step and the refractive-index-distribution alteration step being iterated while the optimized position is being changed in the wave propagation circuit.

One aspect of the invention consists in a method wherein a wave propagation circuit for obtaining a desired output field from an input field is designed by employing a computer, characterized by comprising a refractive-index-distribution initialization step of storing initial values of a refractive index distribution of a propagation medium in the wave propagation circuit, in storage means of the computer; a step of setting an outlet of the wave propagation circuit as an optimized position; a forward-propagation input-field-distribution computation step of computing a field distribution in a case where the input field has propagated forwards from an inlet of the wave propagation circuit to the output thereof, and storing the field distribution in the storage means of the computer; a backward-propagation optimized-position output-field computation step of computing a field in a case where the output field has propagated backwards from the outlet of the wave propagation circuit to the optimized position, and storing the field in the storage means of the computer; and a refractive-index-distribution alteration step of adjusting the refractive index distribution at the optimized position so that wavefronts of the field in the case where the input field has propagated forwards and the field in the case where the desired output field has propagated backwards may agree; the backward-propagation optimized-position output-field computation step and the refractive-index-distribution alteration step being iterated while the optimized position is being successively changed from the outlet to the inlet along a wave propagation direction.

One aspect of the invention consists in a method wherein a wave propagation circuit for obtaining a desired output field from an input field is designed by employing a computer, characterized by comprising a refractive-index-distribution initialization step of storing initial values of a refractive index distribution of a propagation medium in the wave propagation circuit, in storage means of the computer; a step of setting an inlet of the wave propagation circuit as an optimized position; a backward-propagation output-field-distribution computation step of computing a field distribution in a case where the output field has propagated backwards from an outlet of the wave propagation circuit to the input thereof, and storing the field distribution in the storage means of the computer; a forward-propagation optimized-position input-field computation step of computing a field in a case where the input field has propagated forwards from the inlet of the wave propagation circuit to the optimized position, and storing the field in the storage means of the computer; and a refractive-index-distribution alteration step of adjusting the refractive index distribution at the optimized position so that wavefronts of the field in the case where the input field has propagated forwards and the field in the case where the desired output field has propagated backwards may agree; the forward-propagation optimized-position input-field computation step and the refractive-index-distribution alteration step being iterated while the optimized position is being successively changed from the inlet to the outlet along a wave propagation direction.

According to the invention, there are provided a method which designs an optimized wave propagation circuit at high speed, and a computer program which executes the method.

Besides, a design method for a wave propagation circuit as is not of a cut-and-try type, but as is deterministic is provided by employing a design method for a wave propagation circuit in one aspect of the invention.

Further, according to one aspect of the invention, there is provided a method which optimizes a wave propagation circuit at high speed.

BRIEF DESCRIPTION OF THE DRAWINGS

FIG. 44A shows an example of a lightwave circuit which has been designed by the prior-art method of designing the wave propagation circuit.

FIG. 44B shows an example of a lightwave circuit which has been designed by the prior-art method of designing the wave propagation circuit.

BEST MODE FOR CARRYING OUT THE INVENTION

Figure 1:
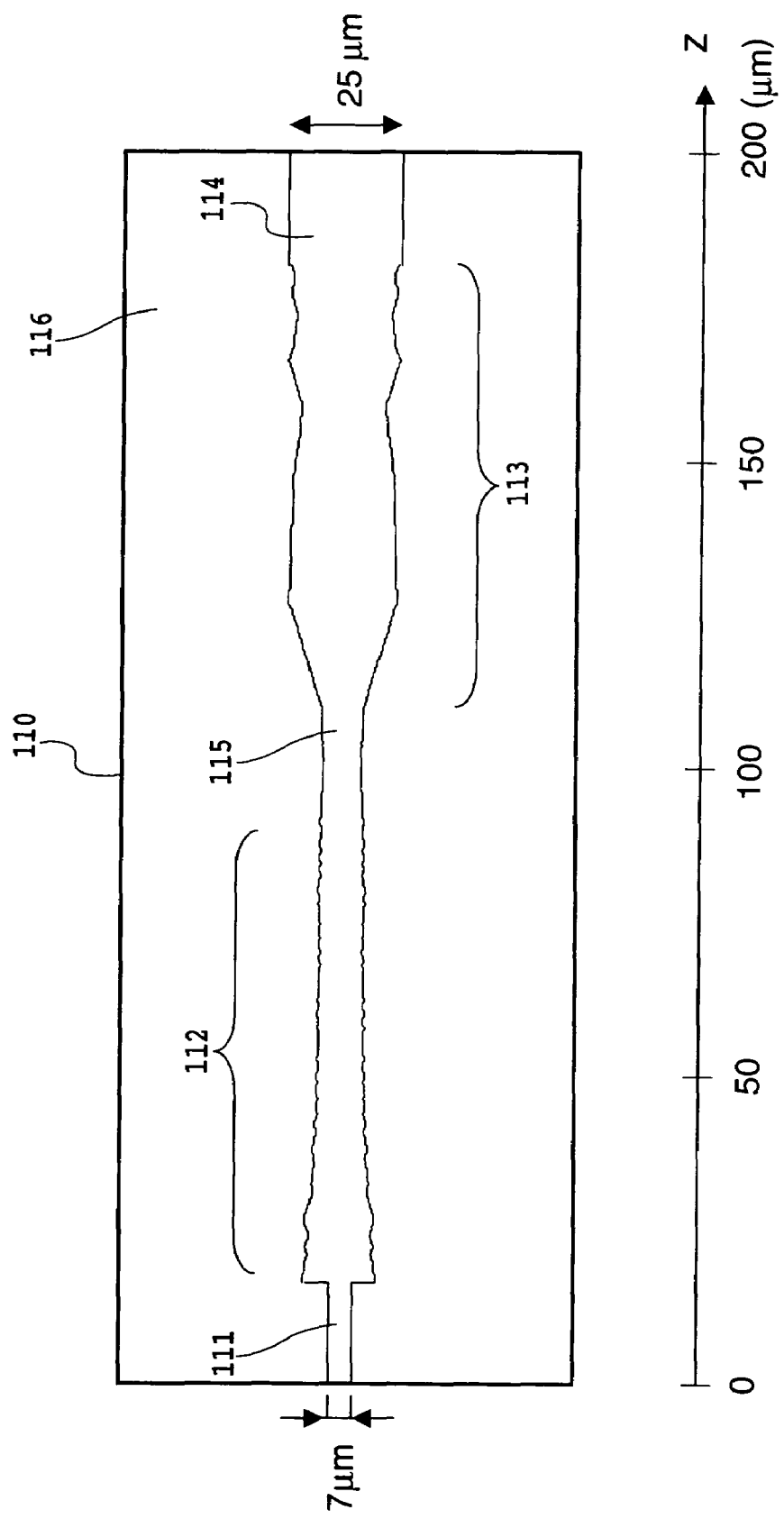
FIG. 1 is a configurational view of an optical waveguide lens (planar lightwave circuit) in a first embodiment.

Now, embodiments of the present invention will be described in detail in conjunction with the drawings. By the way, in the embodiments, parts having the same functions will be assigned the same reference numerals and signs, and they shall not be repeatedly described.

Further, in each of the ensuing embodiments, a planar lightwave circuit will be assumed an optical waveguide of silica-based glass formed on a silicon substrate. This is because such a combination can provide a planar lightwave circuit which is stable and which is of excellent workability. However, the invention is not restricted to the combination, but it may, of course, employ other substrates and glass films such as a semiconductor optical waveguide and a polymer optical waveguide.

First Embodiment

The first embodiment of the invention will be described with reference to FIGS. 1 and 2.

FIG. 1 is a plan view in which an optical waveguide lens (planar lightwave circuit) according to the first embodiment is seen in a direction perpendicular to a substrate. A z-axis indicates the propagation direction of signal light. Here, the optical waveguide lens is supposed in FIG. 1, and this is because the planar lightwave circuit according to the invention is excellent for realizing the lens or the like function which is difficult to be realized by only a propagation mode. However, the planar lightwave circuit according to the invention is not restricted to this embodiment, but it can be configured as a planar lightwave circuit having another function, such as spot size converter.

As shown in FIG. 1, the optical waveguide lens (planar lightwave circuit) according to the first embodiment is configured of an input optical waveguide 111 which inputs the signal light, mode coupling means 112 for coupling part of the signal light inputted to the input optical waveguide 111, to a higher-order mode and a radiation mode, mode re-coupling means 113 for re-coupling the higher-order mode and the radiation mode optically coupled in the mode coupling means 112, to output signal light in consideration of phases, and an output optical waveguide 114 which outputs the output signal light optically re-coupled in the mode re-coupling means 113.

The mode coupling means 112 and the mode re-coupling means 113 are configured of an optical waveguide whose core width is varied aperiodically smoothly or continuously.

There will be described a method of forming the modulated core width of the optical waveguide of the optical waveguide lens shown in FIG. 1. The modulated core width of the optical waveguide is determined by applying the fundamental concept of a wave transmission medium. Here, the "wave" which is propagated through the wave transmission medium is "light" because of the application to the lightwave circuit. A theory concerning the wave transmission medium designates the characteristic of the medium on the basis of a general wave equation, and it can, in principle, hold true of a general wave.

$\Psi$ is let denote a field (forward propagating light) which is obtained in such a way that the field of the signal light inputted from the input optical waveguide 111 is propagated from the side of the input optical waveguide 111 onto the side of the output optical waveguide 114, while $\Phi^*$ is let denote a field (backward propagating light) which is obtained in such a way that a field obtained by inverting the phase of the field of the desired signal light to be outputted from the output optical waveguide 114 is propagated from the side of the output optical waveguide 114 onto the side of the input optical waveguide 111.

On this occasion, when a refractive index distribution is given so as to minimize the phase differences between the forward propagating light $\Psi$ and the backward propagating light $\Phi^*$ at the individual positions of the z-axis shown in FIG. 1, the optimal optical waveguide lens (planar lightwave circuit) for converting the inputted signal light into the desired output signal light can be configured.

Concretely, the phase differences ($\Psi-\Phi^*$) between the forward propagating light and the backward propagating light at the interface of a core and a clad are computed at the individual positions of the z-axis shown in FIG. 1.

In a case where the phase difference between the forward propagating light and the backward propagating light at the interface of the core and the clad is positive ($\Psi-\Phi^*>0$), this phase difference between $\Psi$ and $\Phi^*$ can be minimized by enlarging the core width of the optical waveguide.

Besides, in a case where the phase difference between the forward propagating light and the backward propagating light at the interface of the core and the clad is negative ($\Psi-\Phi^*<0$), this phase difference between $\Psi$ and $\Phi^*$ can be minimized by reducing the core width of the optical waveguide.

The core widths of the optical waveguide as minimize the phase differences between the forward propagating light $\Psi$ and the backward propagating light $\Phi^*$ at the individual positions of the z-axis are respectively evaluated by computations on the basis of such a formation method, whereby the optimal optical waveguide lens (planar lightwave circuit) for converting the inputted signal light into the desired output signal light can be configured.

Here, in a case where the variation of the core width of the optical waveguide is abrupt relative to the propagation direction of the signal light, there occurs the problem that the fabrication of the planar lightwave circuit becomes difficult. Accordingly, the variation of the core width of the optical waveguide should desirably be continuous and smooth and be $\pm 8.0$ μm per unit length (1 μm) in the signal-light propagation direction. Further, the optimal value of the variation of the core width of the optical waveguide should more desirably lie within a range of $-4.0$ μm through $+4.0$ μm per unit length (1 μm) in the signal-light propagation direction.

The optical waveguide lens (planar lightwave circuit) shown in FIG. 1 can be fabricated by a procedure as stated below. An under cladding layer of $SiO_2$ is first deposited on an Si substrate by flame hydrolysis deposition or the like, and a core layer of $SiO_2$ glass which is doped with $GeO_2$ as a dopant is subsequently deposited. Next, the core layer is etched by employing a pattern as shown in FIG. 1, so as to smoothen the variation of the core width of the optical waveguide, thereby to fabricate an optical waveguide portion. Lastly, an over cladding layer of $SiO_2$ is deposited again.

Figure 2:
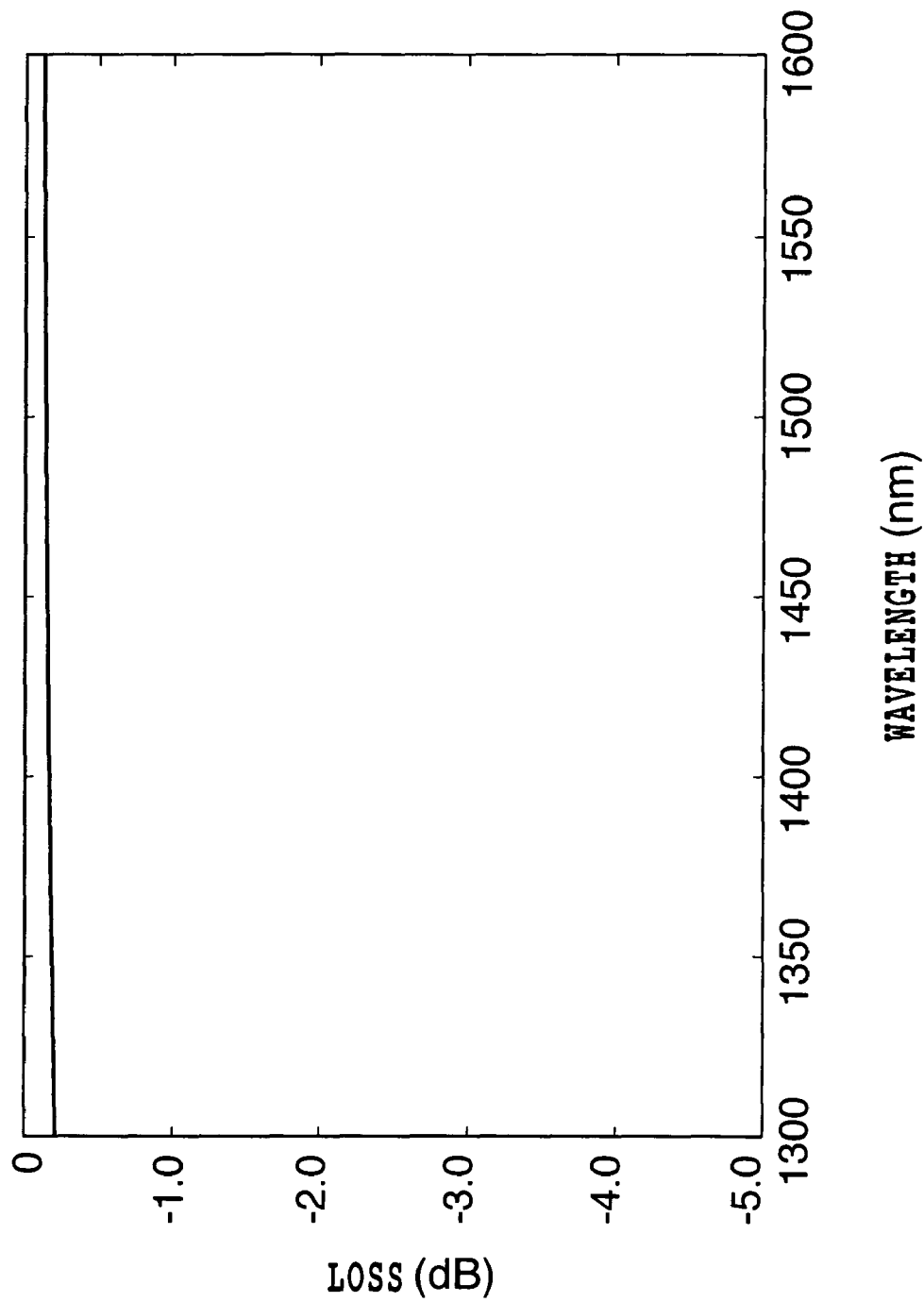
FIG. 2 is a diagram showing the wavelength-dependency properties of the propagation loss of the signal light of the optical waveguide lens (planar lightwave circuit) in the first embodiment.

Shown in FIG. 2 is the wavelength-dependency properties of the propagation loss of the signal light in the case where the planar lightwave circuit of the invention has been configured as the optical waveguide lens. This dependency is based on the optical waveguide lens in the case where the variation of the core width of the optical waveguide has been limited within the range of $-4.0$ through $+4.0$ μm per μm. It is understood from FIG. 2 that the propagation loss of the signal light is lowered to about 0.1 dB in a wavelength band of 1300-1600 nm, so a sufficiently favorable characteristic is attained.

Second Embodiment

Next, the second embodiment of the present invention will be described with reference to FIG. 3.

An optical waveguide lens (planar lightwave circuit) according to the second embodiment is a modification to the optical waveguide lens (planar lightwave circuit) according to the first embodiment.

Figure 3:
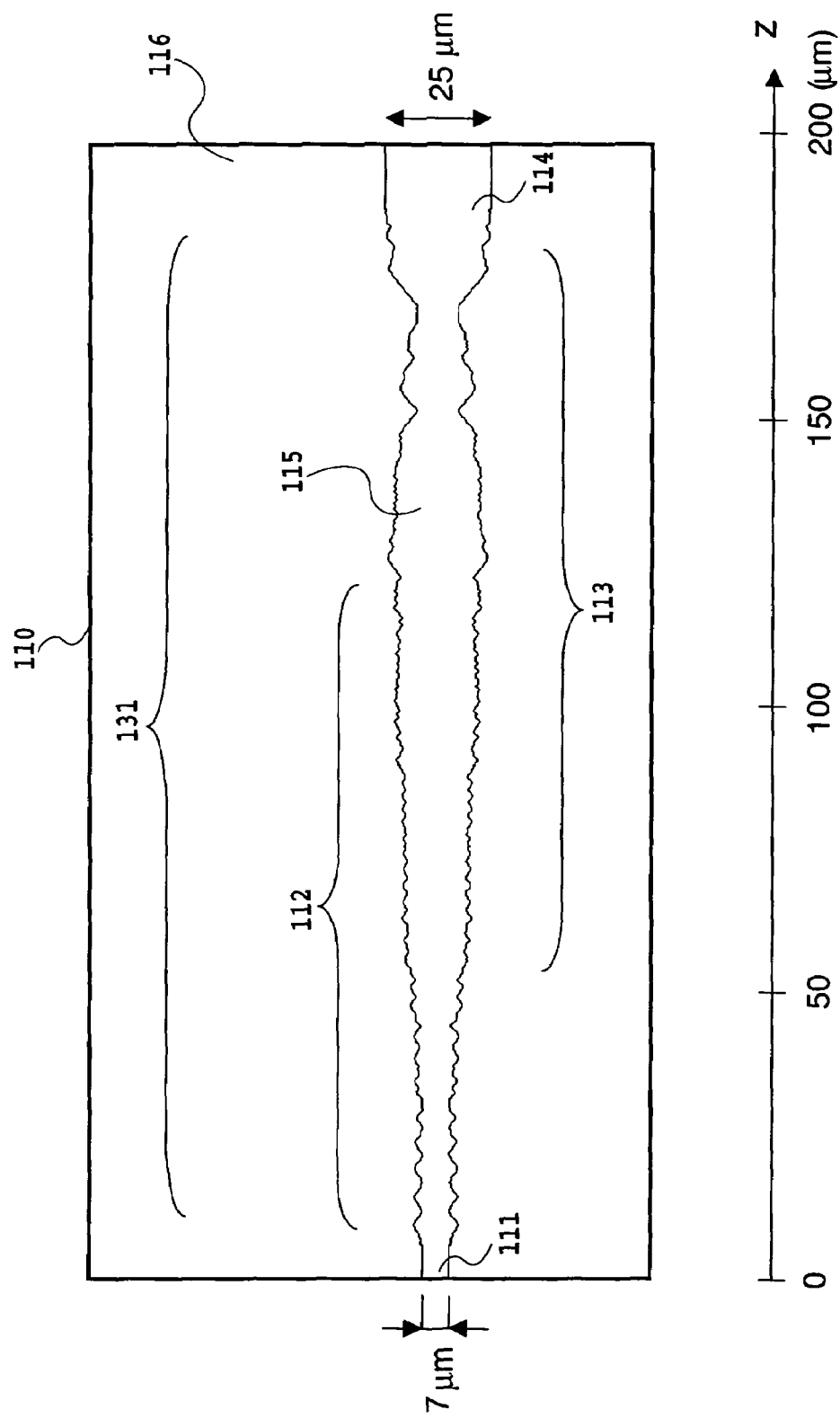
FIG. 3 is a configurational view of an optical waveguide lens (planar lightwave circuit) in a second embodiment.

FIG. 3 is a plan view in which the optical waveguide lens (planar lightwave circuit) according to the second embodiment is seen in a direction perpendicular to a substrate. A z-axis indicates the propagation direction of signal light. Mode coupling means 112 and mode re-coupling means 113 are configured unitarily as mode coupling/re-coupling means 131. Incidentally, the modulated core width of a waveguide can be formed by the same method as that of the optical waveguide lens (planar lightwave circuit) of the first embodiment.

As shown in FIG. 3, the mode coupling means 112 and the mode re-coupling means 113 need not have the configurations independent of each other as shown in FIG. 1, but it is possible to adopt a configuration in which an input optical waveguide 111, the mode coupling/re-coupling means 131 with the mode coupling means 112 and the mode re-coupling means 113 united, and an output optical waveguide 114 are optically coupled in this order.

Third Embodiment

Next, the third embodiment will be described with reference to FIGS. 4 through 6.

Whereas the above embodiments have indicated the examples of the planar lightwave circuits in each of which the core width of the optical waveguide is varied in the direction parallel to the substrate, a planar lightwave circuit in the third embodiment according to the invention indicates an example in which the core width of a waveguide is varied in a direction perpendicular to a substrate, that is, in a depthwise direction.

Even when the core width of the waveguide is varied in the direction perpendicular to the substrate, similar advantages can be attained. Signal light has the property that a distribution is more liable to spread in the depthwise direction. Therefore, when the core width is varied in the depthwise direction, a rather greater advantage is attained, that is, the advantage of lowering a loss attendant upon propagation is enhanced.

Figure 4:
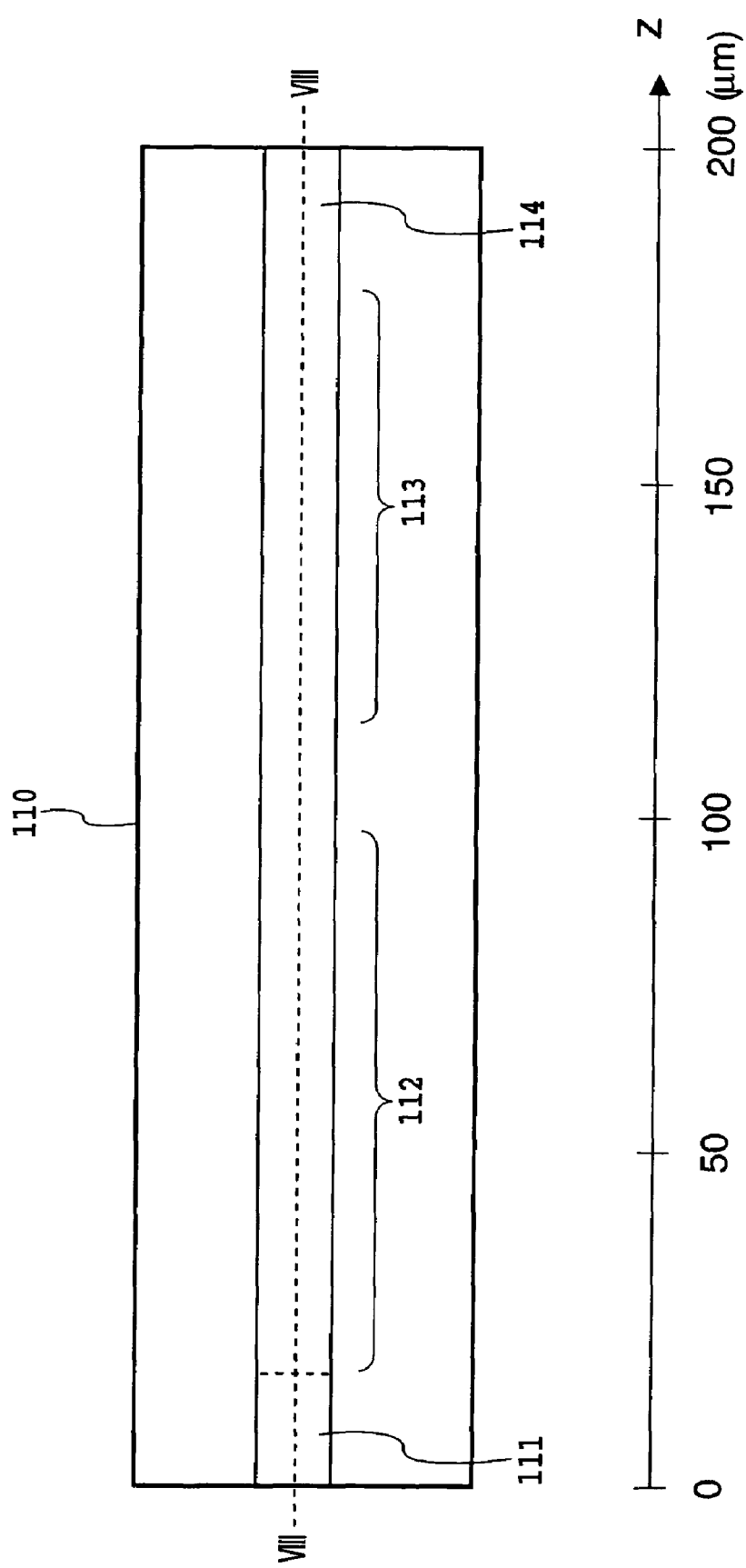
FIG. 4 is a plan view of a planar lightwave circuit in a third embodiment.
Figure 5:
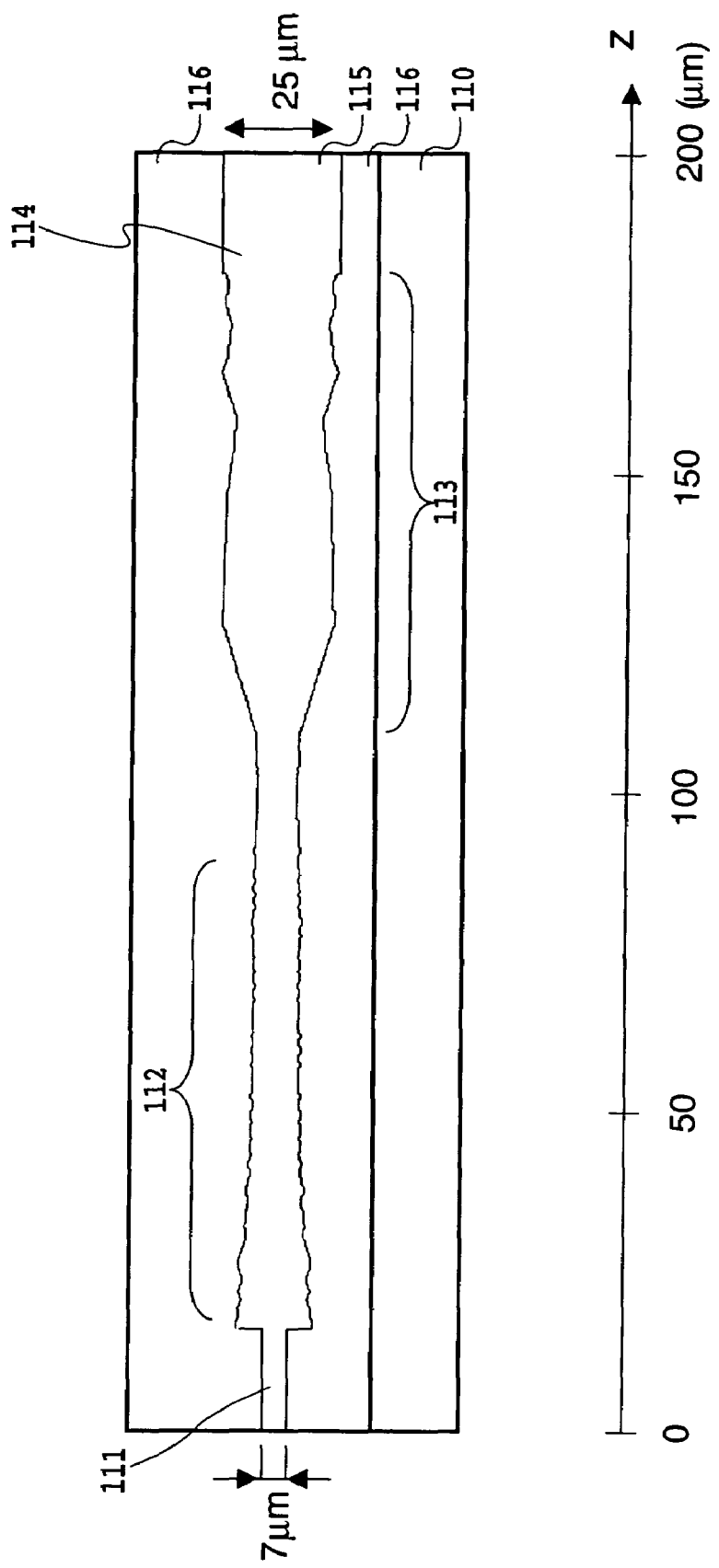
FIG. 5 is a sectional view of the planar lightwave circuit in the third embodiment.

Shown in FIGS. 4 and 5 is the example of the waveguide (planar lightwave circuit) in which the core width of the optical waveguide is varied in the depthwise direction. FIG. 4 is a plan view in which the waveguide is seen in the direction perpendicular to the substrate. FIG. 5 is a sectional view taken along VIII in FIG. 4.

Figure 6A:
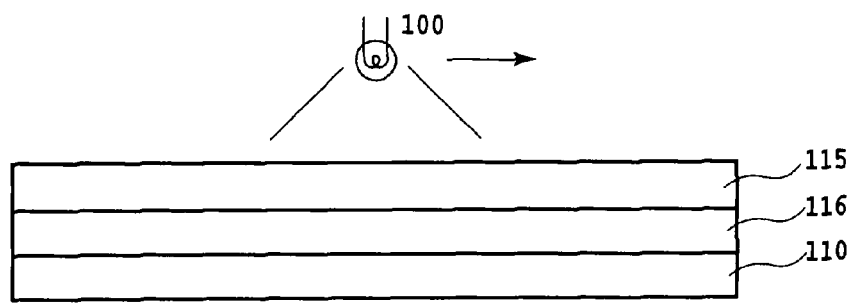
FIG. 6A is a view showing the fabrication process of the planar lightwave circuit in the third embodiment.
Figure 6B:
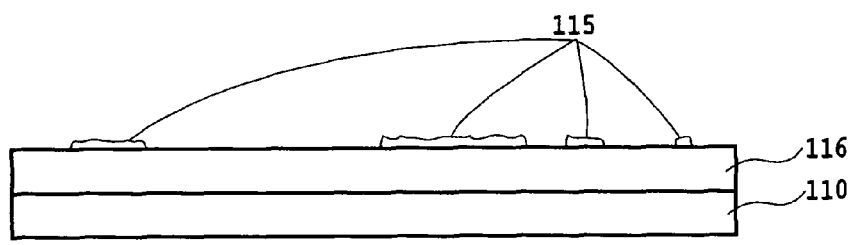
FIG. 6B is a view showing the fabrication process of the lightwave circuit in the third embodiment.

A fabrication method is shown in FIGS. 6A through 6D. A polymer clad 116 is formed on a substrate 110 by an ordinary method, and it is coated with a photosensitive resin 115 which is to form a core. The upper surface of the resulting structure is irradiated with and scanned by ultraviolet radiation or the like. On that occasion, only parts to form the core are irradiated, resinified and hardened (FIG. 6A). Thereafter, when unhardened parts are rinsed away, only the parts to form the core remain (FIG. 6B).

Subsequently, the resulting structure is coated with a photosensitive resin 106 of low refractive index as is to form a clad, so as to have the same film thickness as that of the coating of the photosensitive resin forming the core as was applied in FIG. 6A, and to have the same film thickness as that of the remaining parts to form the core, and the photosensitive resin 106 is irradiated and hardened over its whole area, thereby to obtain a uniform flat surface 102 (not illustrated).

Figure 6C:
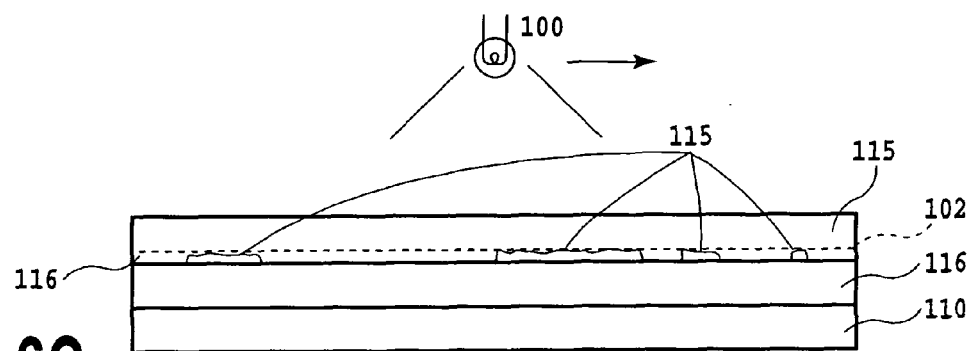
FIG. 6C is a view showing the fabrication process of the lightwave circuit in the third embodiment.
Figure 6D:
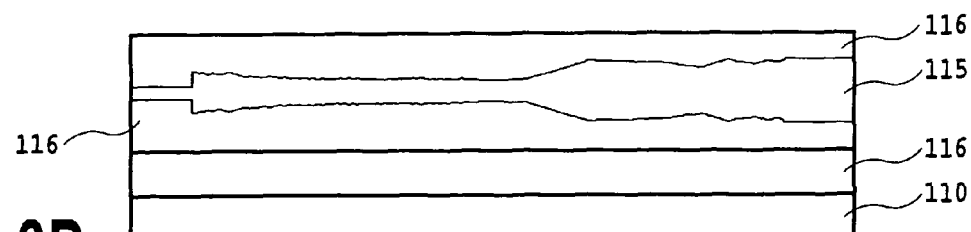
FIG. 6D is a view showing the fabrication process of the lightwave circuit in the third embodiment.

Further, the uniform flat surface 102 is coated with a photosensitive resin 115 which is to form a core, and the upper surface of which is irradiated with and scanned by ultraviolet radiation or the like, whereby only parts to form the core are resinified and hardened (FIG. 6C). Thereafter, unhardened parts are rinsed away, and a resin to form a clad is applied and hardened. Such processes are repeated, whereby the waveguide whose core width is varied in the depthwise direction as shown in FIG. 5 can be obtained (FIG. 6D).

When the propagation loss of the planar lightwave circuit employing the waveguide is measured, 0.03 dB is exhibited as in the planar circuit employing the waveguide whose core width is varied in the planar direction.

Fourth Embodiment

The fourth embodiment of the present invention will be described with reference to FIGS. 7 through 11.

Figure 7:
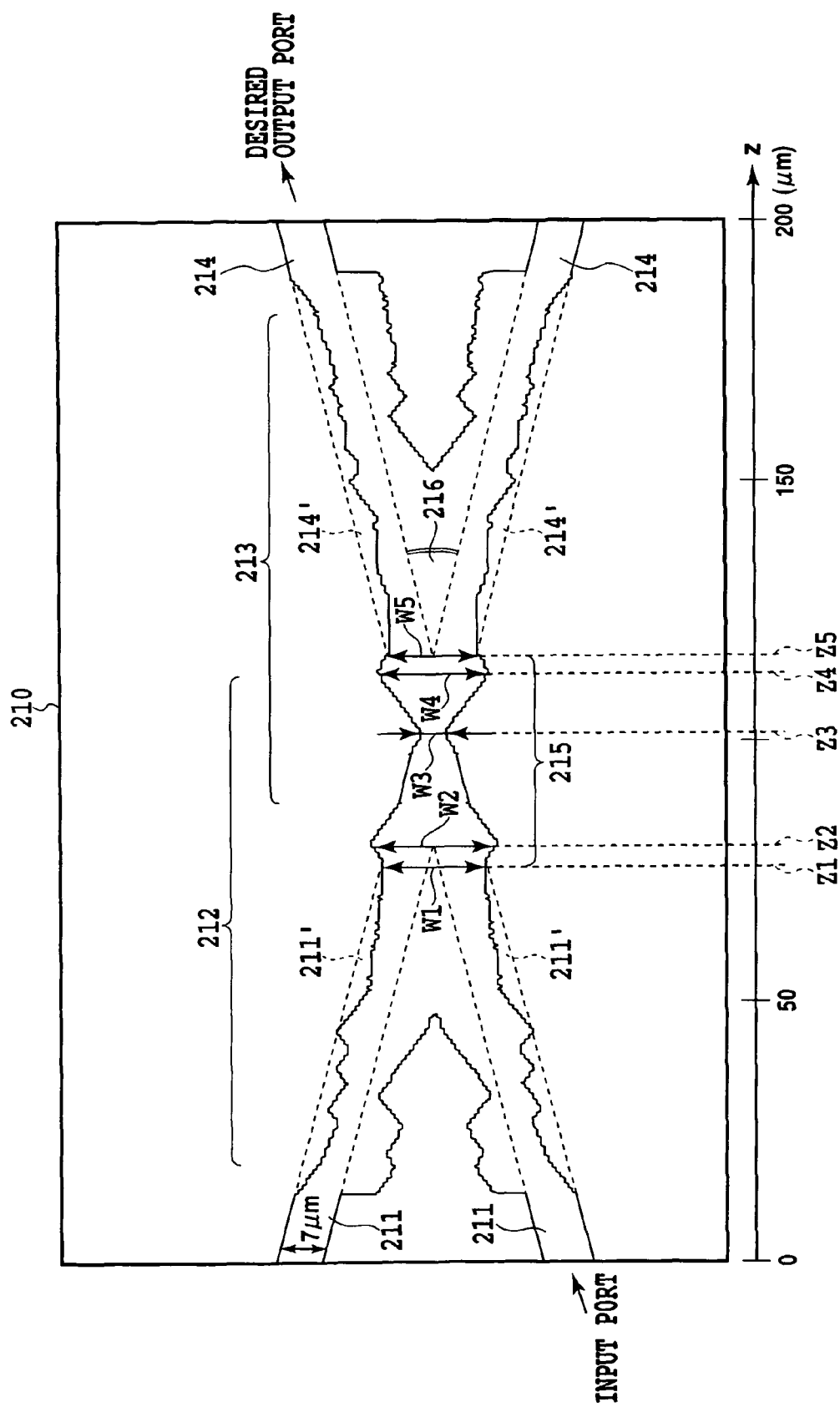
FIG. 7 is a view representing the configuration of a planar lightwave circuit in a fourth embodiment.

FIG. 7 is a plan view in which a cross waveguide (planar lightwave circuit) in the fourth embodiment according to the invention is seen in a direction perpendicular to a substrate. As shown in FIG. 7, the planar lightwave circuit 210 of this embodiment includes two input optical waveguides 211 to which signal light is inputted, mode coupling means 212 for coupling part of the signal light inputted to the input optical waveguide 211, to a higher-order mode or a radiation mode, mode re-coupling means 213 for re-coupling the signal light coupled to the optical high-order mode or radiation mode in the mode coupling means 212, to output signal light in consideration of phases, two output optical waveguides 214 which output the output signal light optically re-coupled in the mode re-coupling means 213, and an optical-waveguide crossing portion 215 in which two virtual optical waveguides 211' rectilinearly extending from the input waveguides 211 toward the output waveguides 214 or two virtual optical waveguides 214' rectilinearly extending from the output waveguides 214 toward the input waveguides 211 overlap.

In the planar lightwave circuit 210 shown in FIG. 7, the mode coupling means 212, mode re-coupling means 213 and the optical-waveguide crossing portion 215 are not limited to the illustrated positions, but they can also be configured so as not to overlap one another. Further, optical waveguides whose core widths are not varied can be interposed.

Figure 8:
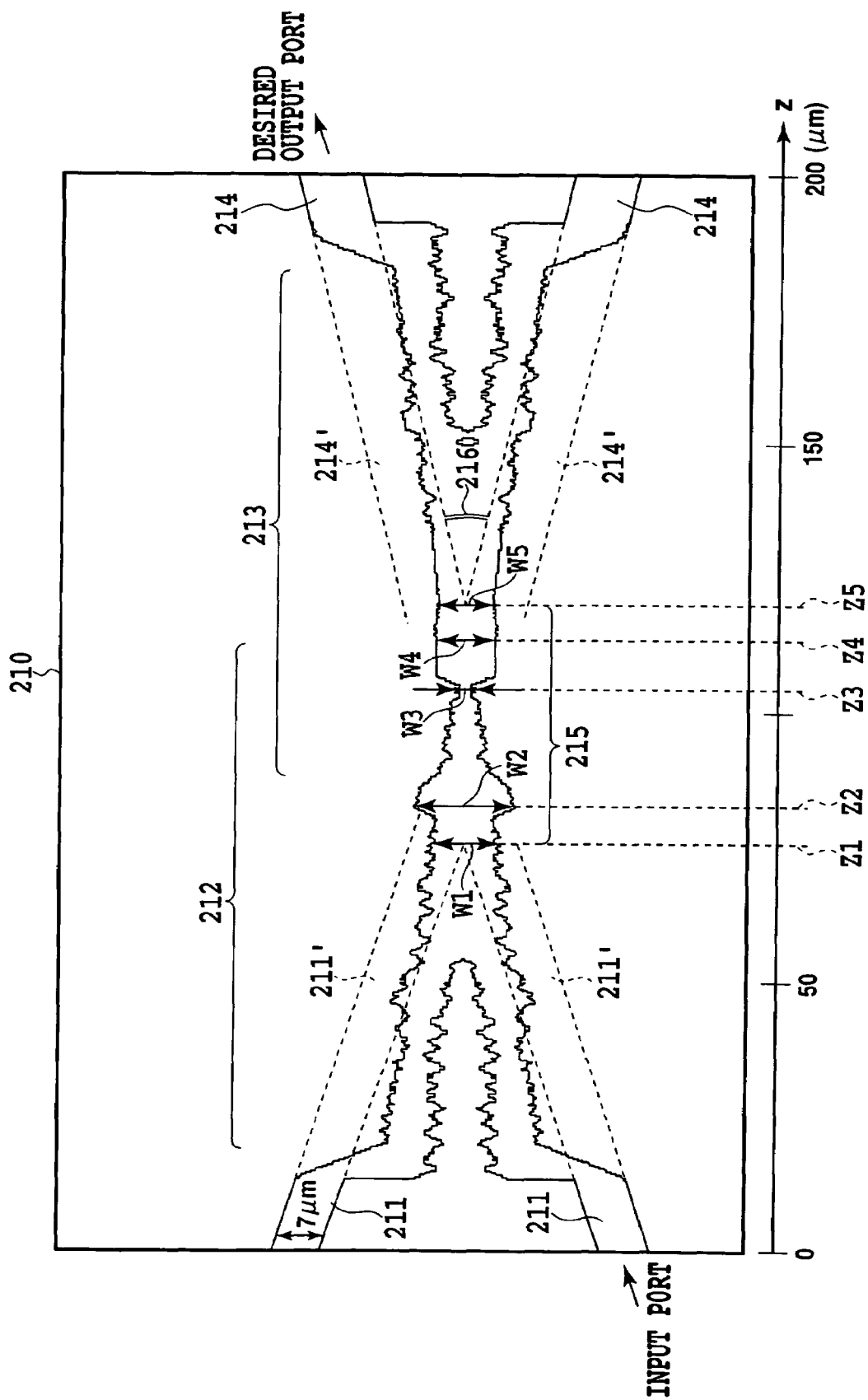
FIG. 8 is a view representing the configuration of another planar lightwave circuit in the fourth embodiment.

In FIGS. 7 and 8, a z-axis indicates the propagation direction of the signal light. Besides, $w1$, $w2$, $w3$, $w4$ and $w5$ indicate the core widths of the optical waveguides at z-axial coordinates $z1$, $z2$, $z3$, $z4$ and $z5$ ($z1 < z2 < z3 < z4 < z5$) shown in the figures, respectively. The coordinate $z1$ corresponds to the ends of the input waveguides 211 in the optical-waveguide crossing portion 215. The coordinate $z5$ corresponds to the ends of the output waveguides 214 in the optical-waveguide crossing portion 215. The coordinate $z3$ corresponds substantially to the center of the optical-waveguide crossing portion 215. Besides, a crossing angle 216 in this embodiment signifies the crossing angle between the virtual optical waveguides 211' and 214'.

Figure 11:
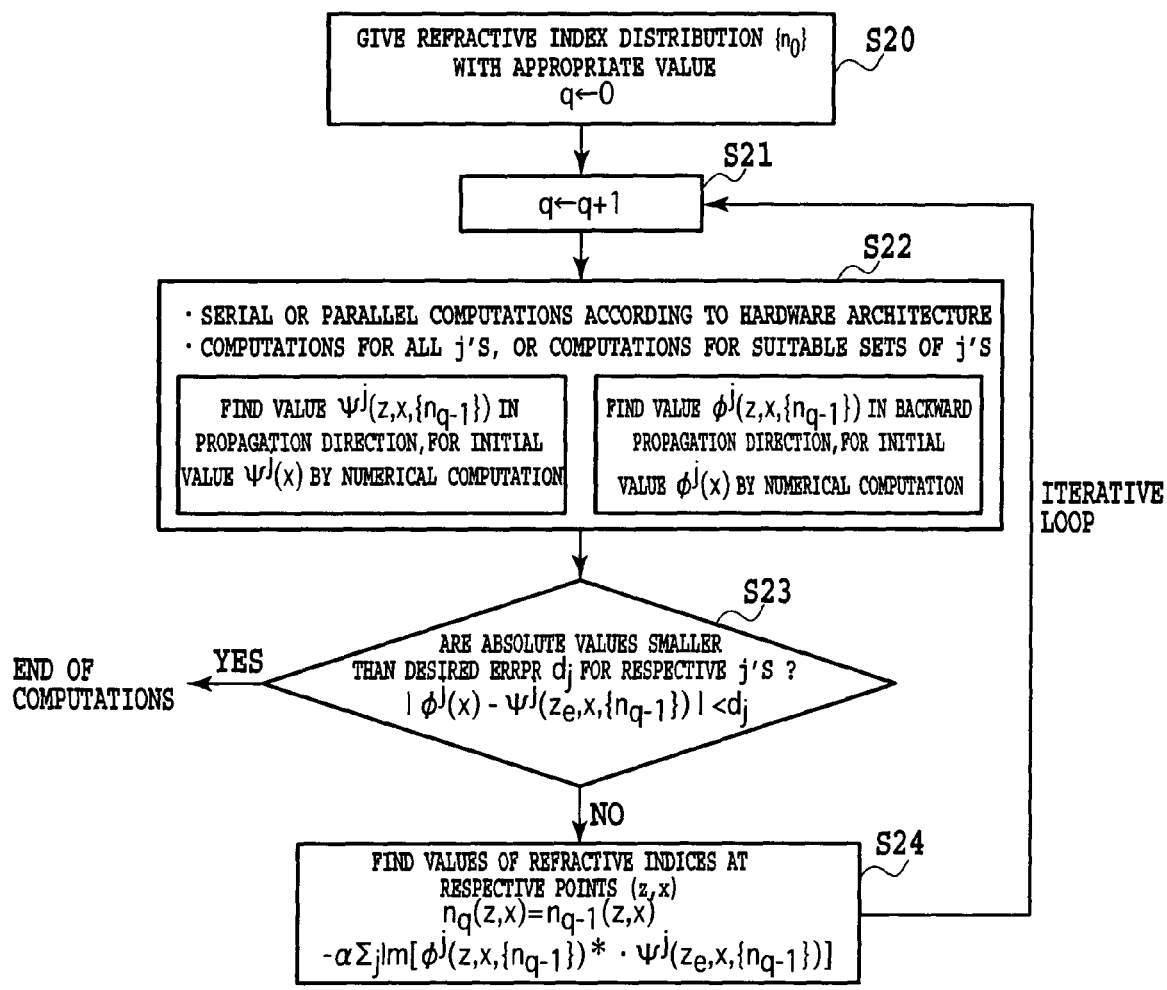
FIG. 11 is a flow chart showing a computation procedure for determining the refractive index distribution of the planar lightwave circuit in the fourth embodiment.

Next, a design method for the modulated optical-waveguide core widths in the mode coupling means 212 and the mode re-coupling means 213 shown in FIG. 7 will be described with reference to FIG. 11. The modulated core width of the optical waveguide is determined by applying the fundamental concept of a wave transmission medium. Here, the "wave" which is propagated through the wave transmission medium is "light" because of the application to the lightwave circuit. A theory concerning the wave transmission medium designates the characteristic of the medium on the basis of a general wave equation, and it can, in principle, hold true of a general wave.

Since the use of symbols is more convenient for describing the design method for the modulated core width of the optical waveguide, the symbols as stated below shall be employed for representing various quantities. Incidentally, since the light (field) to be handled is not restricted to light in a single state, light in each individual state shall be generally represented by applying an index j, in order that light in which lights in a plurality of states are superposed may be handleable. In the ensuing description, the coordinate axis of the propagation direction of the light will be assumed the z-axis ($z=0$ corresponds to a plane of incidence, while $z=z_e$ corresponds to a plane of emergence), and a coordinate axis in a lateral direction relative to the propagation direction of the light will be assumed an x-axis.

$\psi^j(x)$: jth incident field (which is a complex vector value function, and which is stipulated by an intensity distribution and a phase distribution to be set at the plane of incidence, and wavelengths and polarizations)

$\Phi^j(x)$: jth emergent field (which is a complex vector value function, and which is stipulated by an intensity distribution and a phase distribution to be set at the plane of emergence, and wavelengths and polarizations)

Incidentally, unless intensity amplification, wavelength conversion and polarization conversion are performed in the lightwave circuit, the summation of the light intensities of $\psi^j(x)$ and $\Phi^j(x)$ is the same (or is attended with a negligible loss), and the wavelengths and polarizations of these fields are the same.

$\{\psi^j(x), \Phi^j(x)\}$: input/output pair (set of input/output fields)

$\{\psi^j(x), \Phi^j(x)\}$ is stipulated by the intensity distributions and phase distributions at the plane of incidence and the plane of emergence, and the wavelengths and the polarizations.

$\{n_q\}$: refractive index distribution (set of the values of the whole lightwave-circuit design region)

When one refractive index distribution is given to the given incident field and emergent field, the field of light is determined, and hence, it is necessary to consider a field for all refractive indices given by the qth iterative calculation. Therefore, the whole refractive index distribution may well be represented as $n_q(x, z)$ where $(x, z)$ denotes an indeterminate variable, but it shall be represented as $\{n_q\}$ in order to distinguish it from the value $n_q(x, z)$ of a refractive index in a place $(x, z)$.

$n_{core}$: symbol which indicates the value of a high refractive index relative to surrounding refractive indices, as at a core part in the optical waveguide $N_{clad}$: symbol which indicates the value of a low refractive index relative to $n_{core}$, as at a clad part in the optical waveguide $\psi^j(z, x, \{n_q\})$: value of a field in the place $(x, z)$ in the case where the jth incident field $\psi^j(x)$ has been propagated to $\underline{z}$ within the refractive index distribution $\{n_q\}$ $\Phi^j(z, x, \{n_q\})$: value of a field in the place $(x, z)$ in the case where the jth emergent field $\Phi^j(x)$ has been propagated backwards to $\underline{z}$ within the refractive index distribution $\{n_q\}$ In this embodiment, $\{n_q\}$ is given so that the core width of the optical waveguide may become $\Phi^j(Z_e, x, \{n_q\})=\Phi^j(x)$ for all j's, or a state close thereto. An "input port" and an "output port" are "regions" where fields are concentrated at an incident end face and an emergent end face, respectively. By way of example, they are regions where light intensities can be propagated to optical fibers by connecting the fibers to the corresponding parts. Here, the intensity distributions and phase distributions of fields can be designed so as to differ between the jth and kth ones, so that a plurality of ports can be provided at each of the incident end face and emergent end face.

Further, in a case where the set of the incident field and emergent field is considered, a phase which is developed by the propagation between the fields differs depending upon the frequency of light. Regarding lights of different frequencies (that is, lights of different wavelengths), therefore, different ports can be set irrespective of whether field shapes including phases are the same or orthogonal. Here, an electromagnetic field is a field of real-number vector value, and it has a wavelength and a polarized state as parameters, but the values of its components shall be indicated by a complex number easy of general mathematical handling, and the solution of an electromagnetic wave shall be represented by the complex number.

Besides, it is assumed in the ensuing computations that the intensity of the whole field is normalized to 1 (one). For the jth incident field $\psi^j(x)$ and emergent field $\Phi^j(x)$, a propagation field and a backward propagation field shall be represented as $\psi^j(z, x, \{n\})$ and $\Phi^j(z, x, \{n\})$ as the complex vector value functions of each place. The values of these functions change depending upon the refractive index distribution $\{n\}$, and therefore have the refractive index distribution $\{n\}$ as a parameter.

$\psi^j(x)=\psi^j(0, x, \{n\})$ and $\Phi^j(x)=\Phi^j(z_e, x, \{n\})$ hold good in accordance with the definitions of the symbols. The values of these functions can be easily computed by a known technique such as beam propagation method, when the incident field $\psi^j(x)$, emergent field $\Phi^j(x)$ and refractive index distribution $\{n\}$ are given.

An algorithm for determining a spatial refractive index distribution will be described below. Shown in FIG. 11 is a computation procedure for determining the spatial refractive index distribution of a wave transmission medium. Since the computations are iteratively executed, the number of times of the iterations is indicated by q, and the situation of the qth computation after the computations up to the (q−1)th one have been executed is illustrated.

The propagation field and the backward propagation field are evaluated by numerical computations for the jth incident field $\psi^j(x)$ and emergent field $\Phi^j(x)$, on the basis of the refractive index distribution $\{n_{q-1}\}$ obtained by the (q−1)th computation, and the results are respectively represented as $\psi^j(z, x, \{n_{q-1}\})$ and $\Phi^j(z, x, \{n_{q-1}\})$ (step S22). On the basis of these results, the refractive index $n_q(z, x)$ in each place $(z, x)$ is evaluated by the following formula (step S24):

$$n_q(z,x)=n_{q-1}-\alpha \Sigma_j Im[\Phi^j(z,x,\{n_{q-1}\})^* \cdot \psi^j(z,x,\{n_{q-1}\})] \quad (1)$$

Here, symbol "·" in the second term of the right side signifies an inner product calculation, and "Im[ ]" signifies the imaginary part of the result of the field inner-product calculation within [ ]. Incidentally, symbol "*" denotes a complex conjugate. A coefficient $\alpha$ has a value obtained in such a way that a value smaller than several tenths of $n_q(z, x)$ is further divided by the number of the sets of fields. "$\Sigma_j$" signifies to take a sum for the indices j's. The steps S22 and S24 are iterated, and the computation is ended when the absolute value of the difference between the value $\Psi^j(z_e, x, \{n\})$ and the emergent field $\Phi^j(x)$ at the emergent plane of the propagation field has become smaller than a desired error $d_j$ (step S23: YES). Incidentally, at a step S21, "q←(q+1)" signifies that a value with 1 (one) added to the value of the present q is set as a new q.

In the above computations, the initial values $\{n_o\}$ of the refractive index distribution may be appropriately set, but when the initial values $\{n_o\}$ are close to an expected refractive index distribution, the convergence of the computations quickens to that extent (step S20). Besides, in computing $\Phi_j(z, x, \{n_{q-1}\})$ and $\Psi^j(z, x, \{n_{q-1}\})$ for individual j's, a computer capable of computations in parallel may compute for the respective j's (that is, for the respective $\Phi^j(z, x, \{n_{q-1}\})$'s and $\Psi^j(z, x, \{n_{q-1}\})$'s), and hence, the computations can be made efficient by employing a cluster system or the like (step S22). Besides, in a case where a computer is configured having a comparatively small memory, it is also possible to select appropriate j's for individual q's in the part of the sum for the indices j's in Formula (1), to compute only $\Phi^j(z, x, \{n_{q-1}\})$'s and $\Psi^j(z, x, \{n_{q-1}\})$'s of the corresponding parts and to iterate the subsequent computation (step S22). In a case where the values of $\Phi_j(z, x, \{n_{q-1}\})$ and $\Psi^j(z, x, \{n_{q-1}\})$ are close in the above calculation, $$Im[\Phi^j(z,x,\{n_{q-1}\})^* \cdot \Psi^j(z,x,\{n_{q-1}\})]$$

in Formula (1) becomes a value corresponding to a phase difference, and a desired output can be obtained by decreasing this value. That is, in determining the core width of the optical waveguide, the core width may be enlarged or reduced so that the value of $$Im[\Phi^j(z,x,\{n_{q-1}\})^* \cdot \Psi^j(z,x,\{n_{q-1}\})]$$

may become smaller at the interface between the core and the clad in the refractive index distribution of the (q−1)th computed result.

The above calculation contents for determining the core width of the optical waveguide are summarized as stated below. $\Psi$ is let denote a field (forward propagating light) which is developed in such a way that the field of signal light inputted from the input port of the input optical waveguide 211 is propagated from the side of the input optical waveguide 211 onto the side of the output optical waveguide 214, while $\Phi^*$ is let denote a field (backward propagating light) which is developed in such a way that a field obtained by inverting the phase of the field of desired signal light outputted from the desired output port of the output optical waveguide 214 is propagated from the side of the output optical waveguide 214 onto the side of the input optical waveguide 211. On this occasion, when the z-axis shown in FIG. 7 gives a refractive index distribution in which the phase difference between the forward propagating light $\Psi$ and the backward propagating light $\Phi^*$ is minimized at each position, an optimal lightwave circuit for converting the inputted signal light into desired output signal light can be configured. Concretely, the phase difference ($\Psi - \Phi^*$) of the forward propagating light and the backward propagating light at the interface between the core and the clad is computed at each position of the z-axis shown in FIG. 7. In a case where the phase difference of the forward propagating light and the backward propagating light at the interface between the core and the clad is positive ($\Psi - \Phi^* > 0$), the phase difference of $\Psi$ and $\Phi^*$ can be minimized by enlarging the core width of the optical waveguide. On the other hand, in a case where the phase difference of the forward propagating light and the backward propagating light at the interface between the core and the clad is negative ($\Psi - \Phi^* < 0$), the phase difference of $\Psi$ and $\Phi^*$ can be minimized by reducing the core width of the optical waveguide. The optimal lightwave circuit can be configured in such a way that, on the basis of such a design method, the optical waveguide widths which minimize the phase differences of the forward propagating light $\Psi$ and the backward propagating light $\Phi^*$ at the individual positions of the z-axis are respectively evaluated by computations.

Here, in a case where the change of the optical waveguide width is abrupt relative to the signal-light propagation direction, there occurs the problem that the fabrication of the lightwave circuit becomes difficult. Accordingly, the variation of the core width of the optical waveguide should desirably be continuous and smooth and lie within a range of ±8.0 μm per unit length (1 μm) in the signal-light propagation direction in consideration of the wavelength of the signal light. Further, satisfactory effects are attained even when the variation is limited within a range of ±4.0 μm.

Next, the design of the optical-waveguide crossing portion 215 will be described. Regarding the core width of the optical waveguide of the optical-waveguide crossing portion 215, the core width w2 of the optical waveguide at the position (z=z2) between the end (z=z1) of the optical-waveguide crossing portion 215 on the side of the input optical waveguides 211 and the central part (z=z3) of the optical-waveguide crossing portion 215 is made larger than the core width w1 of the optical waveguide at the end (z=z1) of the optical-waveguide crossing portion 215 on the side of the input optical waveguides 211 and the core width w3 of the optical waveguide at the central part (z=z3) of the optical-waveguide crossing portion 215 (that is, w1<w2 and w2>w3), and the core width w4 of the optical waveguide at the position (z=z4) between the central part (z=z3) of the optical-waveguide crossing portion 215 and the end (z=z5) of the optical-waveguide crossing portion 215 on the side of the output optical waveguides 214 is made larger than the core width w3 of the optical waveguide at the central part (z=z3) of the optical-waveguide crossing portion 215 and the core width w5 of the optical waveguide at the end (z=z5) of the optical-waveguide crossing portion 215 on the side of the output optical waveguides 214 (that is, w3<w4 and w4>w5).

Owing to such a configuration, there is brought forth the advantage that the higher-order mode and radiation mode of the signal light propagating through the optical-waveguide crossing portion 215 are avoided from being outputted from the output optical waveguide 214 except the desired output port, and a crosstalk characteristic in the crossing portion can be greatly improved.

The planar lightwave circuit shown in FIG. 7 can be fabricated by a procedure as stated below. An under cladding layer of $SiO_2$ is first deposited on an Si substrate by flame hydrolysis deposition or the like, and a core layer of $SiO_2$ glass which is doped with $GeO_2$ as a dopant is subsequently deposited. Next, the core layer is etched by employing a pattern based on the above design as shown in FIG. 7, thereby to fabricate an optical waveguide portion. Lastly, an over cladding layer of $SiO_2$ is deposited again.

The planar lightwave circuit shown in FIG. 7 has been designed with the upper limit of the variation width of the core width of the optical waveguide set at +4.0 μm per unit length (1 μm) in the signal-light propagation direction. The widths of the cores of the input waveguides and output waveguides are 7 μm. The thickness of the core of the waveguide within the planar lightwave circuit is 6 μm.

The z-axial lengths of the mode coupling means 212 and mode re-coupling means 213 are in the order of 100 μm. Since, however, the z-axial lengths of the mode coupling means 212 and mode re-coupling means 213 depend upon the crossing angle 216, they are not strictly determined.

The planar lightwave circuit shown in FIG. 8 is another planar lightwave circuit in this embodiment, and it differs from the planar lightwave circuit shown in FIG. 7, in the point that the upper limit of the variation width of the core width of an optical waveguide has been designed as ±8.0 μm per unit length (1 μm) in a signal-light propagation direction.

By the way, in the case where the core width of the optical waveguide has been varied, a place where the waveguide partly becomes null is sometimes included with the variation of the core width. That is, the planar lightwave circuit in this embodiment has sometimes the mode coupling means 212 and the mode re-coupling means 213 configured of the optical waveguides whose core widths partly become zero, and advantages to be described below can be attained even in such a configuration.

Figure 9:
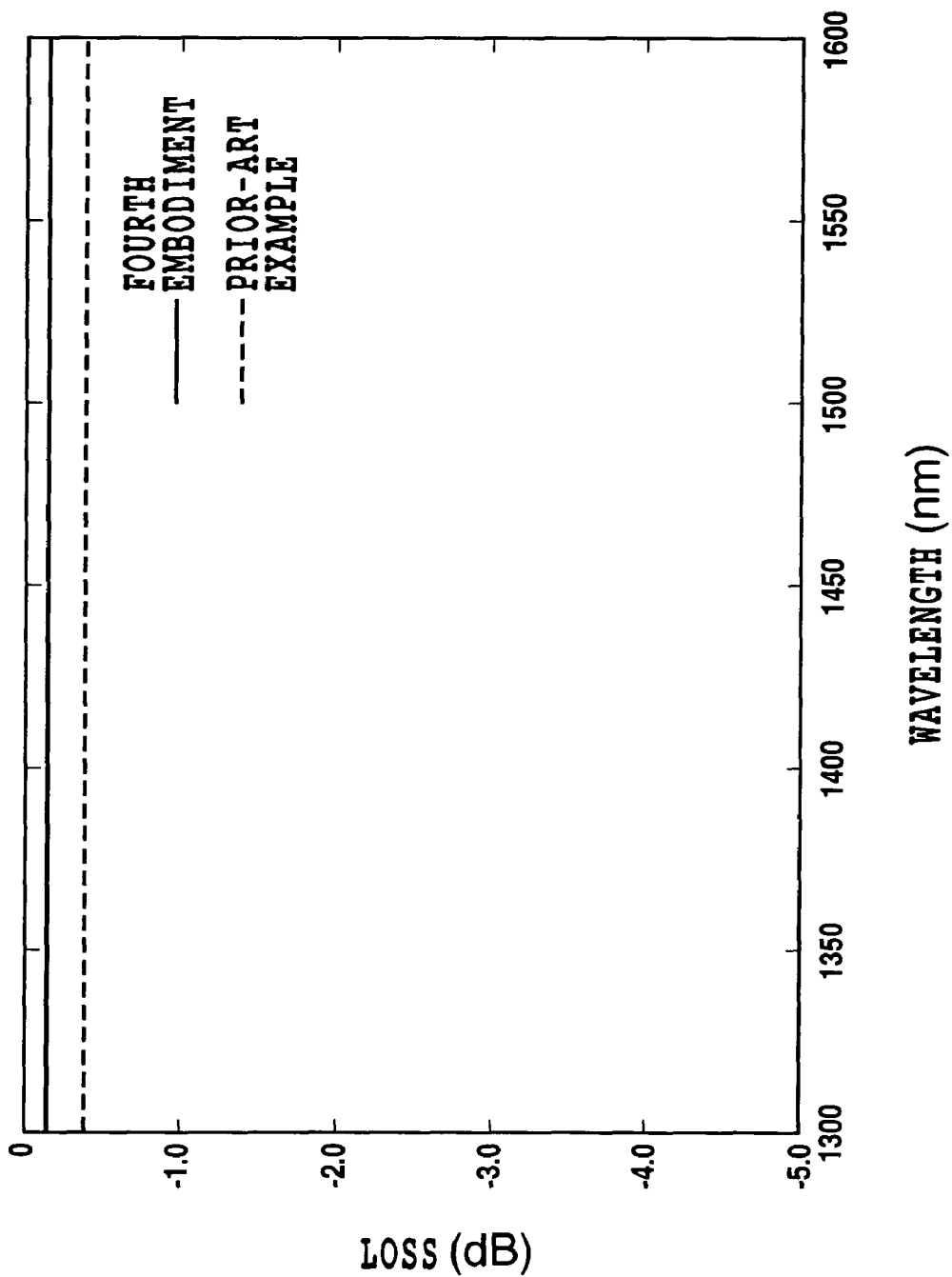
FIG. 9 is a diagram showing the wavelength-dependencies of the propagation losses of cross waveguides in the fourth embodiment and a prior-art example.

Shown in FIG. 9 are the wavelength-dependencies of the propagation losses of signal light in the planar lightwave circuit of the fourth embodiment according to the invention and the cross waveguide of the prior-art example. Regarding the planar lightwave circuit of the fourth embodiment according to the invention, the wavelength-dependency properties of the propagation loss of the signal light was obtained in the planar lightwave circuit configured in such a way that the variation of the core width of the optical waveguide in the mode coupling means as well as the mode re-coupling means was limited within the range of ±8.0 μm per unit length (1 μm) in the signal-light propagation direction. Incidentally, the crossing angle of the cross waveguide was 100. It is seen from FIG. 9 that the propagation loss of the signal light has been lowered to about 0.1 dB in a wavelength band of 1300-1600 nm.

In this manner, even in the case where the variation of the optical waveguide width has been limited within the range of ±8.0 μm per 1 μm in design, the sufficient effect of lowering the optical coupling loss is attained. Besides, although the result in the case of the crossing angle of 10° is shown in FIG. 9, the effect of lowering the optical coupling loss becomes greater as the crossing angle is smaller.

Figure 10:
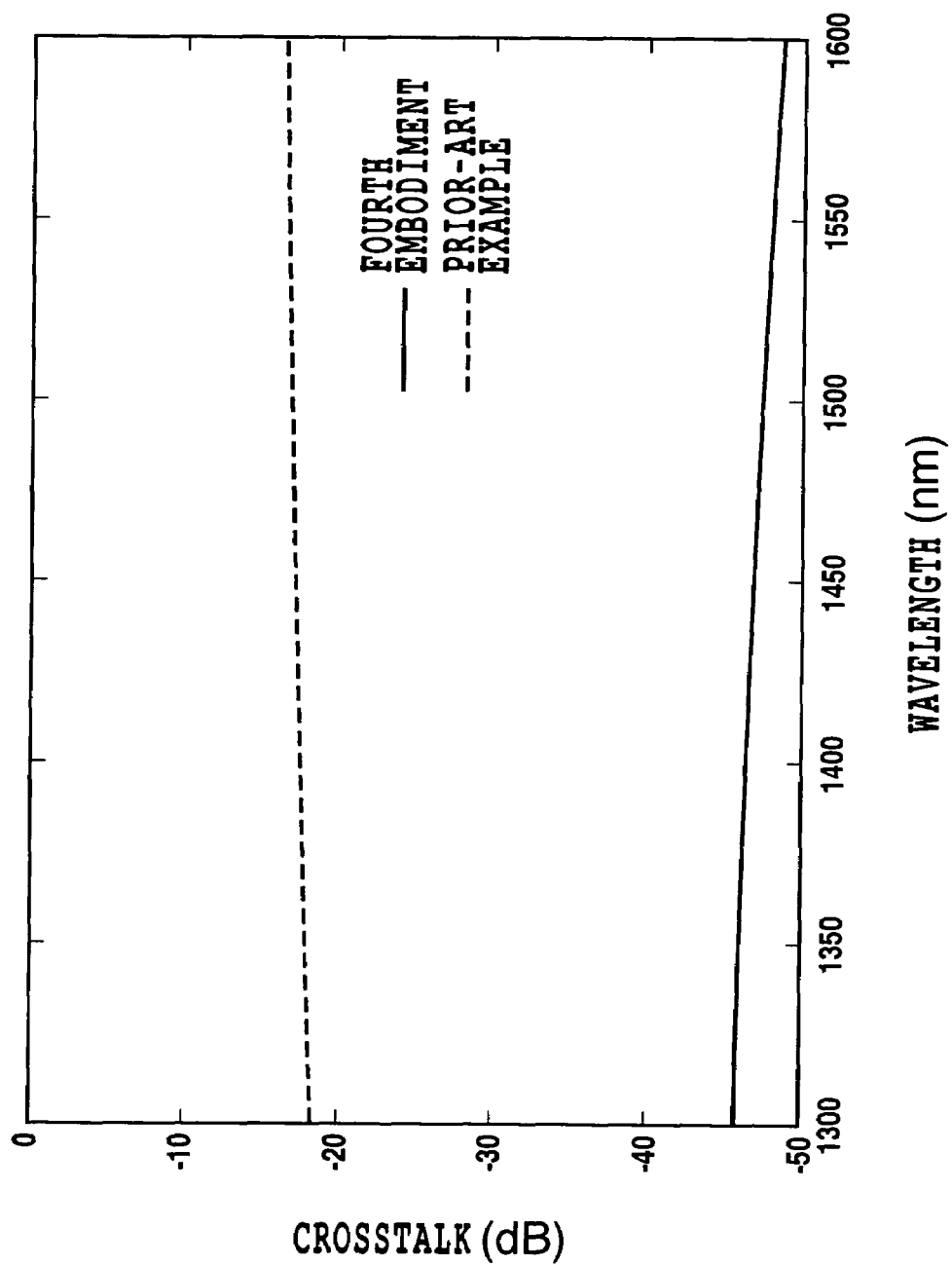
FIG. 10 is a diagram showing the wavelength-dependencies of the crosstalk characteristics of the cross waveguides in the fourth embodiment and the prior-art example.

Shown in FIG. 10 are the wavelength-dependencies of the crosstalk characteristics of the planar lightwave circuit of the fourth embodiment according to the invention and the cross waveguide of the prior-art example. Regarding the planar lightwave circuit of the fourth embodiment according to the invention, the wavelength-dependency properties of the crosstalk characteristic of the cross waveguide was obtained in the planar lightwave circuit configured in such a way that the variation of the core width of the optical waveguide in the mode coupling means as well as the mode re-coupling means was limited within the range of ±8.0 μm per unit length (1 μm) in the signal-light propagation direction. Incidentally, the crossing angle of the cross waveguide was 10°.

It is seen from FIG. 10 that the crosstalk has been improved to about 45-49 dB in a wavelength band of 1300-1600 nm. In this manner, even in the case where the variation of the optical waveguide width has been limited within the range of ±8.0 μm per 1 μm in design, the sufficiently favorable crosstalk characteristic is attained. Besides, although the result in the case of the crossing angle of 10° is shown in FIG. 10, an effect on the enhancement of the crosstalk characteristic becomes greater as the crossing angle is smaller. Concretely, it has been verified that, also in a case where the crossing angle is 3°, a sufficient effect of lowering the optical coupling loss is attained.

Further, in this embodiment, even in a case where the crossing angle is 90° or wider, a sufficient effect of lowering the optical coupling loss can be attained. In a case, for example, where the crossing angle 216 is set at 150°-177° (that is, the supplementary angle of the crossing angle 216 is set at 3°-30°) in FIG. 7 or FIG. 8, a sufficient effect of lowering the optical coupling loss can be attained as in a case where the crossing angle 216 is set at 3°-30°.

As described above, in the prior-art cross waveguide, in the case where the crossing angle is 30° or narrower, the optical coupling loss in the crossing portion is high, and the crosstalk characteristic is inferior, whereas with the invention, even in the case where the crossing angle is 30° or narrower, the optical coupling loss can be lowered, and the crosstalk characteristic can be improved. Although this is not restrictive, the invention can provide the planar lightwave circuit having the cross waveguide whose crossing angle lies in, for example, the range of 3-30° or 150°-177°.

Fifth Embodiment

Next, the fifth embodiment will be described with reference to FIGS. 12 and 13.

Figure 12:
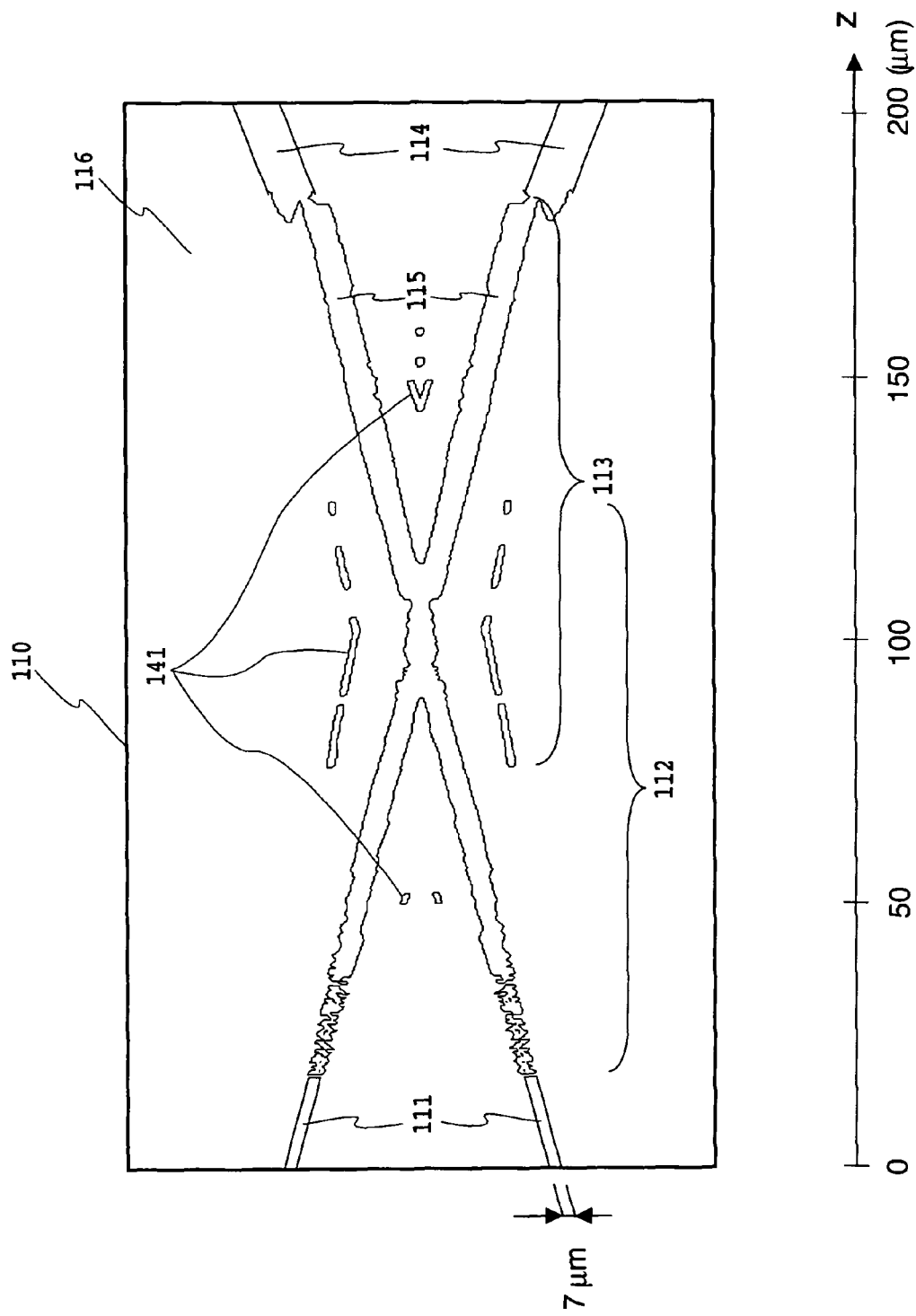
FIG. 12 is a configurational view of a crossing planar lightwave circuit in a fifth embodiment.

FIG. 12 is a plan view in which a crossing planar lightwave circuit in the fifth embodiment according to the present invention is seen in a direction perpendicular to a substrate. Here, the cross waveguide is supposed in FIG. 12, and this is because the planar lightwave circuit according to the invention functions for the lowering of a crossing loss very effectively. However, the planar lightwave circuit according to the invention is not restricted to this embodiment, but it can be configured as a planar lightwave circuit having another function, such as optical multiplexing/demultiplexing.

As shown in FIG. 12, the cross waveguide (planar lightwave circuit) according to the fifth embodiment is configured of two input optical waveguides 111, mode coupling means 112 for coupling part of signal light inputted to the input optical waveguide 111, to a higher-order mode and a radiation mode, mode re-coupling means 113 for re-coupling the higher-order mode and the radiation mode optically coupled in the mode coupling means 112, to output signal light in consideration of phases, two output optical waveguides 114 which output the output signal light optically re-coupled in the mode re-coupling means 113, and one or more insular core portions 141 which have refractive indices equal to the refractive index of a core.

The mode coupling means 112 and the mode re-coupling means 113 are configured of optical waveguides whose widths are varied aperiodically smoothly.

Besides, as shown in FIG. 12, in the cross waveguide (planar lightwave circuit) according to the fifth embodiment, not only the widths of the cores of the optical waveguides are varied, but also one or more insular core portions 141 equal in the refractive index to the cores can be caused to exist sporadically at parts outside those cores of the optical waveguides in which the phase difference between $\Psi$ and $\Phi^*$ is minimized. Further, a portion where the width of the core of the waveguide becomes zero (disappears) can be caused to exist.

Here, $\Psi$ and $\Phi^*$ denote a field (forward propagating light) which is developed in such a way that the field of the signal light inputted from the input optical waveguide 111 is propagated from the side of the input optical waveguide 111 onto the side of the output optical waveguide 114, and a field (backward propagating light) which is developed in such a way that a field obtained by inverting the phase of the field of desired signal light outputted from the output optical waveguide 114 is propagated from the side of the output optical waveguide 114 onto the side of the input optical waveguide 111, respectively.

The modulated core widths of the optical waveguides of the crossing planar lightwave circuit shown in FIG. 12 can be formed by employing the formation method described in the first embodiment.

In this case, in comparison with the case of a configuration which does not include the insular core portions 141, a propagation loss in the case where a signal light wavelength is 1550 nm is greatly improved from 0.3 dB to 0.1 dB.

However, in a case where the sizes of the insular core portions 141 equal in the refractive index to the cores are small, there is involved the problem that the fabrication of the planar lightwave circuit becomes difficult. Moreover, in a case where the sizes are excessively small, the signal light passes through the insular core portions, and hence, the improvement of the characteristics of the planar lightwave circuit cannot be expected. Accordingly, the length of one side of each insular core portion 141 equal in the refractive index to the core needs to be made greater than about 1/10 of the wavelength of the signal light and less than about 1 μm in order that the characteristic of the planar lightwave circuit which is fabricated by employing the existing fabrication process may be enhanced by the above configuration. In a case, for example, where the wavelength of the signal light is 1.55 μm, the length of one side of each insular core portion 141 needs to be about 0.15 μm. Also when such a condition is attached, a sufficiently favorable characteristic can be attained.

Figure 13:
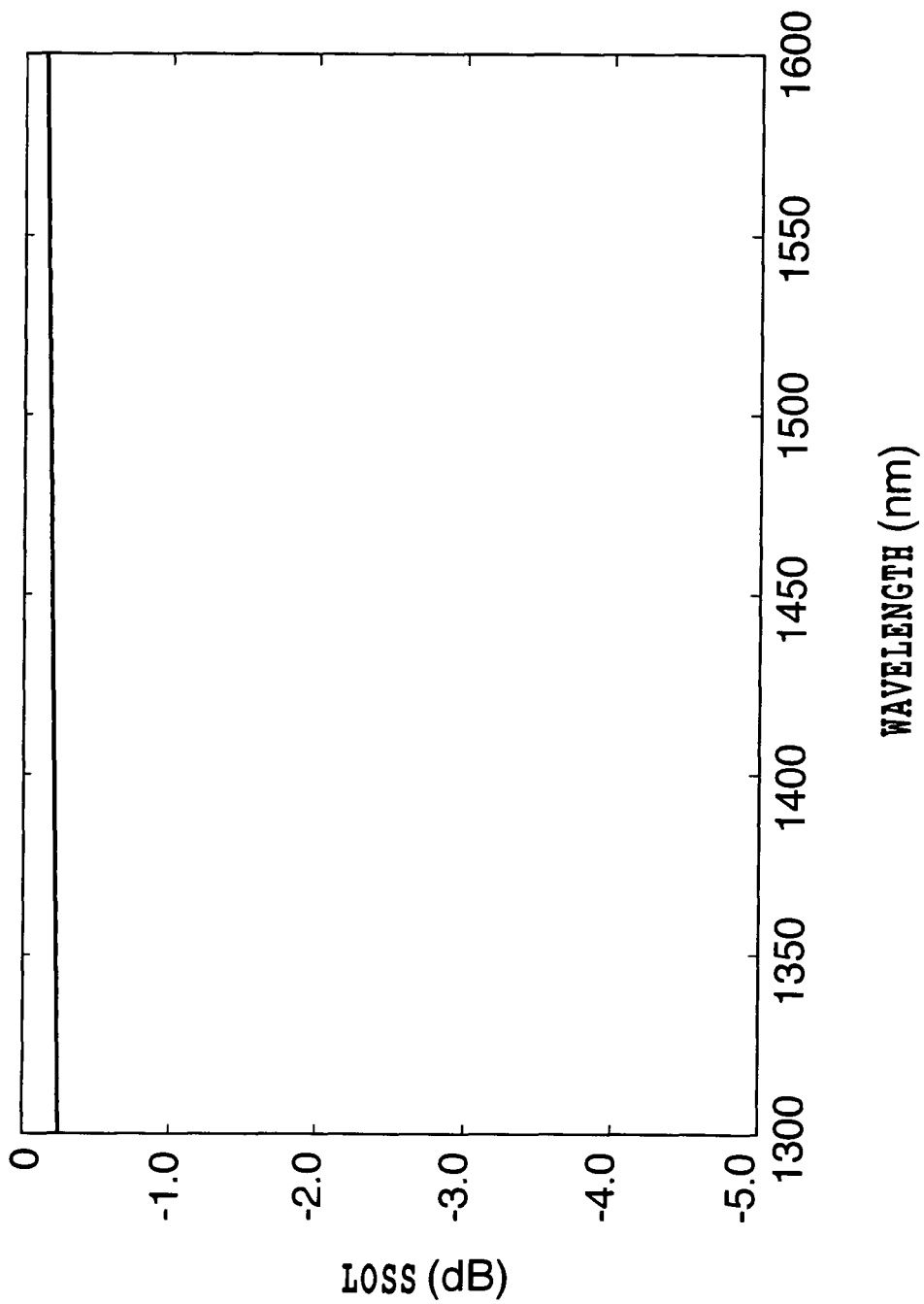
FIG. 13 is a diagram showing the wavelength-dependency properties of the propagation loss of the signal light of the crossing planar lightwave circuit in the fifth embodiment.

FIG. 13 shows the wavelength-dependency properties of the propagation loss of signal light inputted to one port of the input optical waveguides 111, in the case where the planar lightwave circuit according to the invention has been fabricated as the cross waveguide. It is seen from FIG. 13 that the propagation loss of the signal light has been lowered to about 0.1 dB in a wavelength band of 1300-1600 nm.

Sixth Embodiment

Next, the sixth embodiment according to the present invention will be described with reference to FIG. 14.

A cross waveguide (planar lightwave circuit) according to the sixth embodiment is a modification to the cross waveguide (planar lightwave circuit) according to the fifth embodiment.

Figure 14:
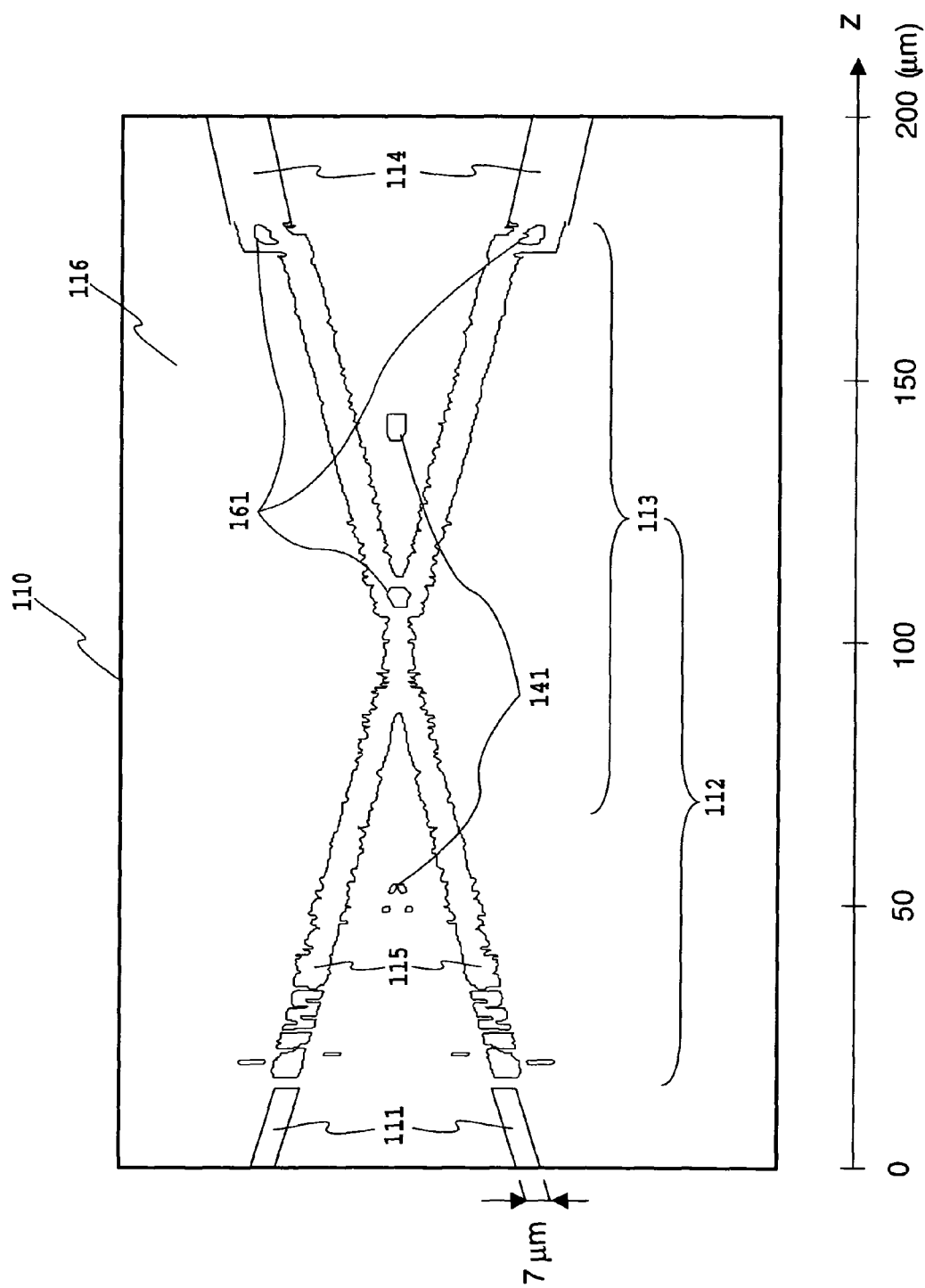
FIG. 14 is a view representing the configuration of a crossing planar lightwave circuit in a sixth embodiment.

FIG. 14 is a plan view in which a cross waveguide (planar lightwave circuit) according to the sixth embodiment is seen in a direction perpendicular to a substrate. Here, the cross waveguide is supposed in FIG. 14, and this is because the planar lightwave circuit according to the invention functions for the lowering of a crossing loss very effectively. However, the planar lightwave circuit according to the invention is not restricted to this example, but it can be configured as a planar lightwave circuit having another function, such as optical multiplexing/demultiplexing.

The crossing planar lightwave circuit shown in FIG. 14 is configured of two input optical waveguides 111, mode coupling means 112 for coupling part of a signal inputted to the input optical waveguide 111, to a higher-order mode and a radiation mode, mode re-coupling means 113 for re-coupling the higher-order mode and the radiation mode optically coupled in the mode coupling means 112, to output signal light in consideration of phases, two output optical waveguides 114 which output the output signal light optically re-coupled in the mode re-coupling means 113, one or more insular core portions 141 which have refractive indices equal to the refractive index of a core, and one or more insular clad portions 161 which have refractive indices equal to the refractive index of a clad.

Besides, as shown in FIG. 14, in the crossing planar lightwave circuit according to the sixth embodiment, not only the widths of the cores of the optical waveguides are varied, but also one or more insular clad portions 161 equal in the refractive index to the clads can be caused to exist sporadically inside those cores of the optical waveguides in which the above phase difference between $\psi$ and $\Phi^*$ is minimized.

Here, $\Psi$ and $\Phi^*$ denote a field which is developed in such a way that the field of signal light inputted from the input optical waveguide 111 is propagated in a forward direction from the side of the input optical waveguide 111, and a field which is developed in such a way that a field obtained by inverting the phase of the field of desired signal light outputted from the output optical waveguide 114 is propagated in a backward direction from the side of the output optical waveguide 114, respectively.

In this case, in comparison with the case of a configuration which does not include the insular clad portions 161, a propagation loss in the case where a signal light wavelength is 1550 nm is greatly improved from 0.3 dB to 0.07 dB.

The modulated core widths of the optical waveguides of the crossing planar lightwave circuit shown in FIG. 14 can be formed by employing the formation method described in the first embodiment.

However, in a case where the sizes of the insular clad portions 161 equal in the refractive index to the clads are small, there is involved the problem that the fabrication of the planar lightwave circuit becomes difficult. Moreover, in a case where the sizes are excessively small, the signal light passes through the insular clad portions, and hence, the improvement of the characteristics of the planar lightwave circuit cannot be expected. Accordingly, the length of one side of each insular clad portion 161 equal in the refractive index to the clad needs to be made greater than about 1/10 of the wavelength of the signal light and less than about 1 μm in order that the characteristic of the planar lightwave circuit which is fabricated by employing the existing fabrication process may be improved by the above configuration. Also when such a condition is attached, a sufficiently favorable characteristic can be attained.

Incidentally, although one or more insular core portions 141 equal in the refractive index to the cores and one or more insulator clad portions 161 equal in the refractive index to the clads are respectively existent in FIG. 14, they need not exist simultaneously, but a configuration in which only one or more insular clad portions 161 equal in the refractive index to the clads are existent may well be employed.

Seventh Embodiment

The seventh embodiment according to the present invention will be described with reference to FIGS. 15 through 18.

Figure 15:
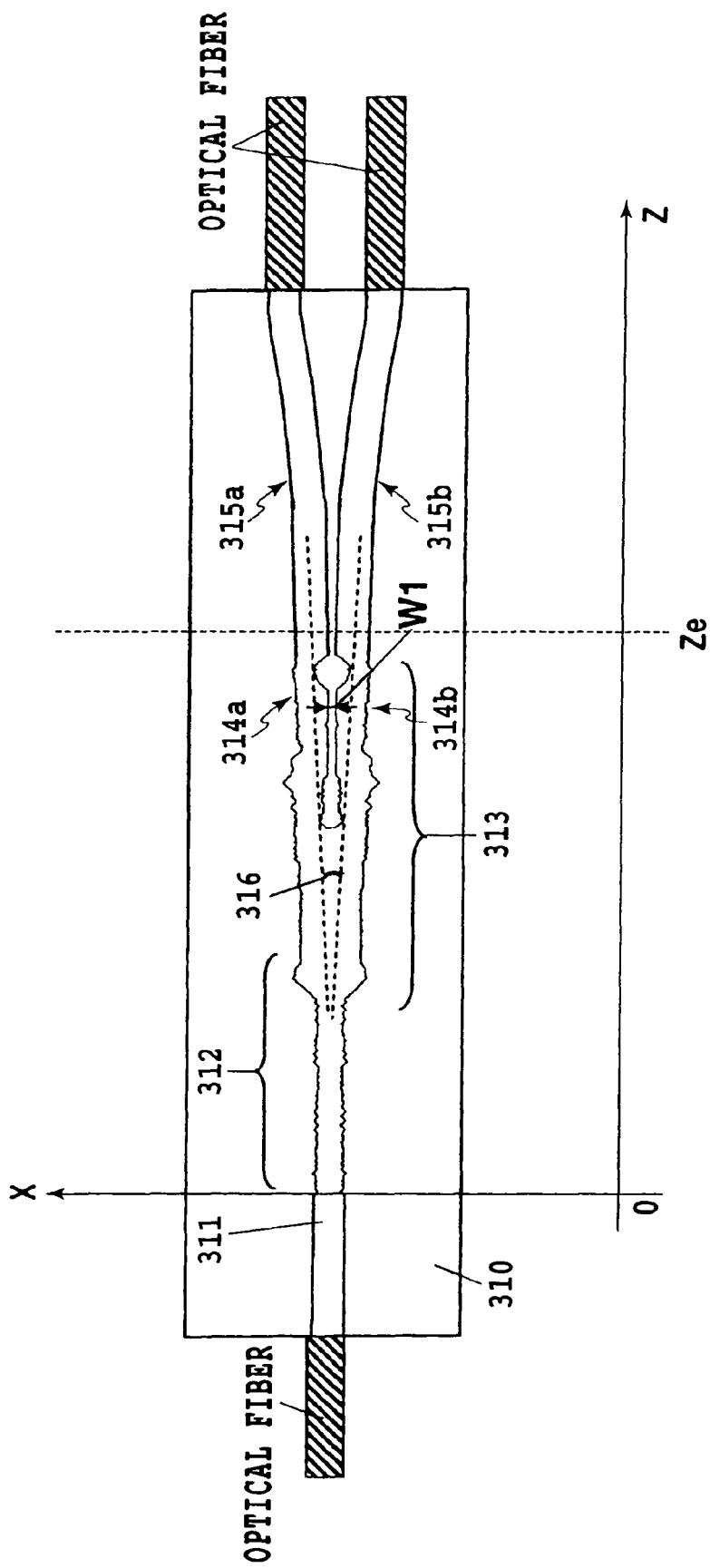
FIG. 15 is a view representing the configuration of an optical branch circuit in a seventh embodiment.

FIG. 15 is a plan view in which an optical branch circuit (planar lightwave circuit) in the seventh embodiment according to the invention is seen in a direction perpendicular to a substrate. A z-axis indicates the propagation direction of signal light. As shown in FIG. 15, the optical branch circuit according to the seventh embodiment is configured of one input optical waveguide 311 to which the signal light is inputted, mode coupling means 312 for coupling part of the signal light inputted to the input optical waveguide 311, to a higher-order mode or a radiation mode, mode re-coupling means 313 for re-coupling the high-order mode or radiation mode optically coupled to the mode coupling means 312, in consideration of phases, at least two branching optical waveguides 314a and 314b which branches the signal light optical coupled to the mode re-coupling means 313, and at least two output optical waveguides 315a and 315b which output the signal light optically coupled to the branching optical waveguides 314a and 314b. Besides, in this embodiment, a crossing angle which is defined between two straight lines passing through the respective centers of the two output optical waveguides 315a and 315b, in a case where the two straight lines are extended onto the side of the input optical waveguide 311, is set as the branching angle 316 of the optical branch circuit. In addition, "w1" indicates the minimum interval between the branching optical waveguides 314a and 314b which adjoin along the signal-light propagation direction in the mode re-coupling means 313.

The input optical waveguide 311 and the two output optical waveguides 315a and 315b are respectively connected to optical fibers which exist outside the optical branch circuit according to the invention. The mode coupling means 312 is configured of an optical waveguide which is continuous from the input waveguide 311, and it is further connected continuously to an optical waveguide in the mode re-coupling means 313. Besides, the optical waveguide in the mode re-coupling means 313 is branched midway, thereby to configure the two or more branching optical waveguides 314a and 314b. The branching optical waveguides 314a and 314b are continuously connected to the output optical waveguides 315a and 315b in the propagation direction of the signal light, respectively. Incidentally, regarding the mode coupling action and the mode re-coupling action, the actions fulfilled by the mode coupling means and the mode re-coupling means change continuously in the vicinity of the boundary part between these means, and hence, the boundary is not definitely defined between the mode coupling means 312 and the mode re-coupling means 313. In FIG. 15, accordingly, the mode coupling means 312 and the mode re-coupling means 313 is illustrated overlapping partly.

In the invention, the optical waveguides in the mode coupling means 312 and the mode re-coupling means 313 are configured so as to have their core widths varied aperiodically, respectively. That is, the invention is characterized in that the optical waveguides of individual portions within an optical branch circuit are not configured only of the straight lines and curves of constant core widths as in the prior-art technique, but that the core widths of the optical waveguides are aperiodically varied. In the optical branch circuit according to the prior-art technique, the optical waveguide has been configured of only a simple shape such as a straight line, a curve or a taper, for the constant core width in order to suppress the development of the higher-order mode causing the variation of a branching ratio. In contrast, the optical branch circuit according to the invention is characterized in that the core width is aperiodically varied, whereby the higher-order mode having been avoided in the prior art is daringly developed and is thereafter re-coupled. That is, as will be described in detail later, the core width of the optical waveguide as is aperiodically varied is evaluated by iterative calculations based on a computer, whereby the shape of a circuit element is designed separately from the existing element shape such as the straight line, curve or taper. Thus, it is possible to realize the optical branch circuit whose optical coupling loss is low, whose branching ratio is stable, and which is much smaller than the prior-art optical branch circuit.

Now, a design method for the optical-waveguide core widths varied aperiodically, in the mode coupling means 312 and the mode re-coupling means 313 shown in FIG. 15 will be described with reference to FIG. 18. The modulated core width of the optical waveguide is determined by applying the fundamental concept of a wave transmission medium. Here, the "wave" which is propagated through the wave transmission medium is "light" because the fundamental concept of the wave transmission medium is applied to the lightwave circuit. A theory concerning the wave transmission medium designates the characteristic of the medium on the basis of a general wave equation, and it can, in principle, hold true of a general wave. Since the use of symbols becomes clearer for describing the design method for the modulated core width of the optical waveguide, the symbols as stated below shall be employed for representing various quantities.

Incidentally, the light (field) to be handled in the design of the branch circuit of the invention is not restricted to light in a single state. Therefore, light in each individual state shall be generally represented by applying an index j, in order that light in which lights in a plurality of states are superposed may be handleable. In the ensuing description, as shown in FIG. 15, the coordinate axis of the propagation direction of the light will be assumed the z-axis (z=0 corresponds to a plane of incidence, while $z=z_e$ corresponds to a plane of emergence), and a coordinate axis in a direction which is perpendicular to the propagation direction of the light and which is parallel to the formation surface of the optical branch circuit will be assumed an x-axis.

$\psi^j(x)$: jth incident field (which is a complex vector value function, and which is stipulated by an intensity distribution and a phase distribution to be set at the plane of incidence (z=0), and wavelengths and polarizations)

$\phi^j(x)$: jth emergent field (which is a complex vector value function, and which is stipulated by an intensity distribution and a phase distribution to be set at the plane of emergence ($z=z_e$), and wavelengths and polarizations)

Incidentally, unless intensity amplification, wavelength conversion and polarization conversion are performed in the lightwave circuit, the summation of the light intensities of $\psi^j(x)$ and $\phi^j(x)$ is the same (or is attended with a negligible loss), and the wavelengths and polarizations of $\psi^j(x)$ and $\phi^j(x)$ are the same.

$\{\psi^j(x), \phi^j(x)\}$: input/output pair (set of input/output fields)

$\{\psi^j(x), \phi^j(x)\}$ is stipulated by the intensity distributions and phase distributions at the plane of incidence and the plane of emergence, and the wavelengths and the polarizations.

$\{n_q\}$: refractive index distribution (set of the values of the whole lightwave-circuit design region)

When one refractive index distribution is given to the given incident field and emergent field, the field of light is determined, and hence, it is necessary to consider a field for the whole refractive index distribution given by the qth iterative calculation. Therefore, the whole refractive index distribution may well be represented as $n_q(z, x)$ where (z, x) denotes an indeterminate variable, but it shall be represented as $\{n_q\}$ in order to distinguish it from the value $n_q(z, x)$ of a refractive index in a place (z, x).

$\psi^j(Z, x, \{n_q\})$: Field value in the place (z, x), in the case where the jth incident field $\psi^j(x)$ has been propagated to $\underline{z}$ in the refractive index distribution $\{n_q\}$.

$\phi^j(z, x, \{n_q\})$: Field value in the place (z, x), in the case where the jth emergent field $\phi^j(x)$ has been propagated backwards to $\underline{z}$ in the refractive index distribution $\{n_q\}$.

In this embodiment, the refractive index distribution $\{n_q\}$ is given so that the core width of the optical waveguide may become $\psi^j(z_e, x, \{n_q\}) = \phi^j(x)$ for all j's, or a state close thereto. An "input port" and an "output port" are regions where fields are concentrated at an incident end face (z=0) and an emergent end face ($z=z_e$), respectively. By way of example, they are regions where light intensities can be propagated to optical fibers by connecting the fibers to the corresponding parts. Here, the intensity distributions and phase distributions of fields can be designed so as to differ between the jth and kth ones, so that a plurality of ports can be provided at each of the incident end face and emergent end face. Further, in a case where the set of the incident field and emergent field is considered, a phase difference which is developed by the propagation between the incident end face and the emergent end face differs depending upon the frequency of light. Regarding lights of different frequencies (that is, lights of different wavelengths), therefore, different ports can be set irrespective of whether field shapes including phases are the same or orthogonal.

Here, an electromagnetic field is a field of real-number vector value, and it has a wavelength and a polarized state as parameters, but the values of its components shall be indicated by a complex number easy of general mathematical handling, and the solution of an electromagnetic wave shall be represented by the complex number. Besides, it is assumed in the ensuing computations that the intensity of the whole field is normalized to 1 (one).

For the jth incident field $\psi^j(x)$ and emergent field $\phi^j(x)$, a propagation field and a backward propagation field shall be represented as $\psi^j(z, x, \{n\})$ and $\phi^j(z, x, \{n\})$ as the complex vector value functions of each place. The values of these functions change depending upon the refractive index distribution $\{n\}$, and therefore have the refractive index distribution $\{n\}$ as a parameter. $\psi^j(x) = \psi^j(0, x, \{n\})$ and $\phi^j(x) = \phi^j(z_e, x, \{n\})$ hold good in accordance with the definitions of the symbols. The values of these functions can be easily computed by a known technique such as beam propagation method, when the incident field $\psi^j(x)$, emergent field $\phi^j(x)$ and refractive index distribution {n} are given. An algorithm for determining a spatial refractive index distribution will be described below.

Figure 18:
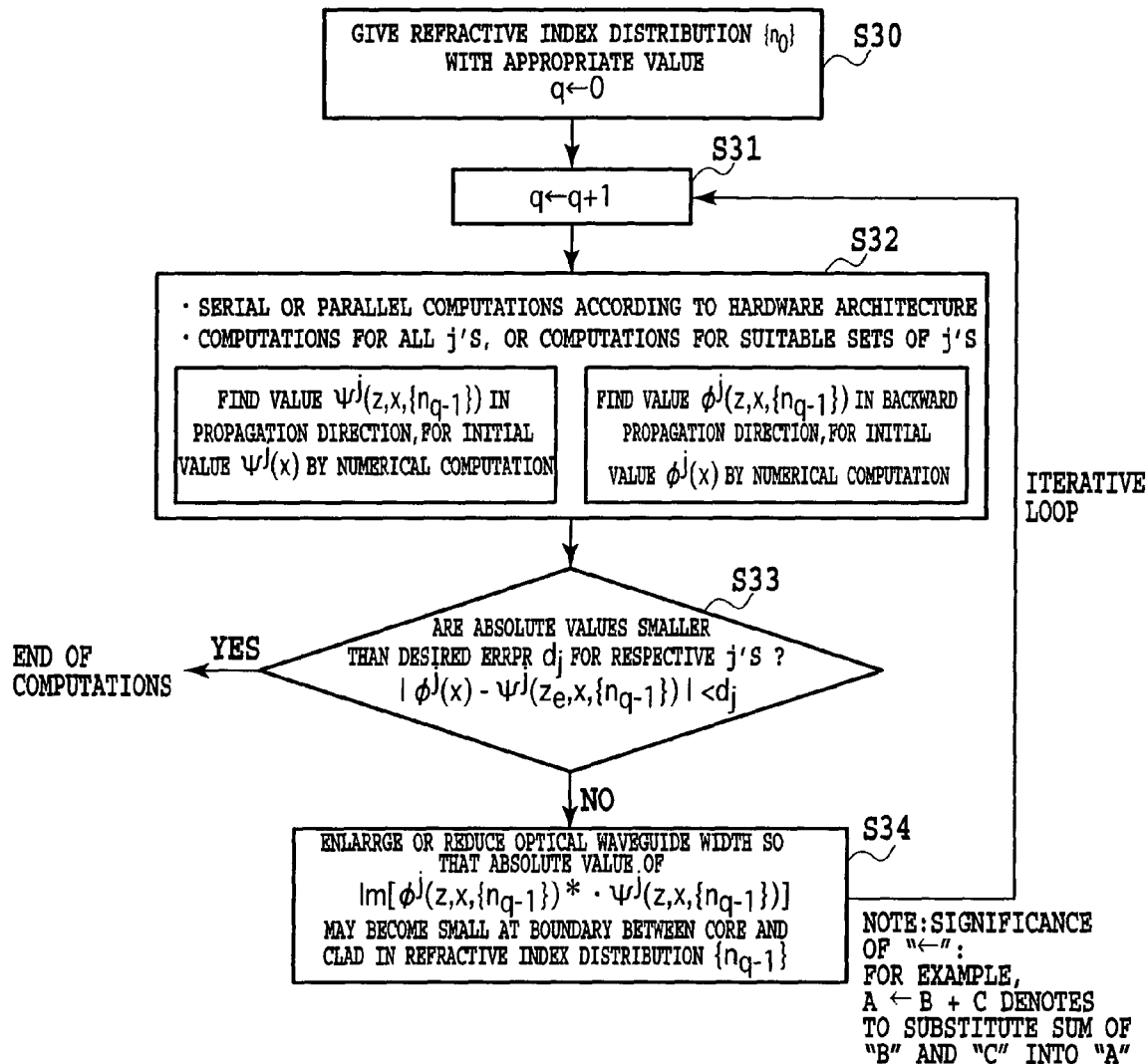
FIG. 18 is a flow chart showing a computation procedure for determining the refractive index distribution of the optical branch circuit in the seventh embodiment.

FIG. 18 shows a computation procedure for determining the spatial refractive index distribution of a wave transmission medium. Since the computations are iteratively executed, the number of times of the iterations is indicated by q, and the situation of the qth computation after the computations up to the (q−1)th one have been executed is illustrated in the computation procedure of FIG. 18. The propagation field and the backward propagation field are evaluated by numerical computations for the jth incident field $\psi^j(x)$ and emergent field $\phi^j(x)$, on the basis of the refractive index distribution $\{n_{q-1}\}$ obtained by the (q−1)th computation, and the results are respectively represented as $\psi^j(z, x, \{n_{q-1}\})$ and $\phi^j(z, x, \{n_{q-1}\})$ (step S32). On the basis of these results, the optical waveguide width is enlarged or reduced so as to minimize the value corresponding to the phase difference, in accordance with the refractive index $n_q(z, x)$ in each place (z, x) as is evaluated by the following formula (step S34):

$$n_q(z,x)=n_{q-1}-\alpha\Sigma_j Im[\phi^j(z,x,\{n_{q-1}\})^* \cdot \psi^j(z,x,\{n_q\})] \quad (1)$$

Here, the above formula (1) is the same as Formula (1) described in connection with the fourth embodiment, and symbol "·" in the second term of the right side signifies an inner product calculation, while "Im[ ]" signifies the imaginary part of the result of the field inner-product calculation within [ ]. Incidentally, symbol "*" denotes a complex conjugate. A coefficient α has a value obtained in such a way that a value smaller than several tenths of $n_q(z, x)$ is further divided by the number of the sets of fields. "$\Sigma_j$" signifies to take a sum for the indices j's. The steps S32 and S34 are iterated, and the computation is ended when the absolute value of the difference between the value $\phi^j(z_e, x, \{n\})$ and the emergent field $\phi^j(x)$ at the emergent plane of the propagation field has become smaller than a desired error $d_j$ (step S33: YES).

In the above computations, the initial values $\{n_o\}$ of the refractive index distribution may be appropriately set, but when the initial values $\{n_o\}$ are close to an expected refractive index distribution, the convergence of the computations quickens to that extent (step S30). Besides, in computing $\phi^j(z, x, \{n_{q-1}\})$ and $\Psi^j(z, x, \{n_{q-1}\})$ for individual j's, a computer capable of computations in parallel may compute for the respective j's (that is, for the respective $\phi^j(z, x, \{n_{q-1}\})$'s and $\Psi^j(z, x, \{n_{q-1}\})$'s), and hence, the computations can be made efficient by employing a cluster system or the like (step S32). Besides, in a case where a computer is configured having a comparatively small memory, it is also possible to select appropriate indices j's from among all the indices j's to-be-handled, at each iterative computation step q in the part of the sum for the indices j's in Formula (1), to compute only $\phi^j(z, x, \{n_{q-1}\})$'s and $\Psi^j(z, x, \{n_{q-1}\})$'s corresponding to the selected indices j's and to iterate the subsequent computation (step S32).

In a case where the values of $\phi^j(z, x, \{n_{q-1}\})$ and $\Psi^j(z, x, \{n_{q-1}\})$ are close in the above calculation, $Im[\phi^j(z, x, \{n_{q-1}\})^* \cdot \Psi^j(z, x, \{n_{q-1}\})]$ in Formula (1) becomes a value corresponding to the phase difference between the propagation field and the backward propagation field. A desired output can be obtained by decreasing the value of the phase difference. That is, in determining the core width of the optical waveguide, the core width may be enlarged or reduced so that the value of $Im[\phi^j(z, x, \{n_{q-1}\})^* \cdot \Psi^j(z, x, \{n_{q-1}\})]$ may become smaller at the interface between the core and the clad in the refractive index distribution of the (q−1)th computed result (step S34).

The above calculation contents based on the general wave equation in the wave transmission medium are summarized as stated below, from the viewpoint of determining the core width of the optical waveguide in the optical branch circuit according to the invention. $\Psi$ is let denote a field (forward propagating light) which is developed in such a way that the field of signal light inputted from the input port of the input optical waveguide 311 is propagated from the side of the input optical waveguide 311 onto the side of the output optical waveguide 315, while $\phi^*$ is let denote a field (backward propagating light) which is developed in such a way that a field obtained by inverting the phase of the field of desired signal light outputted from the desired output port of the output optical waveguide 315 is propagated from the side of the output optical waveguide 315 onto the side of the input optical waveguide 311. Here, let's consider a case where the number of the output ports of the optical branch circuit to be designed is N. The design of the optical branch circuit is permitted in such a way that the desired emergent fields at the respective output ports are superposed N times in consideration of output port positions, and that the superposed fields are set as the desired field at the emergent end face. On this occasion, when a refractive index distribution in which the phase difference between the forward propagating light $\Psi$ and the backward propagating light $\phi^*$ is minimized at each position of the z-axis shown in FIG. 15 is given, an optimal lightwave circuit for converting the inputted signal light into the desired output signal lights respectively outputted from the N output ports can be configured.

More concretely, the phase difference ($\Psi-\phi^*$) of the forward propagating light and the backward propagating light at the interface between the core and the clad is computed at each position of the z-axis shown in FIG. 15. In a case where the phase difference of the forward propagating light and the backward propagating light at the interface between the core and the clad is positive ($\Psi-\phi^*>0$), the phase difference of $\Psi$ and $\phi^*$ can be minimized by enlarging the core width of the optical waveguide. On the other hand, in a case where the phase difference of the forward propagating light and the backward propagating light at the interface between the core and the clad is negative ($\Psi-\phi^*<0$), the phase difference of $\Psi$ and $\phi^*$ can be minimized by reducing the core width of the optical waveguide.

The lightwave circuit which suppresses the scattering of the wave and in which the propagation loss of the signal light is low, can be designed by varying only the core width of the optical waveguide as stated above.

Here, in a case where the interval between the adjacent branching optical waveguides 314a and 314b becomes narrow due to the variations of the core widths of these optical waveguides, there occurs the problem that the fabrication of the lightwave circuit becomes difficult. Accordingly, the minimum value w1 of the optical-waveguide distance between the adjacent branching optical waveguides 314a and 314b should desirably satisfy w1≧1.0 μm in consideration of the use of the existing lightwave-circuit fabrication process. Besides, in a case where the change of the optical waveguide width is abrupt relative to the signal-light propagation direction, there occurs the problem that the fabrication of the lightwave circuit becomes difficult. Accordingly, the variation of the core width of the optical waveguide should desirably be continuous and smooth. Further, the variation should desirably lie within a range of ±8.0 μm per unit length (1 μm)

in the signal-light propagation direction in consideration of the wavelength of the signal light as stated below.

In general, the wavelength of signal light for use in optical communications lie in a range of 1.3-1.6 µm. Here, in a case where the variation of an optical waveguide width is extraordinarily large in comparison with the wavelength of the signal light, the signal light is scattered in a direction perpendicular to a substrate. For this reason, the propagation loss of the signal light increases. Accordingly, the variation magnitude of the optical waveguide width is effectively set on the order of several times of the wavelength, concretely, within ±8.0 µm in order to excite the higher-order mode and suppress the scattering of the signal light as the characterizing features of the invention. Incidentally, as will be stated later, satisfactory effects are attained even when the variation magnitude of the core width is limited within ±4.0 µm.

The optical branch circuit shown in FIG. 15 was fabricated by a procedure as stated below. An under cladding layer of $SiO_2$ was first deposited on an Si substrate by flame hydrolysis deposition or the like, and a core layer of $SiO_2$ glass which was doped with $GeO_2$ as a dopant was subsequently deposited. Next, the core layer was etched by employing a pattern based on the above design as shown in FIG. 15, thereby to fabricate an optical waveguide portion. Lastly, an over cladding layer of $SiO_2$ was deposited again.

The optical branch circuit shown in FIG. 15 has been designed under the conditions that the upper limit of the variation magnitudes of the core widths of the optical waveguides in the mode coupling means 312 and mode re-coupling means 313 is set at ±4.0 µm per unit length (1 µm) in the signal-light propagation direction, and that the minimum interval w1 of the adjacent optical waveguides in the branching optical waveguides 314a and 314b is set at 1.0 µm, while the branching angle 316 is set at 2.50. The widths of the cores of the input waveguide 311 and output waveguides 315 are 7 µm. The thickness of the core of the waveguide within the optical branch circuit is 6 µm. The refractive index of the core is 1.45523, while the refractive index of the clad is 1.44428. By the way, in the case where the core width of the optical waveguide has been varied, a place where the waveguide partly becomes null is sometimes included with the variation of the core width. That is, the lightwave circuit in this embodiment is sometimes such that the mode coupling means 312 and the mode re-coupling means 313 are configured of the optical waveguides whose core widths partly become zero, and a sufficient effect of lowering an optical coupling loss can be attained even in such a configuration.

Figure 16:
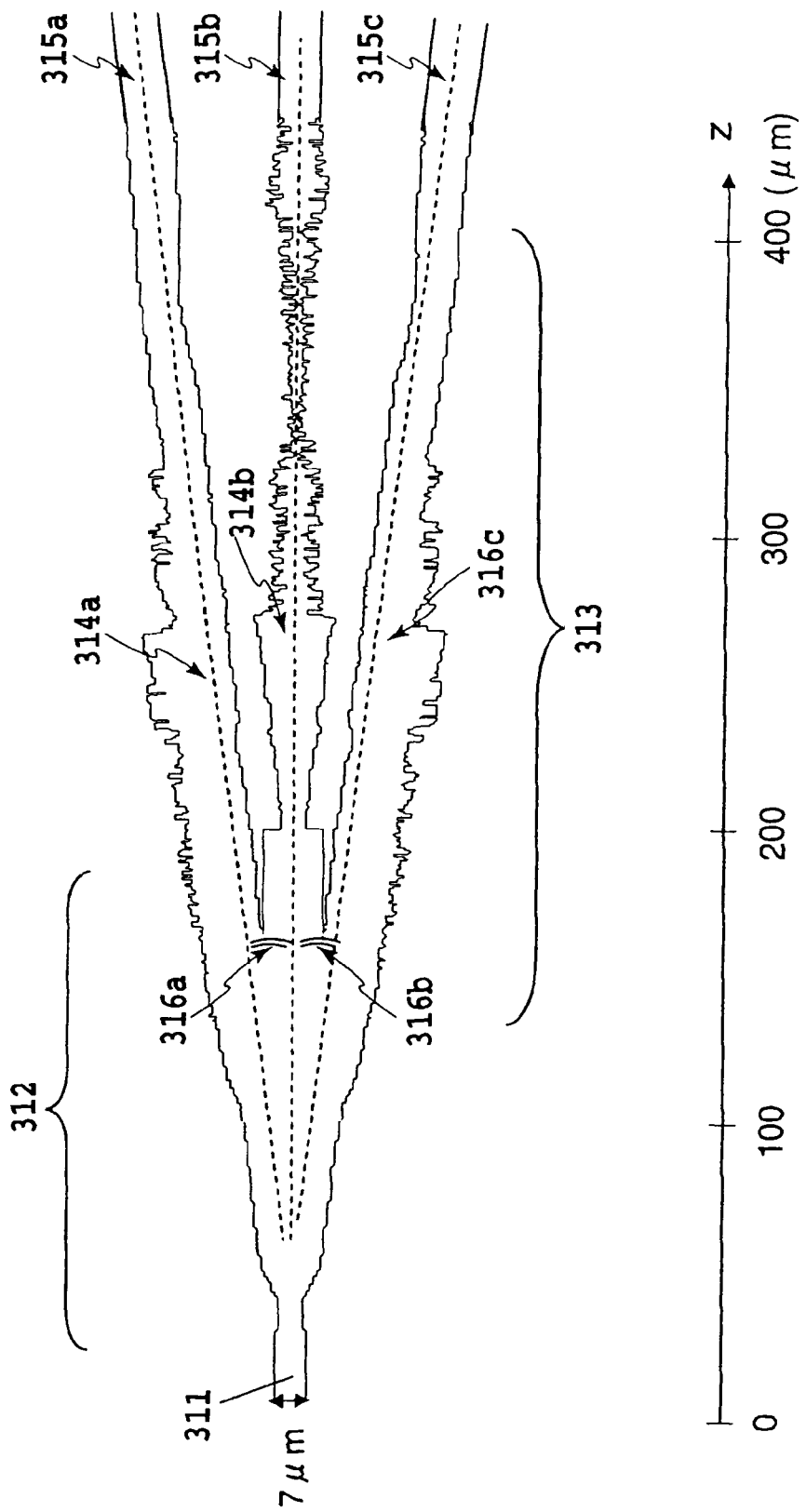
FIG. 16 is a view representing the configuration of another optical branch circuit in the seventh embodiment.

FIG. 16 shows another optical branch circuit in this embodiment. The optical branch circuit differs from the optical branch circuit shown in FIG. 15, in the point that it includes three branching optical waveguides 314a, 314b and 314c and output optical waveguides 315a, 315b and 315c. Incidentally, the cases of the two and three branching optical waveguides and output optical waveguides have been mentioned as the embodiment, but it is needless to say that even a case where the numbers of the branching optical waveguides and output optical waveguides are N can be performed.

Figure 17:
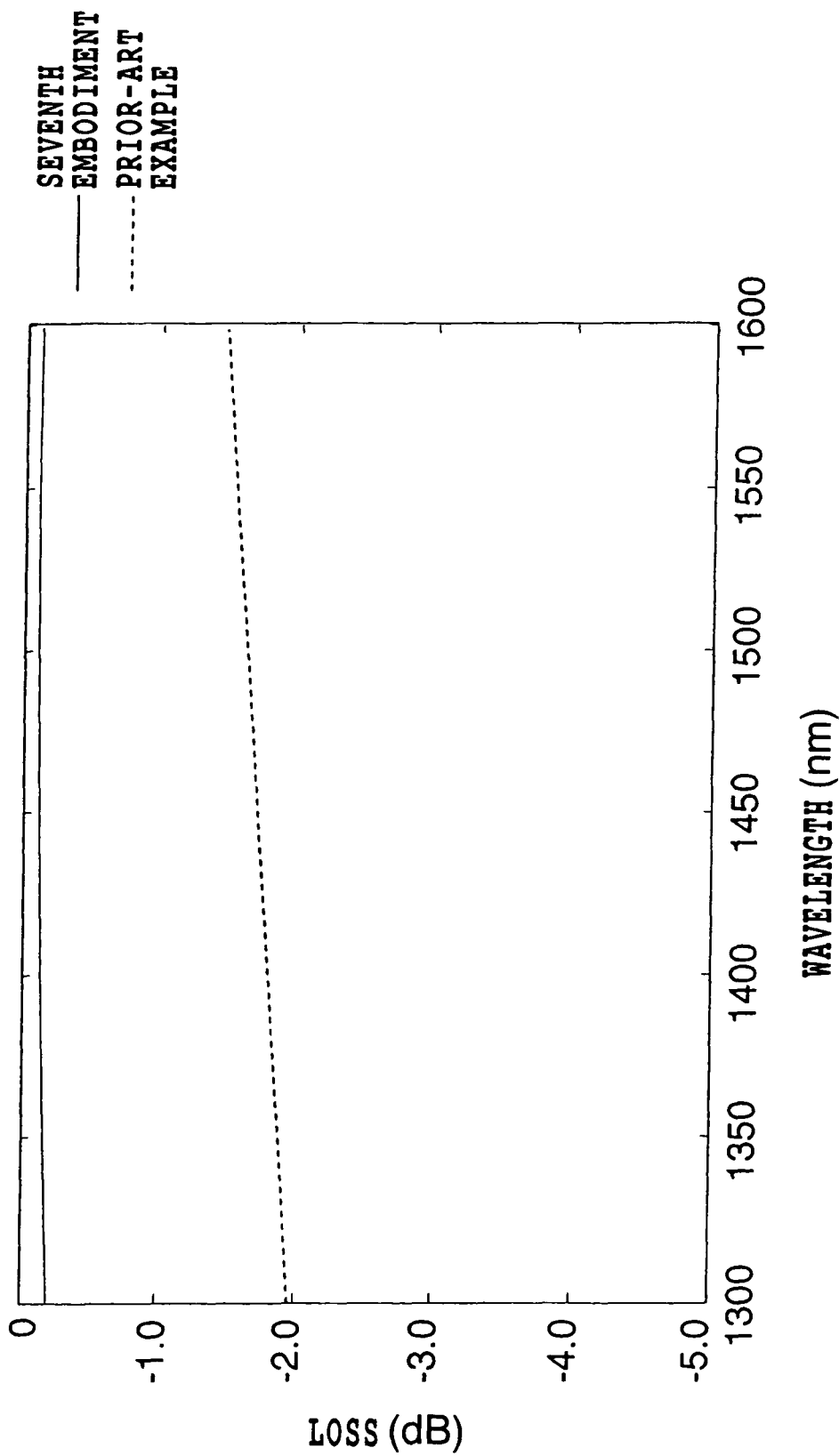
FIG. 17 is a diagram showing the wavelength-dependencies of the propagation losses of the optical branch circuit in the seventh embodiment and an optical branch circuit in a prior-art example.

FIG. 17 shows the wavelength-dependencies of the propagation losses of signal lights in the optical branch circuit of the seventh embodiment according to the invention and the optical branch circuit of the prior-art example. This corresponds to the case of designing the optical branch circuit under the conditions that the variation magnitudes of the core widths of the optical waveguides in the mode coupling means 312 and mode re-coupling means 313 are limited within the range of ±4.0 µm per unit length (1 µm) in the signal-light propagation direction, and that the minimum interval w1 of the adjacent branching optical waveguides 314a and 314b is limited to 1.0 µm. Incidentally, the branching angle 316 of the optical branch circuit is 2.5°.

As seen from FIG. 17, the propagation loss of the signal light is about 0.1 dB in a wavelength band of 1300-1600 nm, and the propagation loss is substantially lowered as compared with that of the optical branch circuit according to the prior-art technique. In this manner, the sufficient effect of lowering the optical coupling loss is attained even in the case where the design condition is limited so as to bring the variation magnitudes of the optical waveguide widths within the range of ±4.0 µm per 1 µm, and where the minimum interval w1 of the adjacent branching optical waveguides 314a and 314b is limited to 1.0 µm. When the variation magnitudes are suppressed within ±4.0 µm, the sharp lowering of the optical coupling loss can be realized by utilizing the prior-art lightwave-circuit fabrication process.

Incidentally, although the core is exemplified as being embedded in the clad, in this embodiment, the advantages of the invention can be satisfactorily attained even with a core of ridge shape.

Eighth Embodiment

Next, the eighth embodiment according to the present invention will be described with reference to FIGS. 19 and 20.

Figure 19:
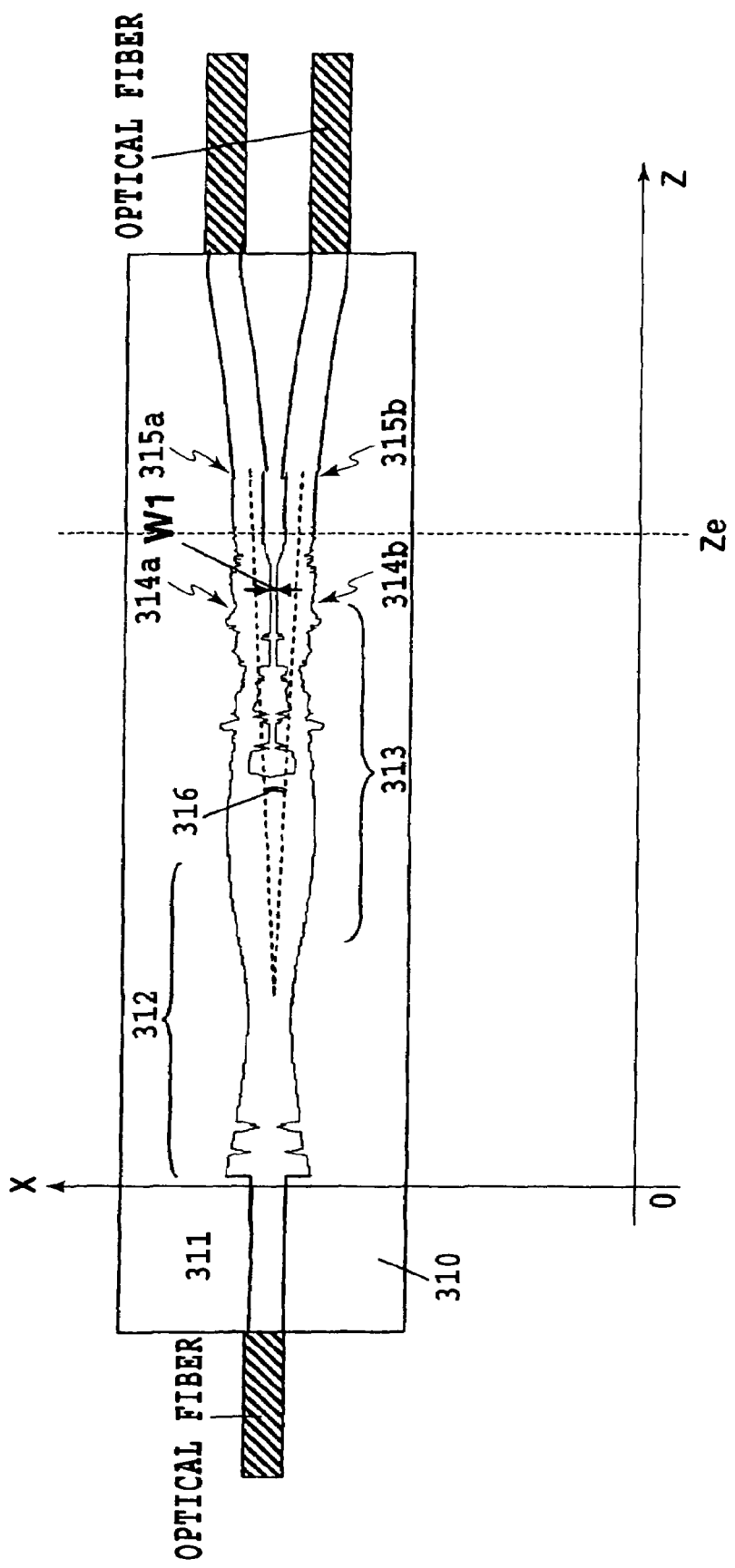
FIG. 19 is a view representing the configuration of an optical branch circuit in an eighth embodiment.

FIG. 19 is a plan view in which an optical branch circuit in the eighth embodiment according to the invention is seen in a direction perpendicular to a substrate. A z-axis indicates the propagation direction of signal light. As shown in FIG. 19, the optical branch circuit according to the eighth embodiment is configured of an input optical waveguide 311, mode coupling means 312, mode re-coupling means 313, at least two branching optical waveguides 314a and 314b, and at least two output optical waveguides 315a and 315b, and the input optical waveguide 311, mode coupling means 312 and mode re-coupling means 313 is endowed with the function of removing the first-order mode contained in the signal light. The core width of each optical waveguide furnished with the first-order mode removal function can be designed by employing the same computation technique as that of the mode coupling means 312 and mode re-coupling means 313 stated in connection with the seventh embodiment. More specifically, when number "0" and number "1" are respectively assigned to the fundamental mode and the first-order mode in the signal light inputted to the input optical waveguide 311, the core width may be enlarged or reduced in the determination of the core width of the optical waveguide so that the value of $\text{Im}[\phi^0(z, x, \{n_{q-1}\})^* \cdot \Psi^0(z, x, \{n_{q-1}\})]$ may become smaller at the interface between the core and the clad in the refractive index distribution of the (q−1)th computed result, and that the value of $\text{Im}[\phi^1(z, x, \{n_{q-1}\})^* \cdot \Psi^1(z, x, \{n_{q-1}\})]$ may become larger.

Here, in a case where the change of the optical waveguide width is abrupt relative to the signal-light propagation direction, there occurs the problem that the fabrication of the lightwave circuit becomes difficult. Accordingly, the variation of the core width of the optical waveguide should desirably be continuous and smooth and lie within a range of ±8.0 µm per unit length (1 µm) in the signal-light propagation direction in consideration of the wavelength of the signal light. Further, even when the variation is limited within ±4.0 µm, satisfactory effects of the invention are attained as stated below. The optical branch circuit shown in FIG. 19 has been fabricated by the same procedure as that of the optical branch circuit shown in the seventh embodiment.

Figure 20:
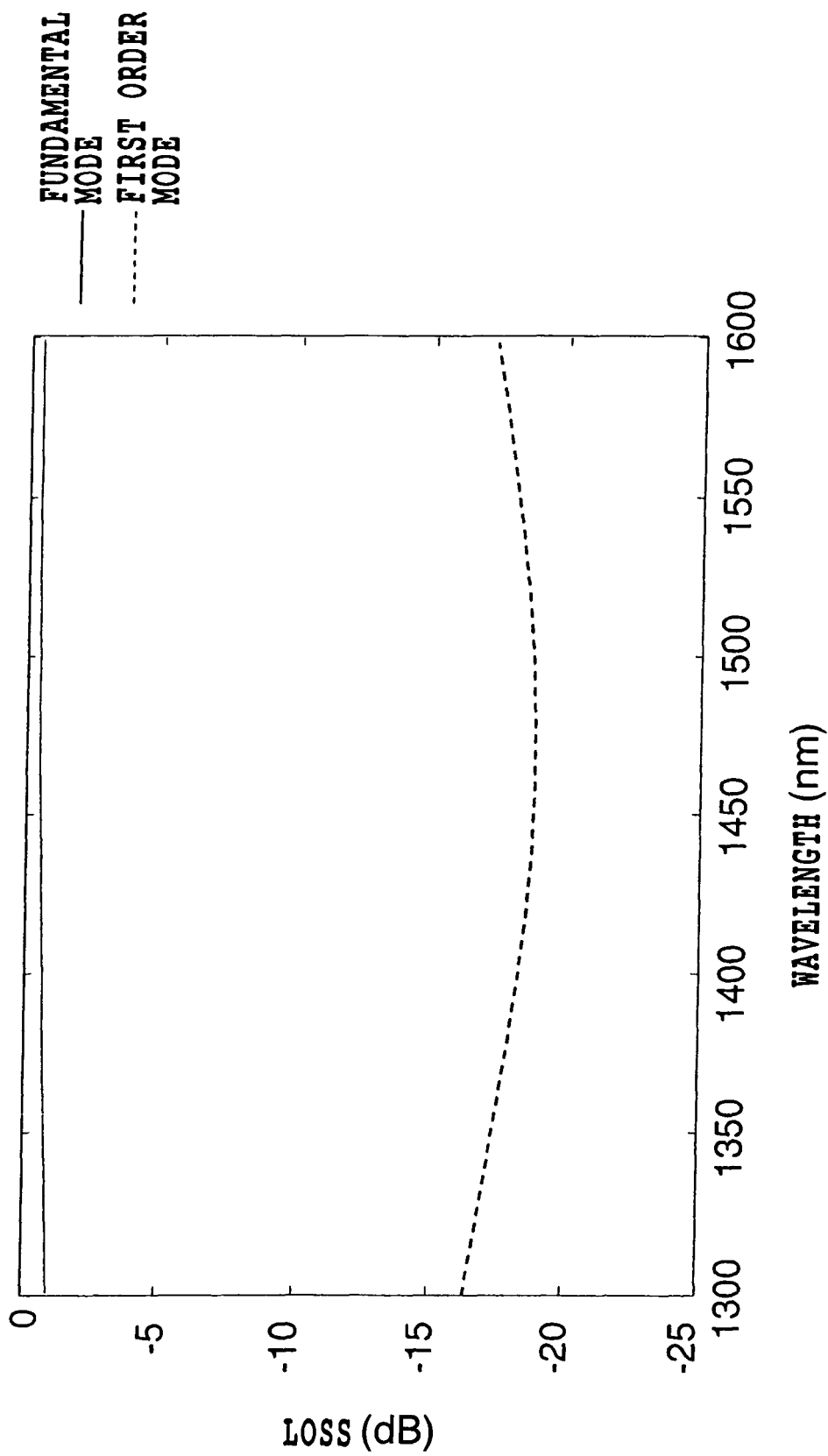
FIG. 20 is a diagram showing the wavelength-dependencies of the propagation losses of the optical branch circuit in the eighth embodiment.

FIG. 20 shows the wavelength-dependencies of the signal-light propagation losses in the cases where signal lights of the fundamental mode and first-order mode of the input optical waveguide 311 were respectively inputted as input signal lights to the optical branch circuit of the eighth embodiment according to the invention. This corresponds to the case of designing the optical branch circuit under the condition that the variations of the core widths of the optical waveguides in the mode coupling means 312 and mode re-coupling means 313 are limited within the range of ±4.0 μm per unit length (1 μm) in the signal-light propagation direction. Incidentally, the branching angle 316 of the optical branch circuit is 2.5°.

It is seen from FIG. 20 that, in the wavelength band of 1300-1600 nm, the propagation loss of the fundamental mode is only about 0.1 dB, whereas the propagation loss of the first-order mode is 16 dB or more. Accordingly, even when the first-order mode is contained in the input signal light to the optical branch circuit, it is sufficiently attenuated by the optical waveguide including the first-order mode removal function. Accordingly, only the fundamental mode is coupled to the output optical waveguides 315a and 315b, with the result that the branching ratio of the optical branch circuit is held constant. In this manner, even when the design condition is limited so as to bring the variation magnitudes of the optical waveguide widths within the range of ±4.0 μm per 1 μm, the first-order mode is sufficiently attenuated, and hence, the effect of stabilizing the branching ratio of the optical branch circuit can be attained in spite of the use of the prior-art lightwave-circuit fabrication process.

Incidentally, although the core is exemplified as being embedded in the clad, in this embodiment, the advantages of the invention can be satisfactorily attained even with a core of ridge shape.

Ninth Embodiment

The ninth embodiment according to the present invention will be described with reference to FIGS. 21 and 22.

Figure 21:
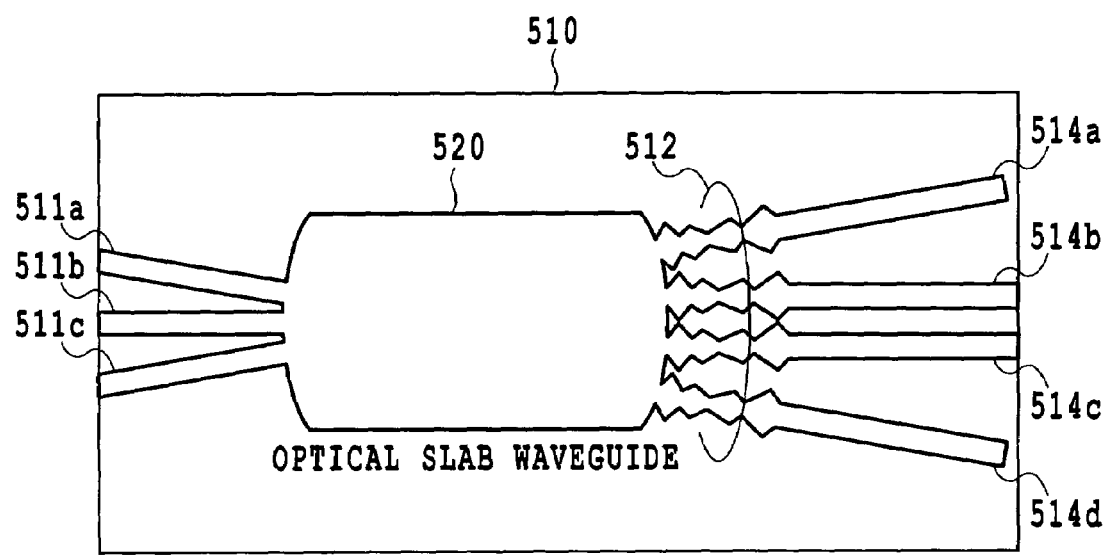
FIG. 21 is a configurational view of a slab type coupler in a ninth embodiment.

FIG. 21 shows the structure of a slab type coupler (planar lightwave circuit) 510 in the ninth embodiment. Three, first input optical waveguides 511a, 511b and 511c, an optical slab waveguide 520, and four, second input/output optical waveguides 514a, 514b, 514c and 514d are arranged on a substrate. Besides, the second input/output optical waveguides are provided with mode coupling regions 512 each of which is based on an optical waveguide having at least one of a core width and height varied continuously.

Here, the slab type optical coupler of this embodiment has been realized by silica-based optical waveguides which are formed on the silicon substrate. This is because the combination can provide a slab type optical coupler of superior reliability. However, the invention is not restricted to this example, but any other combination may, of course, be employed as the combination of the substrate and the optical waveguides.

Besides, the slab type optical coupler of this embodiment has been realized by employing the optical waveguides whose cores and clads exhibit a relative refractive index difference of 0.3%. This is because a slab type optical coupler of low connection losses with optical fibers can be provided by employing the relative refractive index difference. However, the invention is not restricted to this example, but the relative refractive index difference may, of course, have another value such as 0.75% or 1.5%.

Further, in the slab type optical coupler of this embodiment, the number of the first input/output optical waveguides 511 has been set at 3, and that of the second input/output optical waveguides 514 has been set at 4, but the number of the first input optical waveguides 511 may be at least one, and that of the second input/output optical waveguides 514 may be at least 2. By way of example, the number of the first input/output optical waveguides 511 may well be one, and that of the second input/output optical waveguides 514 may well be 16 or 9.

Next, the operation of this embodiment will be described. A light signal inputted to the first input/output optical waveguide 511 is spread in the optical slab waveguide 520, and it is turned into a plane wave whose amplitude is in the shape of a Gaussian distribution, at the end of the optical slab waveguide. The plane wave enters into the second input/output optical waveguides. In this regard, in a conventional slab type coupler which does not have the mode coupling region, part of the light signal is discarded as the higher-order mode or radiation mode of the second input/output waveguides 514 on account of the difference between the shapes of the plane wave and the fundamental mode of the second input/output optical waveguides. Here, in the slab type optical coupler of this embodiment, the second input/output optical waveguides include the mode coupling means. Therefore, even the light signal to be discarded in the prior art is coupled to the fundamental mode and is outputted as the fundamental mode of the second input/output optical waveguides, with the result that a loss can be lowered.

Figure 22:
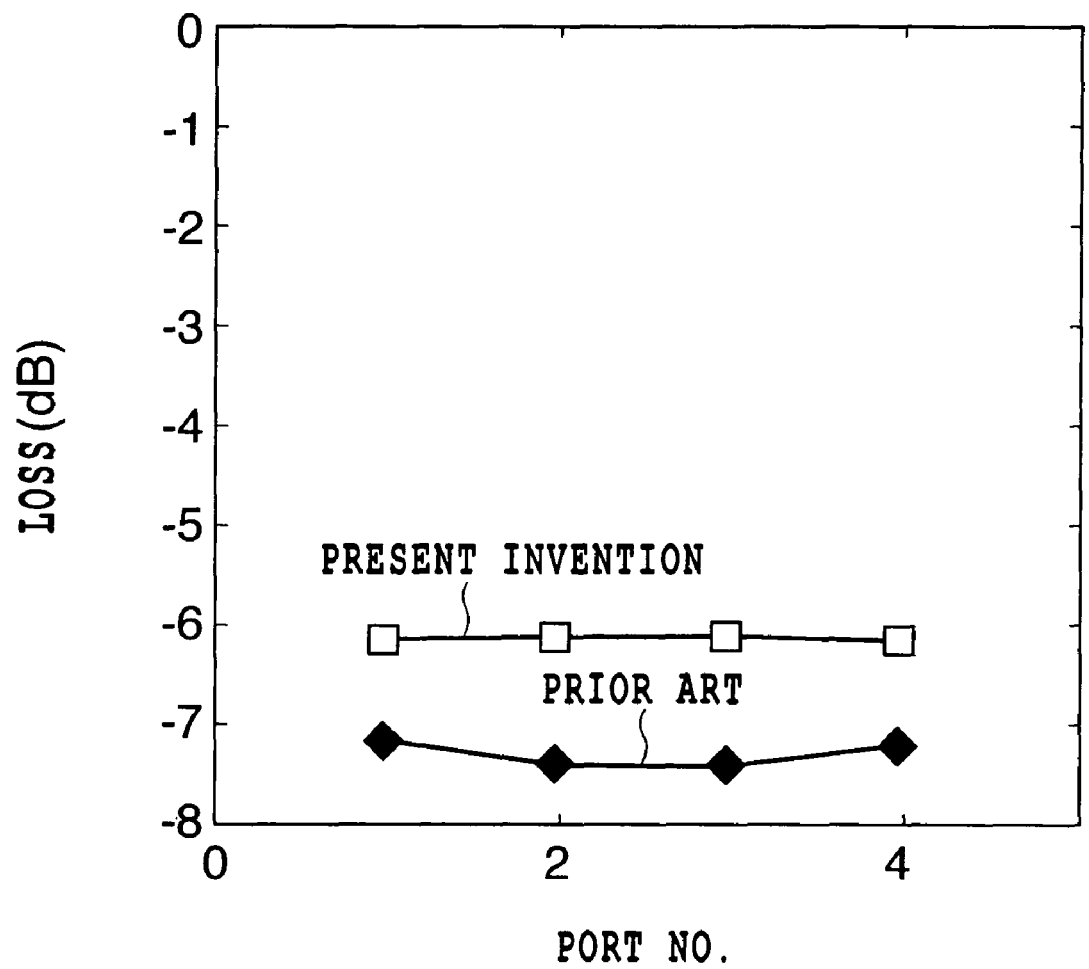
FIG. 22 is a diagram representing the characteristic of the slab type coupler in the ninth embodiment.

FIG. 22 shows the result of the comparison of losses in the slab type optical coupler of this embodiment shown in FIG. 21 and the slab type optical coupler of the prior art. In the configuration of the prior-art slab type optical coupler, the partial signal light is discarded at the connection points between the optical slab waveguide and the second input/output optical waveguides as stated above, and hence, the loss occurs. It has been revealed, however, that the light can be branched with almost no loss in the slab type optical coupler of this embodiment.

Tenth Embodiment

The tenth embodiment according to the present invention will be described with reference to FIGS. 23A, 23B and 23C.

Figure 23A:
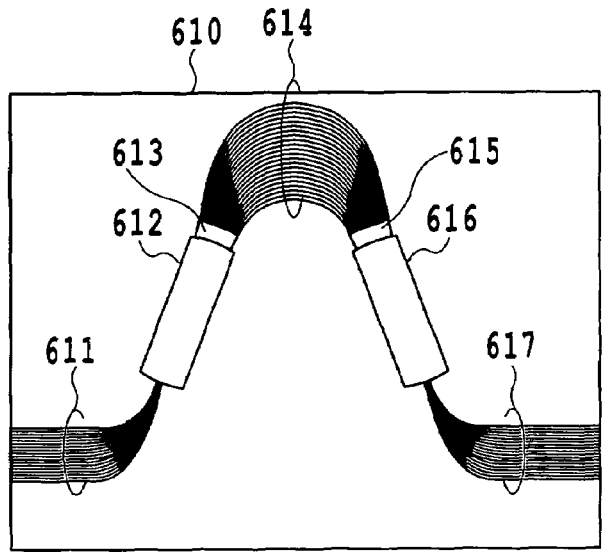
FIG. 23A is a configurational view of an arrayed waveguide grating filter in a tenth embodiment.
Figure 23B:
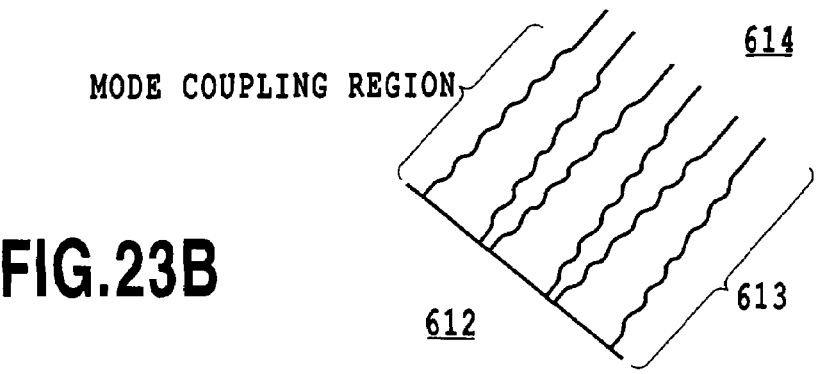
FIG. 23B is an enlarged view of the arrayed waveguide grating filter in the tenth embodiment.
Figure 23C:
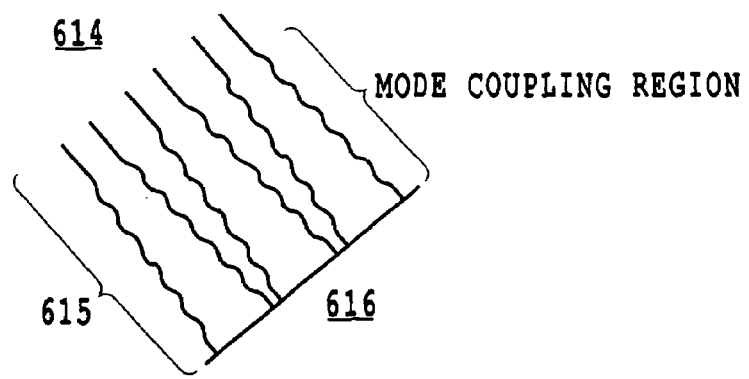
FIG. 23C is an enlarged view of the arrayed waveguide grating filter in the tenth embodiment.

Shown in FIGS. 23A, 23B and 23C is the structure of an arrayed waveguide grating filter (planar lightwave circuit) 610 in the tenth embodiment according to the invention. On a substrate, there are arranged 16 input optical waveguides 611, a first optical slab waveguide 612 which is optically connected to the input optical waveguides, arrayed waveguides 614 which are optically connected to the optical slab waveguide, a second optical slab waveguide 616 which is optically connected to the arrayed waveguides, and 16 output optical waveguides 617 which are optically connected to the optical slab waveguide. Besides, mode coupling regions (FIGS. 23B and 23C) each of which is based on an optical waveguide having at least one of a core width and height varied continuously are respectively disposed at the connection part 613 between the arrayed waveguides 614 and the first optical slab waveguide 612, and the connection part 615 between the arrayed waveguides 614 and the second optical slab waveguide 616.

Here, the arrayed waveguide grating filter of this embodiment has been realized by silica-based optical waveguides which are formed on the silicon substrate. This is because the combination can provide an arrayed waveguide grating filter of superior reliability. However, the invention is not restricted to this example, but any other combination may, of course, be employed as the combination of the substrate and the optical waveguides.

Besides, the arrayed waveguide grating filter of this embodiment has been realized by employing the optical waveguides whose cores and clads exhibit a relative refractive index difference of 0.75%. The reason therefor is that the minimum bending radius of each optical waveguide can be made 5 mm by employing the relative refractive index difference, so an arrayed waveguide grating filter of small size can be provided. However, the invention is not restricted to this example, but the relative refractive index difference may, of course, have another value such as 0.4% or 1.5%.

Further, in the arrayed waveguide grating filter of this embodiment, the number of the first input/output optical waveguides 611 has been set at 16, and that of the second input/output optical waveguides 617 has been set at 16, but the number of the first input/output optical waveguides 611 may be at least one, and that of the second input/output optical waveguides 617 may be at least 2. By way of example, the number of the first input/output optical waveguides 611 may well be one, and that of the second input/output optical waveguides 617 may well be 32 or 40.

Next, the operation of the tenth embodiment according to the invention will be described. A light signal inputted to the first input/output optical waveguide 611 is spread in the first optical slab waveguide 612, and it is turned into a plane wave whose amplitude is in the shape of a Gaussian distribution, at the end of the first optical slab waveguide. The plane wave excites the arrayed optical waveguides 614. In this regard, in a prior-art arrayed waveguide grating filter which does not have the mode coupling region shown in FIG. 23B, part of the light signal is discarded as the higher-order mode or radiation mode of the arrayed waveguides on account of the difference between the shapes of the plane wave and the fundamental mode of the arrayed optical waveguides. Here, in the arrayed waveguide grating filter of this embodiment, the arrayed optical waveguides 614 include the mode coupling region (FIG. 23B). Therefore, even the light signal to be discarded in the prior art is coupled to the fundamental mode and is outputted as the fundamental mode of the second input/output optical waveguides, with the result that a loss can be lowered.

Besides, the light signal propagated through the arrayed waveguides 614 is inputted to the second optical slab waveguide 616. Here, in the conventional arrayed waveguide grating filter which does not have the mode coupling region, inputted light fields assume a shape in which the fundamental modes of the respective arrayed optical waveguides are arrayed, and they have a period corresponding to the pitch of the arrayed waveguides. In the light propagation in the optical slab waveguide, an input field and an output field are in the relation of Fourier transformation. Therefore, subpeaks corresponding to the arrayed waveguide pitches appear together with a main peak at a position at which the light ought to be condensed, and optical power levels led to the subpeaks become losses. Here, in the arrayed waveguide grating filter of this embodiment, the arrayed optical waveguides 614 include the mode coupling region (FIG. 23C). Therefore, light from the arrayed waveguides 614 can be prevented from having the period corresponding to the arrayed waveguide pitches, at the end face of the second slab waveguide 616, with the result that the appearance of the subpeaks can be suppressed to lower losses.

Figure 24:
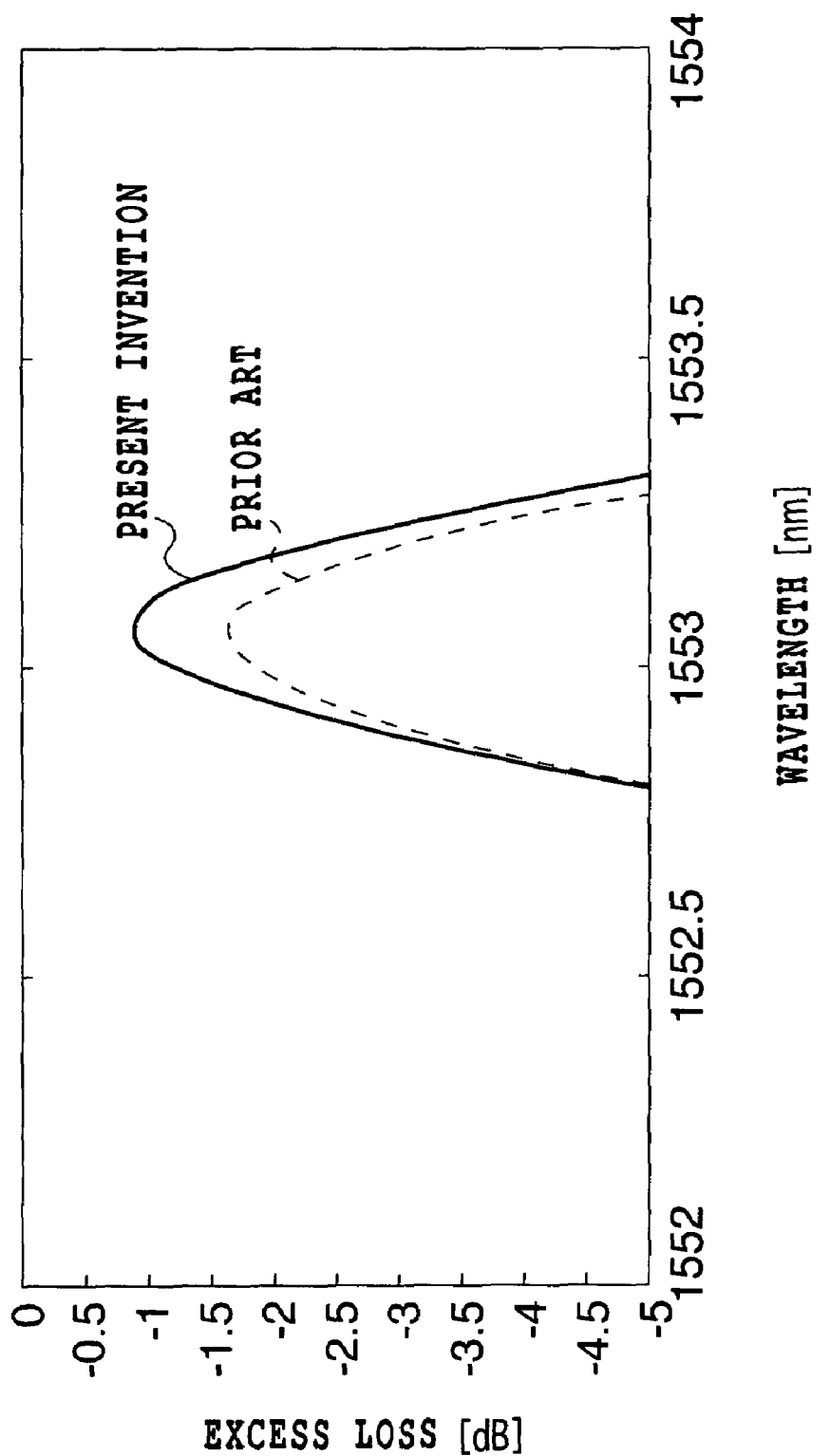
FIG. 24 is a diagram representing the characteristic of the arrayed waveguide grating filter in the tenth embodiment.

FIG. 24 shows the result of the comparison of the losses in the arrayed waveguide grating filter of the tenth embodiment according to the invention as shown in FIG. 23A and the arrayed waveguide grating filter of the prior art. In the configuration of the prior-art arrayed waveguide grating filter, the partial signal light is discarded at the junction points between the first optical slab waveguide and the arrayed waveguide grating, and the junction points between the arrayed waveguides and the second optical slab waveguide, as stated above, so that the losses develop. It is seen, however, that the losses can be substantially lowered in the arrayed waveguide grating filter of this embodiment.

Eleventh Embodiment

The eleventh embodiment according to the present invention will be described with reference to FIGS. 25 through 29.

Besides, in the ensuing embodiment, it shall be assumed that the wave propagation direction of a wave propagation circuit is indicated by a z-axis, that two axes orthogonal to the z-axis are an x-axis and a y-axis, and that the inlet position of a wave lies at z=0, while the outlet position of the wave lies at z=L.

In addition, in this embodiment, a lightwave will be handled as the wave, and a lightwave circuit as the wave propagation circuit. This is because a design method for the wave propagation circuit has no essential difference for the lightwave, a microwave and a millimeter wave. Of course, the invention is not restricted to this example, but the wave propagation circuit may well be a microwave circuit or a millimeter wave circuit.

Further, in this embodiment to be disclosed below, a planar lightwave circuit based on silica-glass optical waveguides each of which is formed of a core of silica glass having a constant thickness and embedded in a clad layer of the silica glass will be handled as a concrete example of the lightwave circuit. This is because the structure can provide a precise lightwave circuit and can provide a lightwave circuit remarkably demonstrating the advantages of the invention. However, the invention is not restricted to this example, but a material may well be a different one such as polymer or semiconductor. Besides, the structure of the lightwave circuit may well be another structure which partly or wholly changes in three dimensions.

Figure 25:
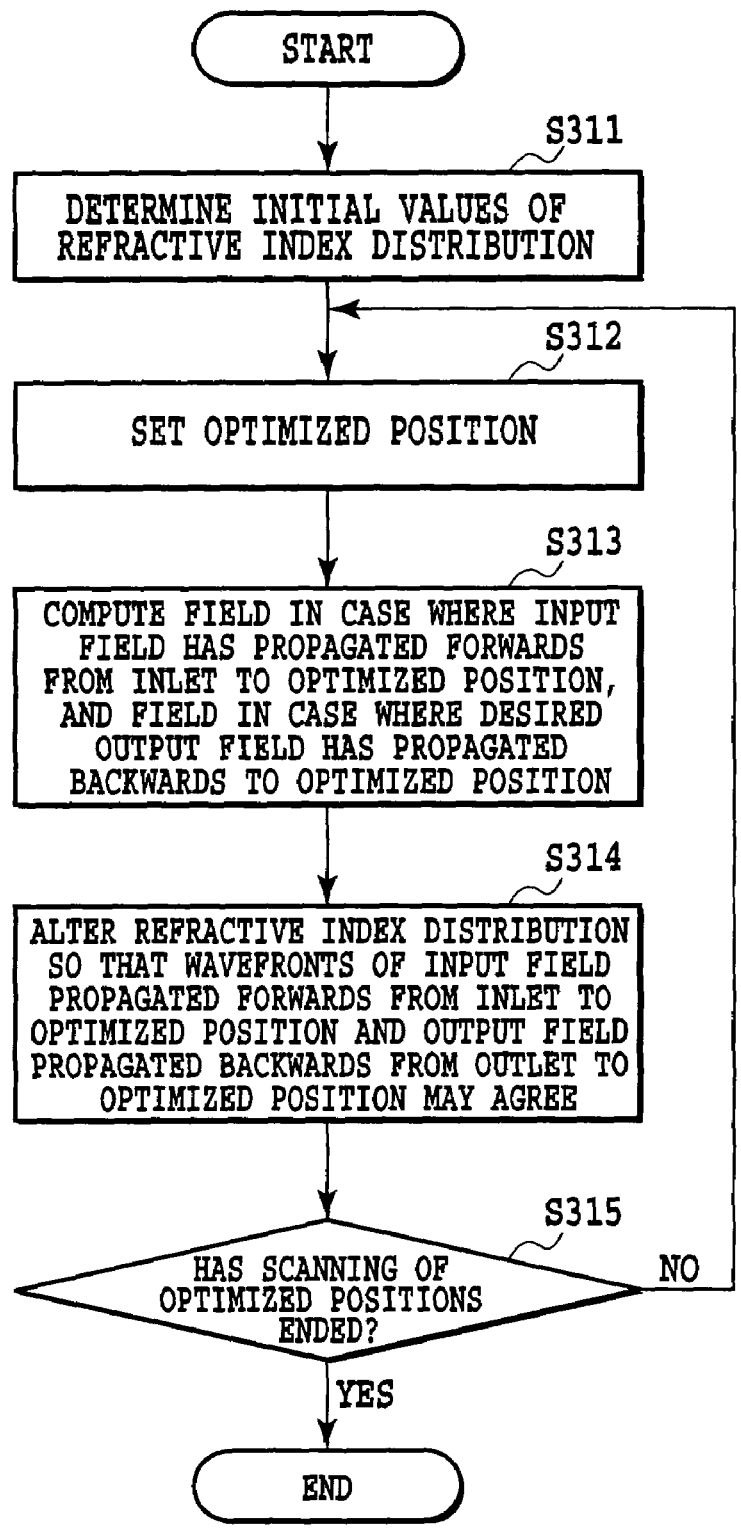
FIG. 25 is a chart showing the algorithm of a method of designing a wave propagation circuit in an eleventh embodiment.

Shown in FIG. 25 is the algorithm of the design method for the wave propagation circuit in the eleventh embodiment according to the invention. The design method for the wave propagation circuit in this embodiment includes the step 311 of determining the initial values of a refractive index distribution $n(x, y, z)$ and storing the determined values in the memory of a computer, the step 312 of setting an optimized position at a position $z=z_o$ in the light propagation direction, the step 313 of computing a field $\Phi(x, y, z_o)$ in the case where an input field $\Phi(x, y, 0)$ has propagated forwards from the inlet z=0 to the optimized position $z=z_o$, and a field $\Psi(x, y, z_o)$ in the case where a desired output field $\Psi(x, y, L)$ has propagated backwards from the outlet z=L to the optimized position $z=z_o$, and then storing the computed fields in the memory of the computer, the step 314 of altering the refractive index distribution $n(x, y, z_o)$ by the computer so that the wavefronts of the input field propagated forwards from the inlet to the optimized position and the output field propagated backwards from the outlet to the optimized position may agree, and the step 315 of judging if the scanning of optimized positions has ended. The steps 312-315 are iterated until the judged result of the step 315 is satisfied.

Here, in the design method for the wave propagation circuit in this embodiment, the results of the steps 311 and 313 have been stored in the memory of the computer. This is because the method can provide a technique which can compute at high speed by the computer. However, the invention is not restricted to this example, but the results of the steps 311 and 313 may well be stored in another computer-readable storage device such as hard disk.

Next, an optimization method in the eleventh embodiment will be described using formulae. The fundamental concept of a wave transmission medium is applied to the design method for the wave propagation circuit in the invention. A theory concerning the wave transmission medium designates the characteristic of the medium on the basis of a general wave equation, and it can, in principle, hold true of a general wave. In this embodiment, the "wave" which is propagated through the wave transmission medium is "light" because of the application to the lightwave circuit.

The field $\Phi(x, y, z_o)$ in the case of propagating the input field $\Phi(x, y, 0)$ forwards from the inlet $z=0$ to the optimized position $z=z_o$ as is computed at the step 313, is given by the following equation where $H_1$ denotes a wave propagation operator from $z=0$ to $z=z_o$:

$$\Phi(x,y,z_o)=H_1\Phi(x,y,0) \quad (2)$$

Besides, the field $\Psi(x, y, z_o)$ in the case of propagating the output field $\Psi(x, y, L)$ backwards from the outlet $z=L$ to the optimized position $z=z_o$ as is computed at the step 313, is given by the following equation where $H_2$ denotes a wave propagation operator from $z=z_o$ to $z=L$:

$$\Psi^*(x,y,z_o)=\Psi^*(x,y,L)H_2 \quad (3)$$

Here, "*" represents a complex conjugate, and it indicates that the proceeding direction of the field is the backward direction.

Now, the coupling constant of the fields $\Phi(x, y, z_o)$ and $\Psi(x, y, z_o)$ evaluated at the step 313 is represented as:

$$\iint \psi^*(x,y,z_o)\phi(x,y,z_o)dxdy=\iint \psi^*(x,y,L)H_2H_1\phi(x,y,0)dxdy \quad (4)$$

Here, when it is considered that $H_2H_1$ denotes a wave propagation operator from $z=z_o$ to $z=L$, Formula (4) can be rewritten as:

$$\iint \psi^*(x,y,L)H_2H_1\phi(x,y,0)dxdy=\iint \psi^*(x,y,L)\phi(x,y,L)dxdy \quad (5)$$

Here, the right side of Formula (5) represents the coupling coefficient between the desired output field $\Psi(x, y, L)$ and the field $\Phi(x, y, L)$ which is obtained at the outlet when the input field has been propagated from the inlet. That is, when the refractive index distribution $n(x, y, z_o)$ of the optimized position is modified so that the wavefronts of both the fields may agree, the coupling constant of the fields $\Phi(x, y, z_o)$ and $\Psi^*(x, y, z_o)$ is enhanced, and hence, the field $\Phi(x, y, L)$ which is obtained at the outlet when the input field has been propagated from the inlet comes close to the desired output field $\Psi(x, y, L)$.

In this manner, according to the design method for the wave propagation circuit in the eleventh embodiment as shown in FIG. 25, the input field can be brought close to the desired output field by altering the refractive index distribution $n(x, y, z_o)$ so that the wavefronts of the fields $\Phi(x, y, z_o)$ and $\Psi^*(x, y, z_o)$ may agree.

With the design method for the wave propagation circuit in the eleventh embodiment, the refractive index distribution can be given as determinism, and hence, substantial improvement in the speed of the optimization of the wave propagation circuit can be realized as compared with the optimizing speed of the cut-and-try type technique wherein the refractive index distribution is changed by way of trial, the input field is propagated and the judgment is made from the result.

Figure 26:
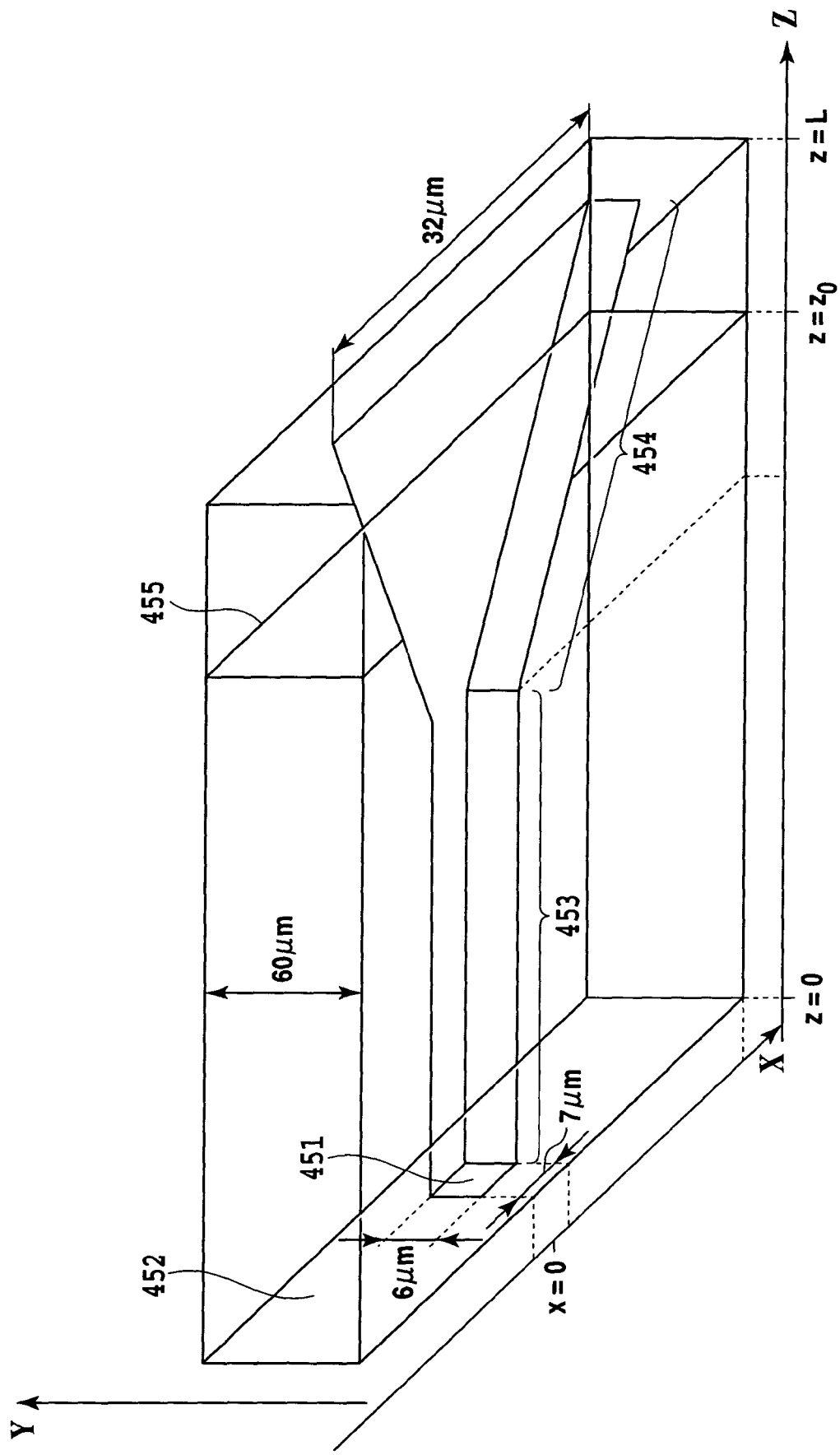
FIG. 26 is a diagram representing the initial values of a refractive index distribution in the method of designing the wave propagation circuit in the eleventh embodiment.

FIG. 26 shows the initial values of the refractive index distribution of the lightwave circuit in the design method for the wave propagation circuit in the eleventh embodiment. The lightwave circuit shown in FIG. 26 has a structure in which a core 451 of constant film thickness is embedded in a clad layer 452. The refractive index of the clad layer 452 is 1.44428, and the thickness thereof is 60 μm, while the refractive index of the core 451 is 1.45523, and the thickness thereof is 6 μm. The core 451 is configured of a rectilinear optical waveguide 453 and a sectoral optical waveguide 454. The length of the rectilinear optical waveguide 453 is 600 μm, and the width thereof is 7 μm, while the length of the sectoral optical waveguide 454 is 400 μm, and the width thereof is 32 μm. The inlet of the lightwave circuit lies at $z=0$, and the outlet thereof lies at $z=L=1000$ μm. Besides, in FIG. 26, the optimized position is indicated by numeral 455.

Subsequently, the optimization of the wave propagation circuit has been performed in accordance with the design method for the wave propagation circuit in the eleventh embodiment as shown in FIG. 25. Here, the input field has been set as the field of the fundamental mode of the rectilinear optical waveguide 453, while the desired output field has been set as a field in which the fundamental modes are parallel with a spacing of 18 μm, in order that the lightwave circuit may function as a two-branch circuit. Here, although the lightwave circuit has been optimized so as to function as the two branches, in the design method for the wave propagation circuit in the eleventh embodiment, the optimization may, of course, be performed for three branches or four branches, or for another function such as spot size conversion or the lowering of a waveguide crossing loss.

Besides, in this embodiment, the optimized position 455 has been selected at random from within the sectoral region 454, and scanning has been performed so as to optimize such selected optimized positions 455. The whole region from $z=0$ to $z=L$ need not be scanned. However, the optimized positions 455 may be scanned anyway, and the whole region from $z=0$ to $z=L$ may well be scanned.

Further, in the design method for the wave propagation circuit in the eleventh embodiment as shown in FIG. 25, the field computations at the step 313 have been executed by the computer by employing a finite difference time domain method. However, the invention is not restricted to this example, but the field computations may, of course, be executed by employing either a beam propagation method or a mode matching method, or another computation method.

Figure 27A:
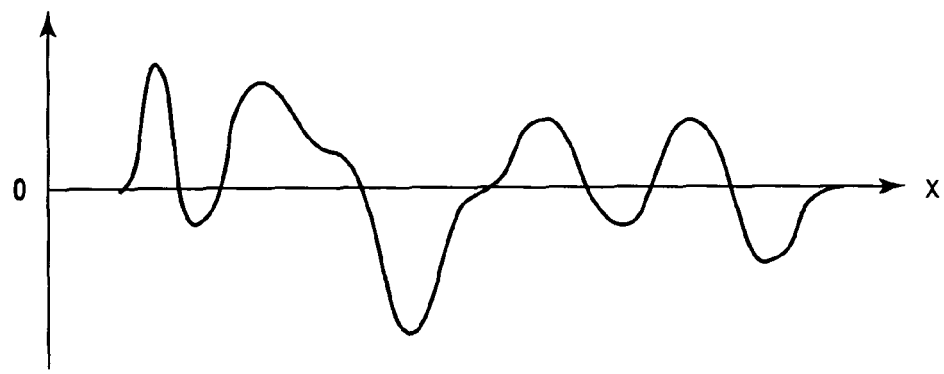
FIG. 27A is a diagram representing how to give the refractive index distribution in the method of designing the wave propagation circuit in the eleventh embodiment.
Figure 27B:
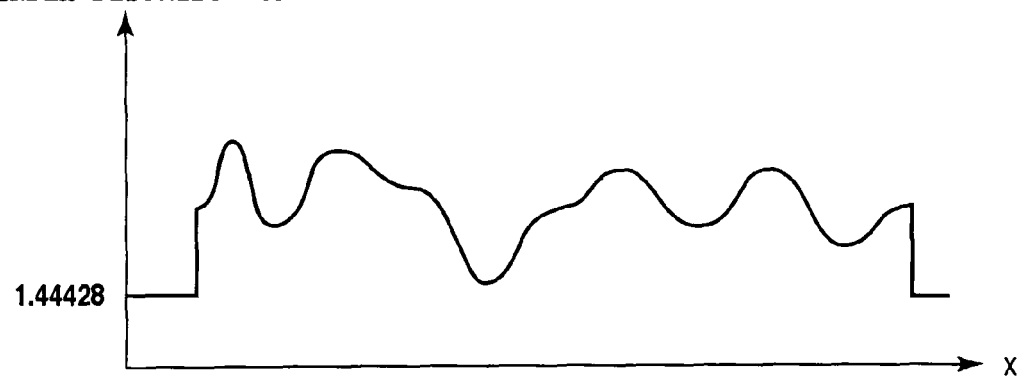
FIG. 27B is a diagram representing how to give the refractive index distribution in the method of designing the wave propagation circuit in the eleventh embodiment.

Besides, in the design method for the wave propagation circuit in the eleventh embodiment as shown in FIG. 25, the refractive index distribution $n(x, y, z_o)$ proportional to the phase difference has been given in order to bring the wavefronts into agreement, at the step 314. FIGS. 27A and B show how to give the refractive index distribution. FIG. 27A shows the phase difference between the field obtained by propagating the input field forwards and the field obtained by propagating the desired output field backwards, while FIG. 27B shows the refractive index distribution proportional to the phase difference. In this manner, the coupling coefficient between the field propagated forwards and the field propagated backwards can be enhanced by giving the refractive index distribution which compensates for the phase difference, with the result that the output obtained when the input field is inputted can be brought close to the desired field.

Here, although the refractive index distribution proportional to the phase difference has been given in the design method for the wave propagation circuit in the eleventh embodiment as shown in FIG. 25, the invention is not restricted to this example, but another refractive index distribution may, of course, be given as long as refractive indices are given so as to bring the wavefronts into agreement at least partly.

Incidentally, an analog refractive index variation as shown in FIGS. 27A and B can be realized using ultraviolet irradiation in the case of, for example, the silica-glass optical waveguide.

Figure 28:
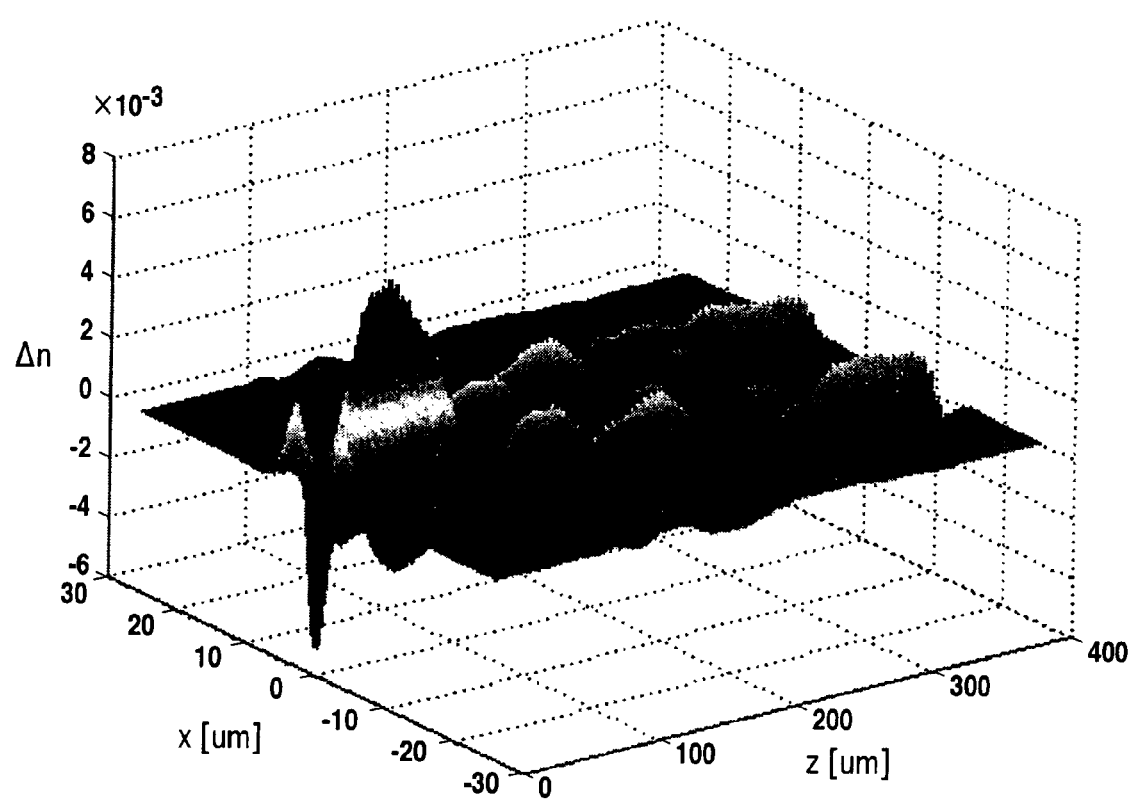
FIG. 28 is a diagram representing the alteration magnitude of the refractive index distribution in the method of designing the wave propagation circuit in the eleventh embodiment.

FIG. 28 represents refractive-index adjustment magnitudes from the initial values of the refractive index distribution after the wave propagation circuit has been optimized by employing the design method for the wave propagation circuit in the eleventh embodiment as shown in FIG. 25. A positive part along a vertical axis in FIG. 28 is a place where the refractive index has been increased, whereas a negative part is a part where the refractive index has been decreased. An actual refractive index becomes a value with the refractive index 1.45523 of the core added to the represented value. The refractive-index adjustment magnitudes shown in FIG. 28 are results which have been obtained by altering the refractive index distribution $\underline{n}$ until the whole region from z=0 to z=L are scanned for the optimized positions 455, by employing the design method for the wave propagation circuit in this embodiment.

In the case of the silica-glass optical waveguide shown in FIG. 26, however, it is difficult to decrease the refractive index. In the case of the silica-glass optical waveguide, accordingly, the waveguide in a state before the refractive index is varied by the ultraviolet irradiation is fabricated with the refractive indices of the core and the clad equalized, and the increase of the refractive index is made small at the part whose refractive index is to be decreased, whereas the increase of the refractive index is made large at the part whose refractive index is to be increased, whereby the refractive index distribution as designed can be realized.

Figure 29:
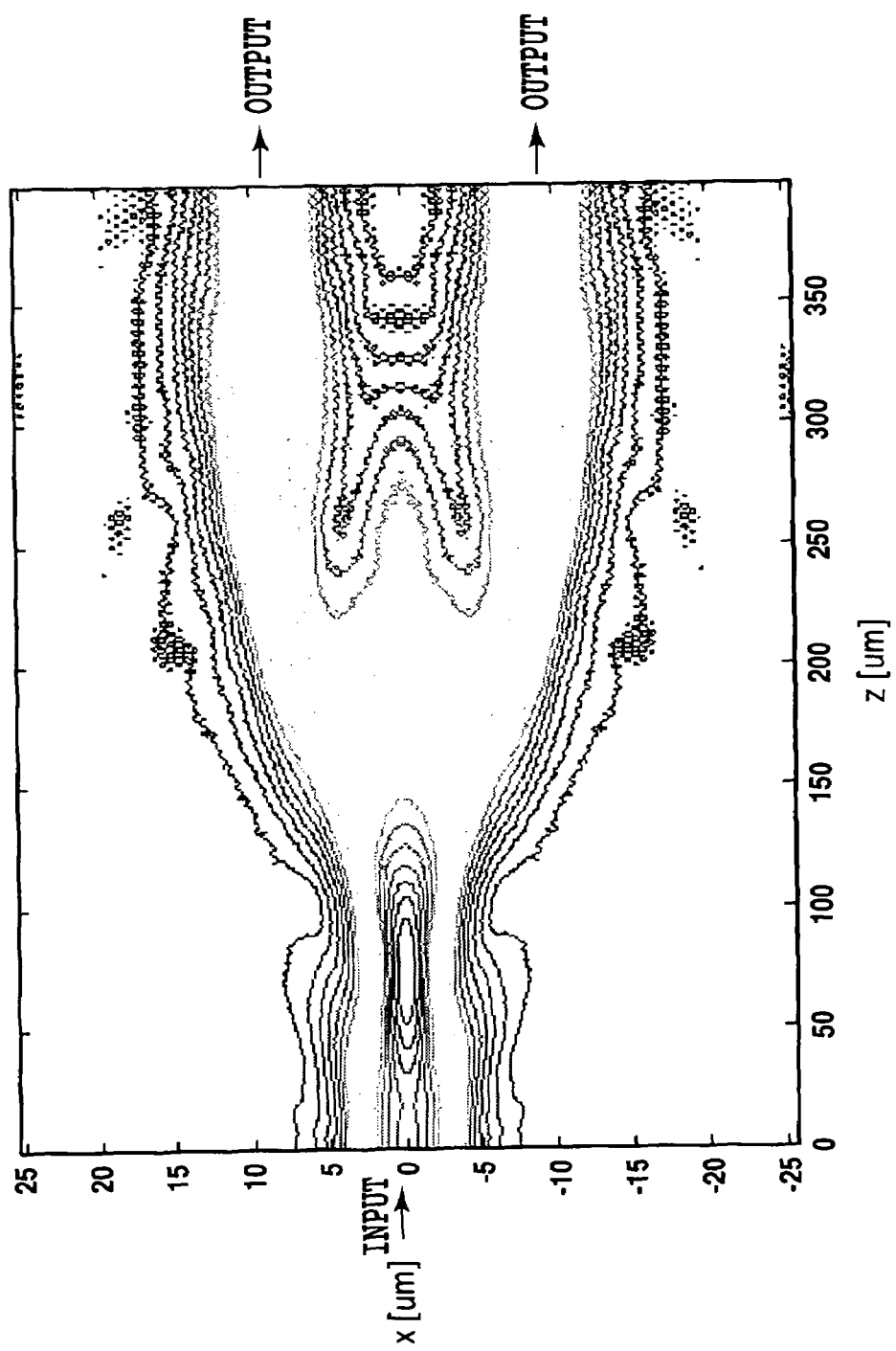
FIG. 29 is a diagram representing the characteristic of a lightwave circuit which has been designed by the method of designing the wave propagation circuit in the eleventh embodiment.

FIG. 29 shows the transmission characteristic of the wave propagation circuit which was optimized by employing the design method for the wave propagation circuit in the eleventh embodiment as shown in FIG. 25. As shown in FIG. 29, it is seen that the inputted light field has been branched into two as designed. A loss in this case is below 0.1 dB, and it has been verified that a favorable characteristic is attained.

Twelfth Embodiment

The twelfth embodiment according to the present invention will be described with reference to FIG. 30 through FIG. 34 (A and B).

Besides, in the ensuing embodiment, it shall be assumed that the wave propagation direction of a wave propagation circuit is indicated by a z-axis, that two axes orthogonal to the z-axis are an x-axis and a y-axis, and that the inlet position of a wave lies at z=0, while the outlet position of the wave lies at z=L.

Figure 30:
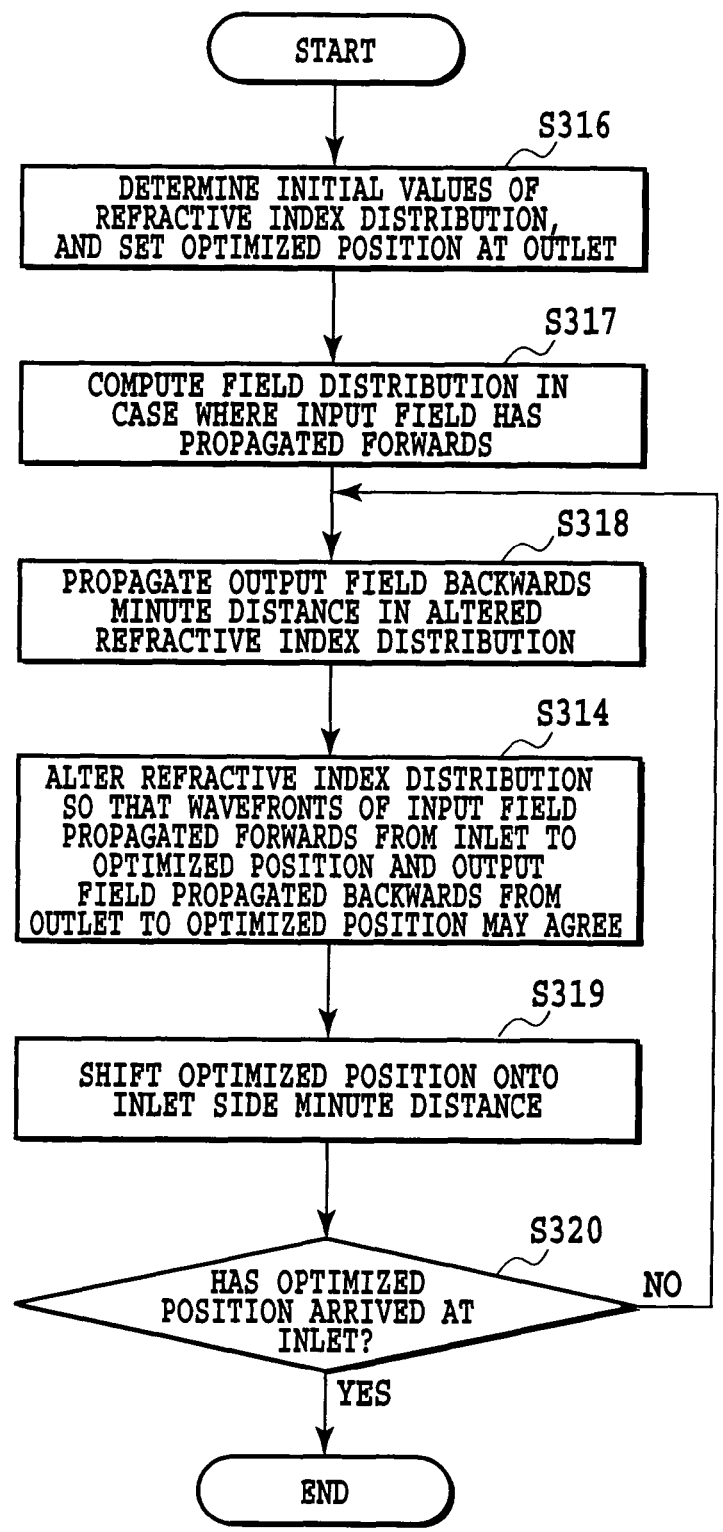
FIG. 30 is a chart showing the algorithm of a method of designing a wave propagation circuit in a twelfth embodiment.

Shown in FIG. 30 is the algorithm of a design method for the wave propagation circuit in the twelfth embodiment according to the invention. The design method for the wave propagation circuit in the twelfth embodiment as shown in FIG. 30 includes the step 316 of determining the initial values of a refractive index distribution n(x, y, z) and storing the determined values in the memory of a computer, and setting an optimized position at the outlet, the step 317 of computing a field distribution Φ(x, y, z) in the case where an input field Φ(x, y, 0) has propagated forwards from the inlet z=0 to the outlet z=L, and then storing the computed field distribution in the memory of the computer, the step 318 of propagating an output field Ψ(x, y, z) backwards a minute distance Δz in an altered refractive index distribution and storing the resulting distribution in the memory of the computer, the step 314 of altering the refractive index distribution by the computer so that the wavefronts of the input field propagated forwards from the inlet to the optimized position and the output field propagated backwards from the outlet to the optimized position may agree, the step 319 of shifting the optimized position onto an inlet side the minute distance Δz, and the step 320 of judging if the optimized position has arrived at the inlet, and the steps 318, 314, 319 and 320 are iterated until the optimized position comes from the outlet to the inlet.

Here, in the design method for the wave propagation circuit in the twelfth embodiment as shown in FIG. 30, the results of the steps 316, 317 and 318 have been stored in the memory of the computer. This is because the method can provide a technique which can compute at high speed by the computer. However, the invention is not restricted to this example, but the results of the steps 316, 317 and 318 may, of course, be stored in another computer-readable storage device such as hard disk.

Even when such an algorithm is employed, the optimization of the wave propagation circuit can be attained likewise to the design method for the wave propagation circuit in the eleventh embodiment as shown in FIG. 25.

Further, with the design method for the wave propagation circuit in the twelfth embodiment as shown in FIG. 30, the fields in the case where the input field has propagated forwards can be collectively computed and stored in the memory of the computer at the step 317, so that a still higher speed for the computations can be attained.

Figure 31:
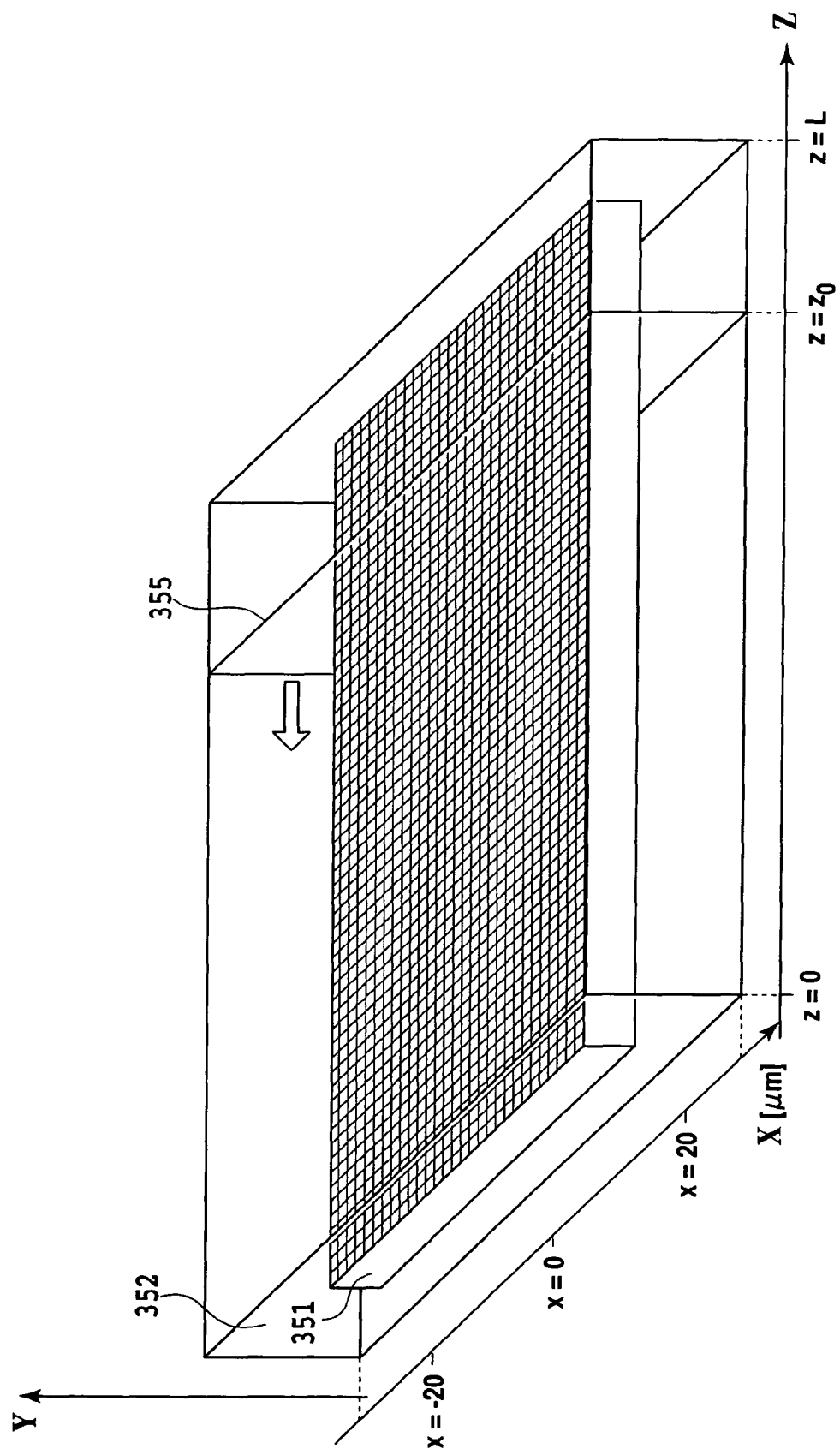
FIG. 31 is a diagram representing the initial values of a refractive index distribution in the method of designing the wave propagation circuit in the twelfth embodiment.

FIG. 31 shows the initial values of the refractive index distribution employed at the step 311 of the design method for the wave propagation circuit in the twelfth embodiment as shown in FIG. 30. As shown in FIG. 31, a core 451 of constant film thickness is embedded in a clad layer 452, and the core has a mosaic structure one side of which is 1 μm long. The refractive index of the clad layer 452 is 1.44428, and the thickness thereof is 60 μm, while the refractive index of the core 451 is 1.45523, and the thickness thereof is 6 μm. The inlet of the lightwave circuit lies at z=0, and the outlet thereof lies at z=L=100 μm.

Subsequently, there will be described an example in which the optimization of the wave propagation circuit has been performed in accordance with the design method for the wave propagation circuit in the twelfth embodiment as shown in FIG. 30. Here, the input field has been set as the field of the fundamental mode of an optical waveguide having a width of 7 μm and a thickness of 6 μm, while the desired output field has been set so as to output the field of the fundamental mode at a position of x=20 μm for a wavelength of 1.3 μm and at a position of x=−20 μm for a wavelength of 1.55 μm, in order that the lightwave circuit may function as a wavelength filter. In this manner, according to the design method for the wave propagation circuit in the invention, a plurality of wavelengths can be employed for the desired output field. In case of employing the plurality of wavelengths, when a combined wavefront based on the plurality of wavelengths is considered, the lightwave circuit can be designed by quite the same procedure as in the case of one wavelength.

Incidentally, although the lightwave circuit has been optimized so as to function as the wavelength filter, in the design method for the wave propagation circuit in the twelfth embodiment according to the invention, the optimization may, of course, be performed for another function.

Besides, in the design method for the wave propagation circuit in the twelfth embodiment as shown in FIG. 30, the field computations at the steps 317 and 318 have been executed by the computer by employing a three-dimensional beam propagation method. However, the invention is not restricted to this example, but the field computations may, of course, be executed by employing another technique such as a finite difference time domain method or a mode matching method.

Figure 32A:
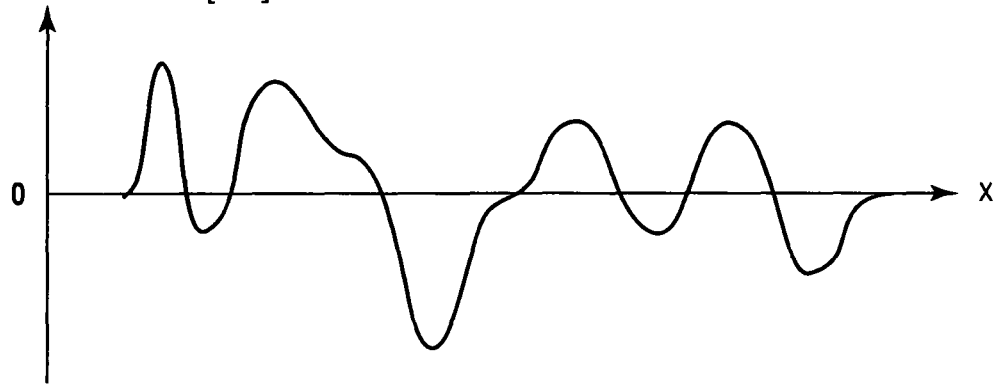
FIG. 32A is a diagram representing how to give the refractive index distribution in the method of designing the wave propagation circuit in the twelfth embodiment.
Figure 32B:
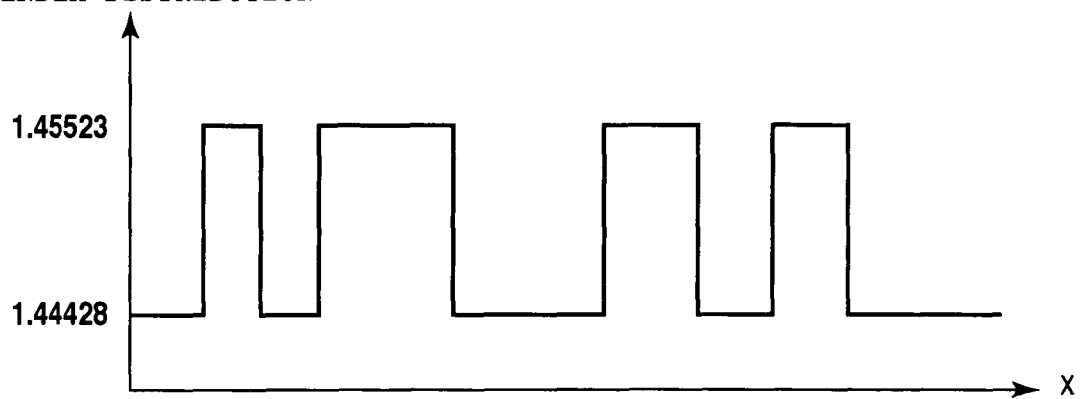
FIG. 32B is a diagram representing how to give the refractive index distribution in the method of designing the wave propagation circuit in the twelfth embodiment.

In addition, in the design method for the wave propagation circuit in the twelfth embodiment as shown in FIG. 30, the step 314 has been performed in such a way that a threshold value T is set as O rad in order to bring the wavefronts into agreement, and that the core is distributed in a place whose phase difference is greater than the threshold value, while the clad is distributed in a place whose phase difference is smaller. FIGS. 32A and B show how to give such a refractive index distribution. In this manner, the coupling coefficient between the field propagated forwards and the field propagated backwards can be enhanced by giving the refractive index distribution corresponding to the magnitudes of the phases, with the result that the output obtained when the input field is inputted can be brought close to the desired field. Further, the wave propagation circuit which is easily fabricated by employing the two kinds of materials and the two kinds of refractive indices of the core and the clad layer can be provided by such a method of giving the refractive index distribution. However, the invention is not restricted to this example, but it may, of course, employ a quite different method of giving the refractive index distribution, for example, three kinds of refractive indices are given in accordance with the magnitudes of the phases.

In the case of giving the refractive index distribution, as the size of the core is larger as compared with the wavelength of the wave, the characteristic of the wave propagation circuit degrades more. Besides, as the size of the core becomes smaller, difficulty is involved in the fabrication of the wave propagation circuit more. Accordingly, the method of giving the refractive index distribution in FIGS. 32A and B has placed the limitation that the size of the core becomes a size which is on the order of the wavelength of the wave. That is, in this embodiment, in consideration of the fact that the signal wavelengths are about 1.3 µm and 1.5 µm, and in order that the size of the core may become on the order of the wavelength of the wave, there has been placed the limitation that the clad layer is not distributed in a case where the size of the core becomes smaller than 1 µm-square. This is because a wave propagation circuit easy of fabrication can be provided by the lightwave circuit configured of the clad layer and the core which has a certain larger size in this manner. Even in this way, the advantages of the invention can be attained. However, the invention is not restricted to this example, but the size of the core may be a fabricable size of at least 300 nm and may be determined in relation to the wavelength of a wave to-be-inputted.

Figure 33:
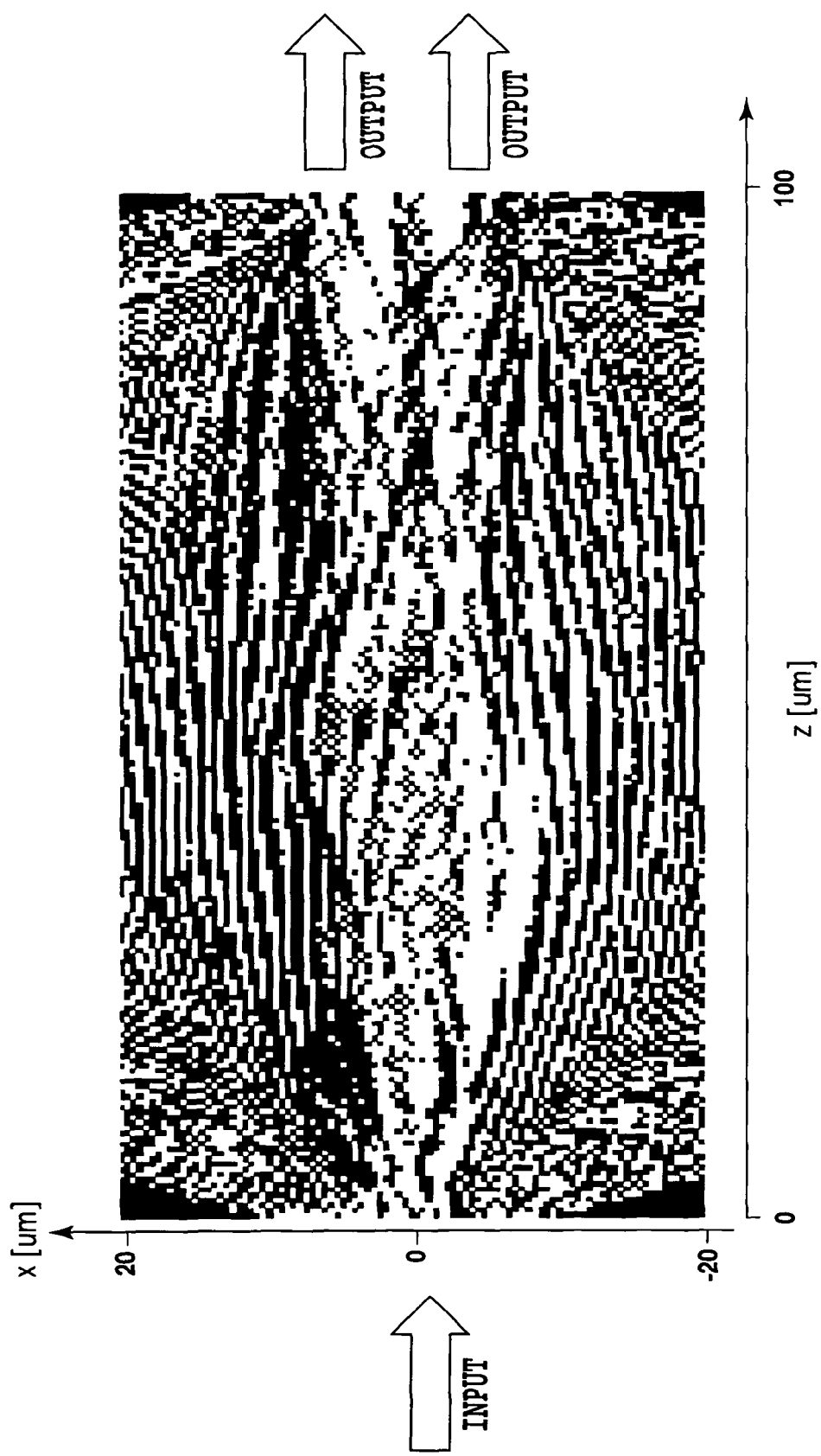
FIG. 33 is a diagram representing the refractive index distribution of a lightwave circuit which has been designed by the method of designing the wave propagation circuit in the twelfth embodiment.

FIG. 33 shows the refractive index distribution of a wave propagation circuit which was optimized by the design method for the wave propagation circuit in the twelfth embodiment as shown in FIG. 30. Here, the algorithm in FIG. 30 was applied 24 times in order to obtain the wave propagation circuit in FIG. 33. In this manner, the design method for the wave propagation circuit in the invention can attain a favorable characteristic by being applied a plurality of number of times.

Figure 34A:
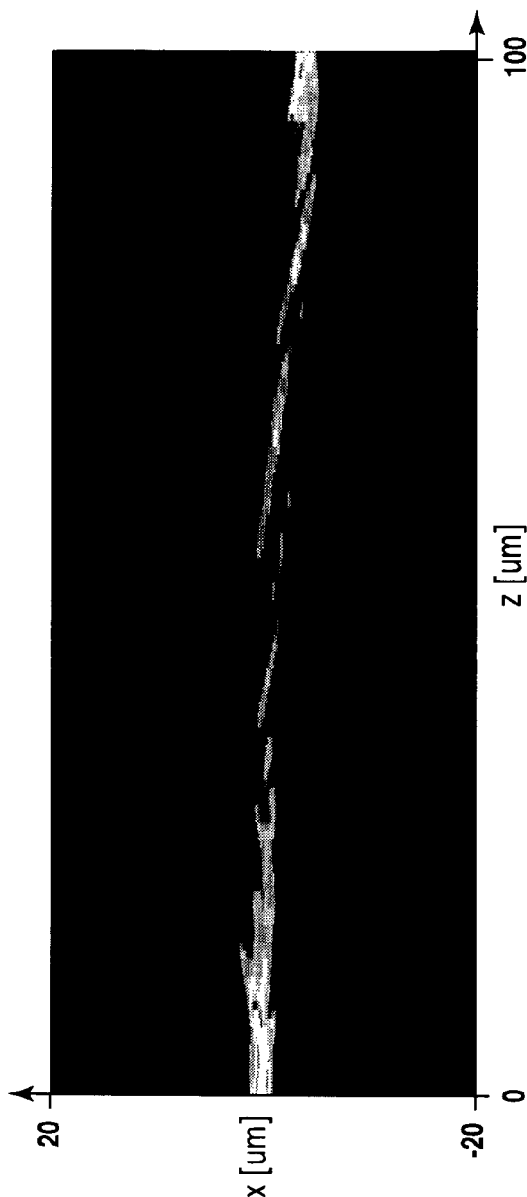
FIG. 34A is a diagram representing the characteristic of the lightwave circuit which has been designed by the method of designing the wave propagation circuit in the twelfth embodiment.
Figure 34B:
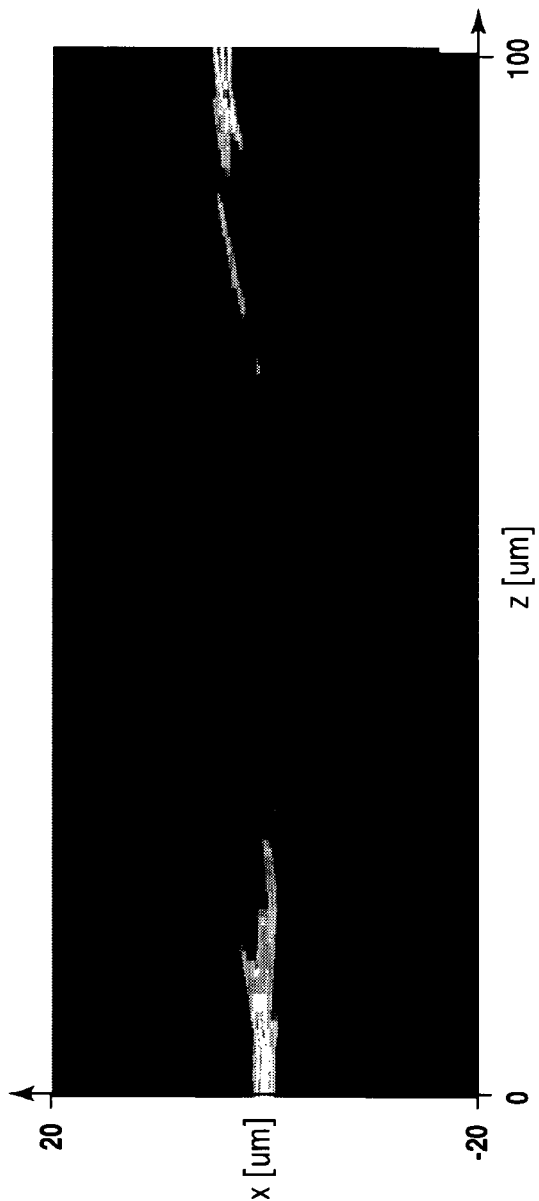
FIG. 34B is a diagram representing the characteristic of the lightwave circuit which has been designed by the method of designing the wave propagation circuit in the twelfth embodiment.

FIGS. 34A and B show the characteristics of a silica-made wave propagation circuit for which a wave propagation circuit was optimized by the design method for the wave propagation circuit in the twelfth embodiment as shown in FIG. 30, and which was fabricated by conventional flame hydrolysis deposition on the basis of the optimization. FIG. 34A shows the field distribution in the case where the wavelength of 1.3 µm was inputted, while FIG. 34B shows the field distribution in the case where the wavelength of 1.55 µm was inputted. As shown in FIG. 33, there has been realized the wave propagation circuit in which the lights are concentrated at different positions, depending upon the wavelengths.

Thirteenth Embodiment

The thirteenth embodiment according to the present invention will be described with reference to FIGS. 35 through 39.

Besides, in the ensuing embodiment, it shall be assumed that the wave propagation direction of a wave propagation circuit is indicated by a z-axis, that two axes orthogonal to the z-axis are an x-axis and a y-axis, and that the inlet position of a wave lies at z=0, while the outlet position of the wave lies at z=L.

Figure 35:
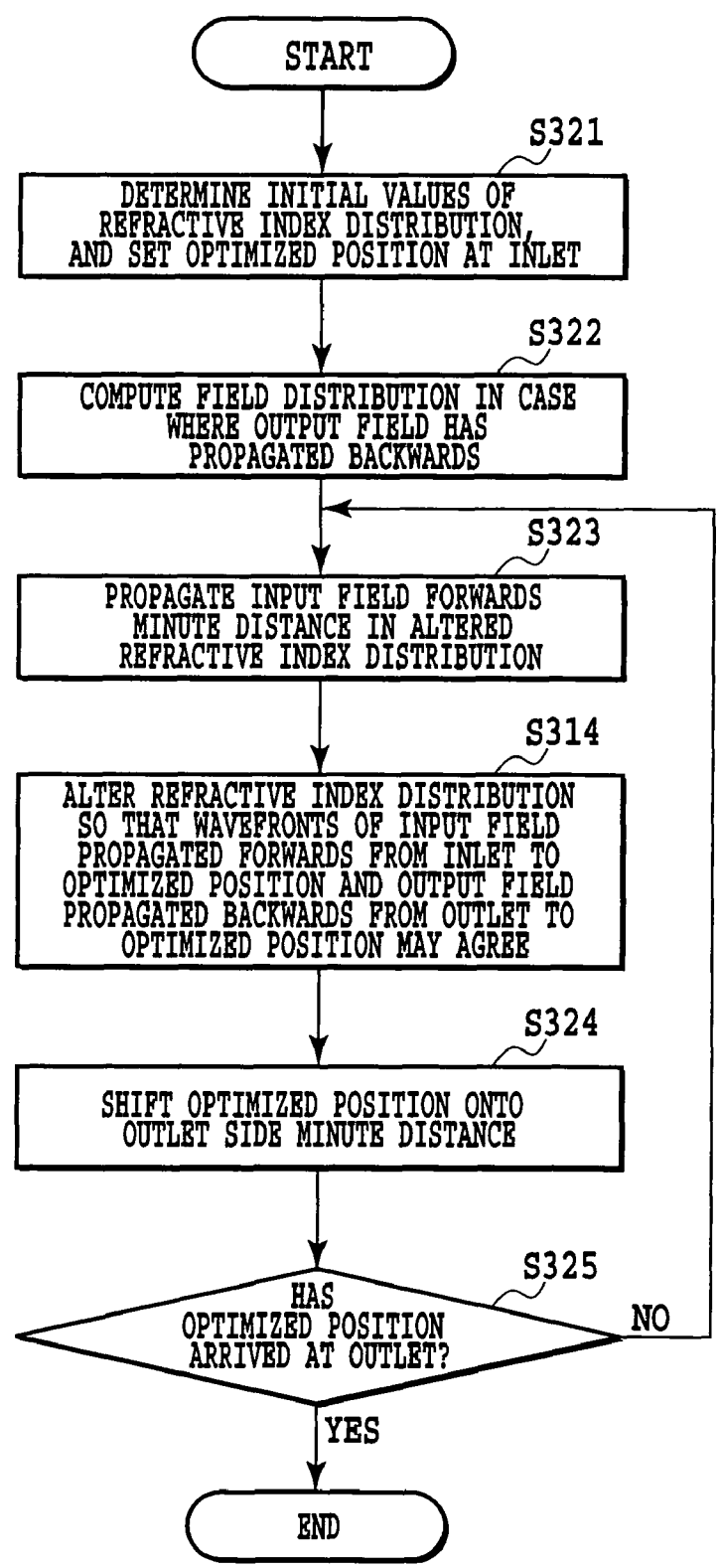
FIG. 35 is a chart showing the algorithm of a method of designing a wave propagation circuit in a thirteenth embodiment.

FIG. 35 shows the algorithm of a design method for the wave propagation circuit in the thirteenth embodiment according to the invention. The design method for the wave propagation circuit in the thirteenth embodiment as shown in FIG. 35 includes the step 321 of determining the initial values of a refractive index distribution n(x, y, z) and storing the determined values in the memory of a computer, and setting an optimized position at the inlet, the step 322 of computing a field distribution $\Psi$(x, y, z) in the case where a desired output field $\Psi$(x, y, L) has propagated backwards from the outlet z=L to the inlet z=0, and then storing the computed field distribution in the memory of the computer, the step 323 of propagating an input field $\Phi$(x, y, z) forwards a minute distance $\Delta z$ in an altered refractive index distribution and storing the resulting distribution in the memory of the computer, the step 314 of altering the refractive index distribution by the computer so that the wavefronts of the input field propagated forwards from the inlet to the optimized position and the output field propagated backwards from the outlet to the optimized position may agree, the step 324 of shifting the optimized position onto an outlet side the minute distance $\Delta z$, and the step 325 of judging if the optimized position has arrived at the inlet, and the steps 323, 314, 324 and 325 are iterated until the optimized position comes from the inlet to the outlet.

Here, in the design method for the wave propagation circuit in the thirteenth embodiment as shown in FIG. 35, the results of the steps 321, 322 and 323 have been stored in the memory of the computer. This is because the method can provide a technique which can compute at high speed by the computer. However, the invention is not restricted to this example, but the results of the steps 321, 322 and 323 may, of course, be stored in another computer-readable storage device such as hard disk.

Even when such an algorithm is employed, the optimization of the wave propagation circuit can be attained likewise to the design method for the wave propagation circuit in the eleventh embodiment as shown in FIG. 25.

Further, with the design method for the wave propagation circuit in the thirteenth embodiment as shown in FIG. 35, the fields in the case where the output field has propagated forwards can be collectively computed and stored in the memory of the computer at the step 322, so that a higher speed for the computations can be attained as in the design method for the wave propagation circuit in the twelfth embodiment of the invention as shown in FIG. 30.

Figure 36:
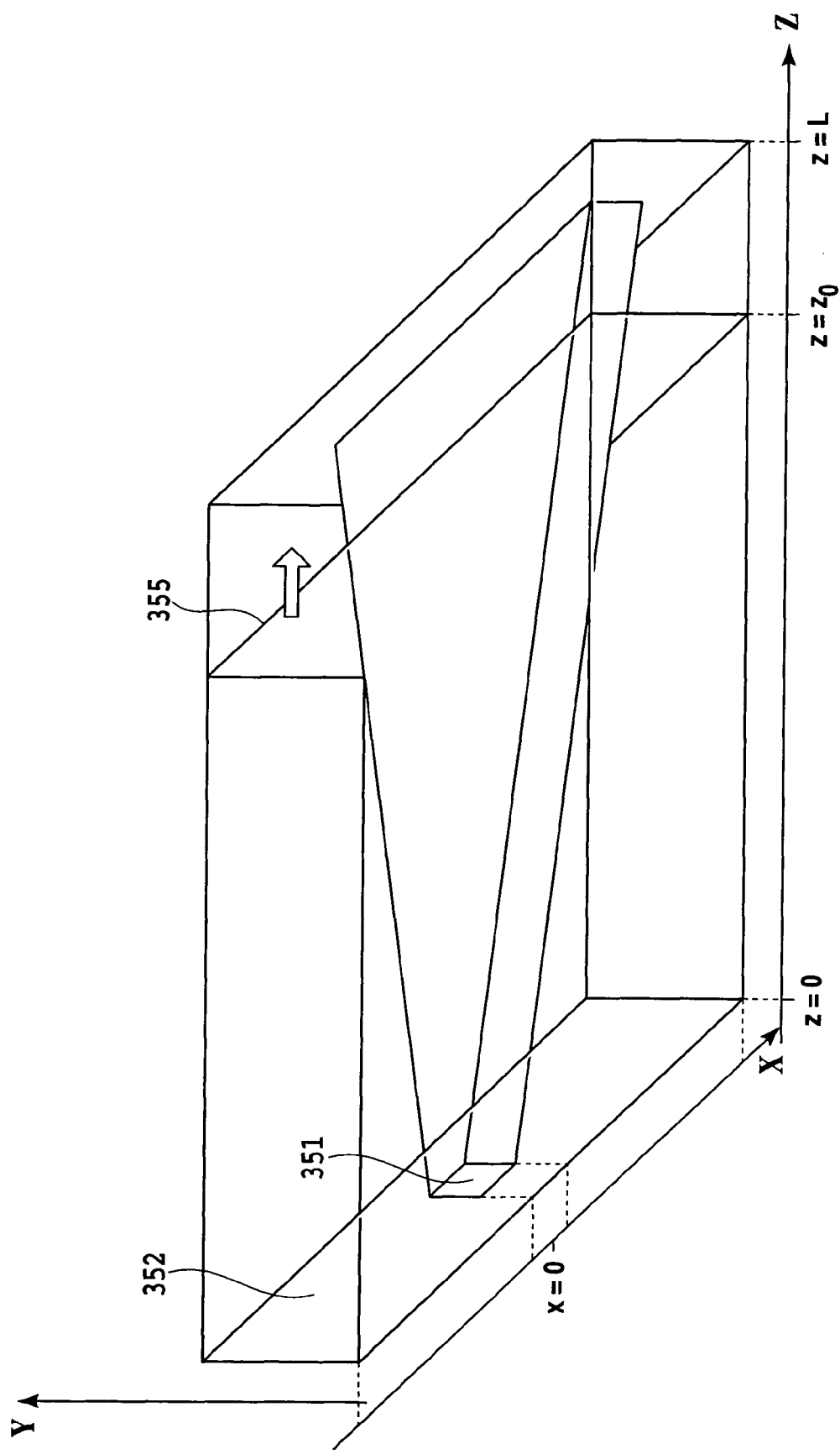
FIG. 36 is a diagram representing the initial values of a refractive index distribution in the method of designing the wave propagation circuit in the thirteenth embodiment.

FIG. 36 shows the initial values of the refractive index distribution employed at the step 321 of the design method for the wave propagation circuit in the thirteenth embodiment as shown in FIG. 35. As shown in FIG. 36, a core 351 of constant film thickness is embedded in a clad layer 352, and the refractive index of the clad layer 352 is 1.44428, and the thickness thereof is 60 µm, while the refractive index of the core 351 is 1.45523, and the thickness thereof is 6 μm. The inlet of the lightwave circuit lies at z=0, and the outlet thereof lies at z=L=1000 μm.

Subsequently, there will be described an example in which the optimization of the wave propagation circuit has been performed in accordance with the design method for the wave propagation circuit in the thirteenth embodiment as shown in FIG. 35. Here, the input field has been set as the field of the fundamental mode of an optical waveguide having a width of 7 μm and a thickness of 6 μm, while the desired output field has been designed in order that the lightwave circuit may function as a waveguide lens, which forms a focus at a position being 100 μm distant behind the output.

Incidentally, although the lightwave circuit has been optimized so as to function as the waveguide lens, in the design method for the wave propagation circuit in the thirteenth embodiment of the invention, the optimization may, of course, be performed for another function.

Besides, in the design method for the wave propagation circuit in the thirteenth embodiment as shown in FIG. 35, the field computations at the steps 322 and 323 have been executed by the computer by employing a three-dimensional beam propagation method. However, the invention is not restricted to this example, but the field computations may, of course, be executed by employing another technique such as a finite difference time domain method or a mode matching method.

In addition, in the design method for the wave propagation circuit in the thirteenth embodiment as shown in FIG. 35, the step 314 has been performed in such a way that a threshold value T is set as O rad in order to bring the wavefronts into agreement, and that, regarding only the boundary between the core and the clad, the core is distributed (the core is added) at a position having been the clad originally, in a place whose phase difference is greater than the threshold value, while the clad is distributed without distributing the core (the core is removed) at a position having been the core originally, in a place whose phase difference is smaller.

Figure 37A:
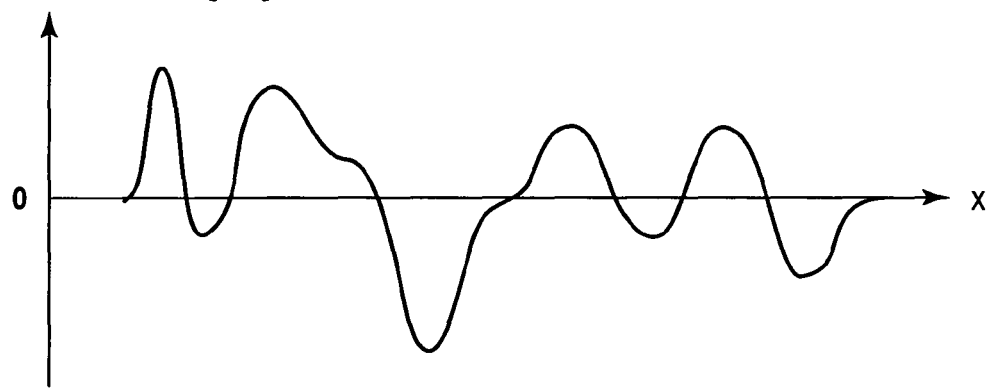
FIG. 37A is a diagram representing how to give the refractive index distribution in the method of designing the wave propagation circuit in the thirteenth embodiment.
Figure 37B:
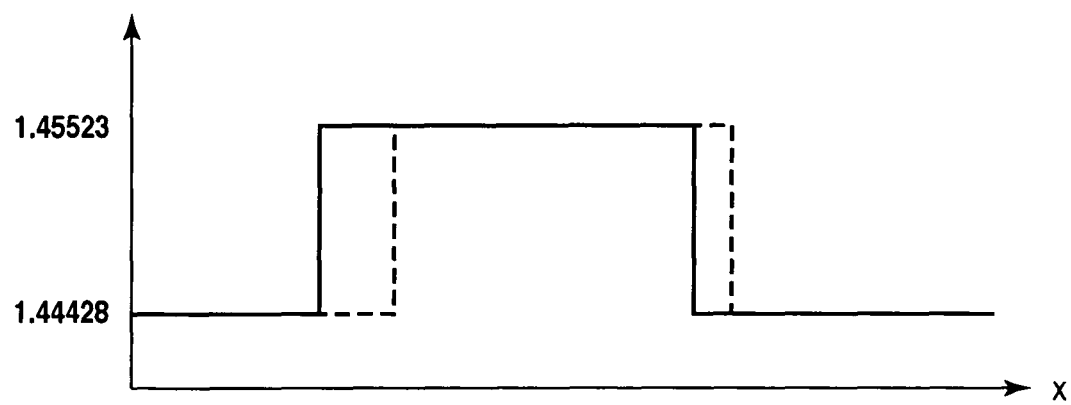
FIG. 37B is a diagram representing how to give the refractive index distribution in the method of designing the wave propagation circuit in the thirteenth embodiment.

FIGS. 37A and B show how to give such a refractive index distribution. In this manner, a wave propagation circuit in which the wave is difficult of being dispersed in up and down directions and which is favorable in point of loss can be provided by varying the refractive index distribution at only the boundary between the core and the clad. However, the invention is not restricted to this example, but it may, of course, employ a different method of giving the refractive index distribution, for example, a method which allows the distribution of a clad layer at the center of the waveguide.

Further, in the method of giving the refractive index distribution in FIGS. 37A and B, the variation rate of a core width in the light propagation direction has been set at 60 degrees or less. That is, the maximum inclination of the core width relative to the light propagation direction has been set at 60 degrees or less. This is because a wave propagation circuit in which the dispersion of the wave is still less can be provided by placing such a limitation. However, the invention is not restricted to this example, but it may, of course, place the limitation with another angle or place no limitation.

Figure 38:
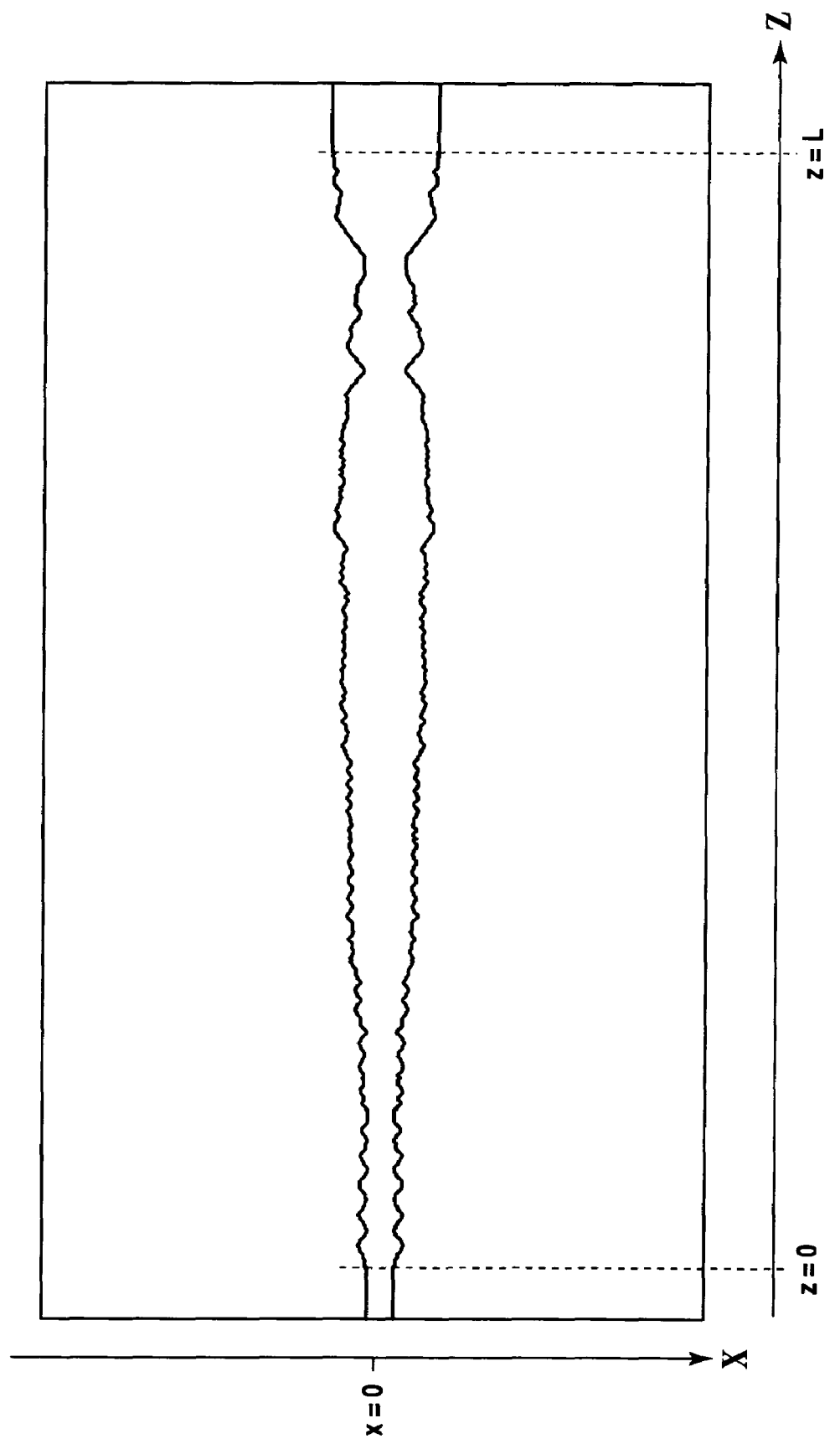
FIG. 38 is a diagram representing the refractive index distribution of a lightwave circuit which has been designed by the method of designing the wave propagation circuit in the thirteenth embodiment.

FIG. 38 shows the refractive index distribution of a wave propagation circuit which was optimized by the design method for the wave propagation circuit in the thirteenth embodiment as shown in FIG. 35. Here, in order to obtain the wave propagation circuit in FIG. 38, the design method for the wave propagation circuit in the thirteenth embodiment as shown in FIG. 35 and the design method for the wave propagation circuit in the twelfth embodiment of the invention as shown in FIG. 30 were alternately applied 15 times. In this manner, owing to the alternate applications, the refractive index distribution can be altered uniformly over the whole wave propagation circuit, and a favorable characteristic can be attained. In this way, the optimization can be performed by the selective combination and/or iteration of the design methods for the wave propagation circuit in the first through third embodiments of the invention.

Figure 39:
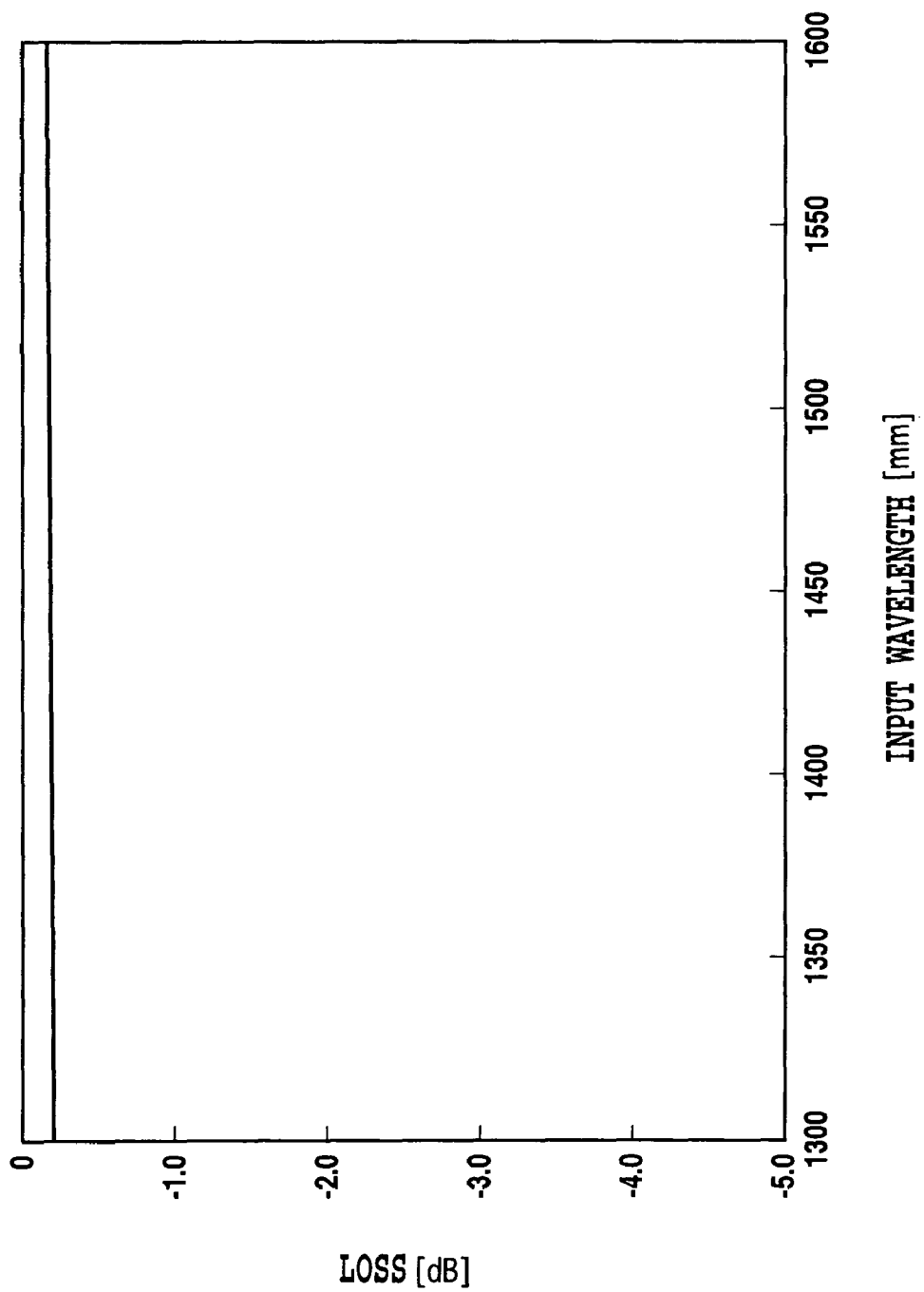
FIG. 39 is a diagram representing the characteristic of the lightwave circuit which has been designed by the method of designing the wave propagation circuit in the thirteenth embodiment.
Figure 40:
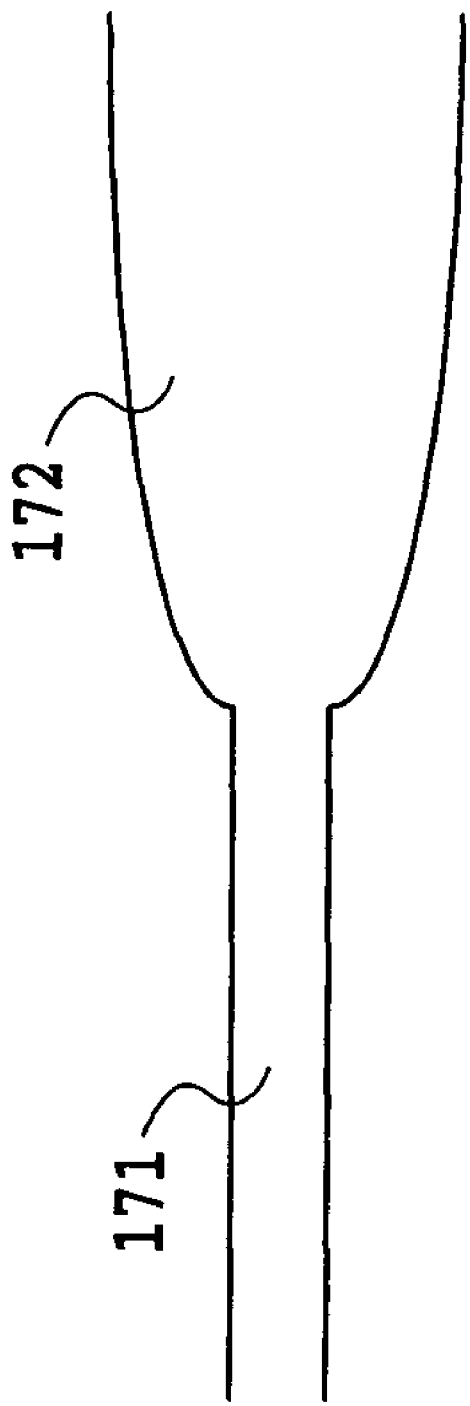
FIG. 40 is a view representing the configuration of a prior-art planar lightwave circuit.
Figure 41:
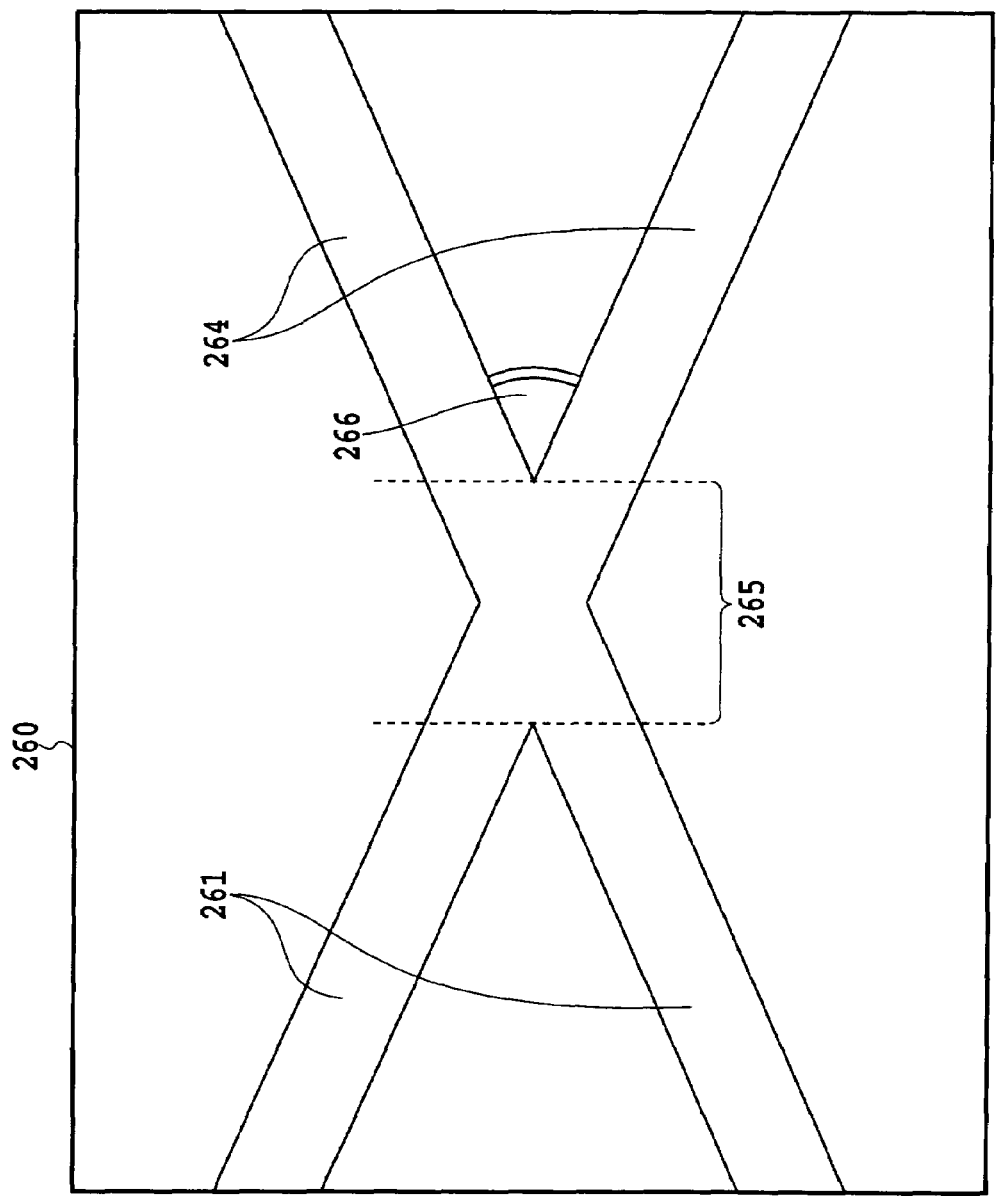
FIG. 41 is a view representing the configuration of a prior-art cross waveguide.
Figure 42:
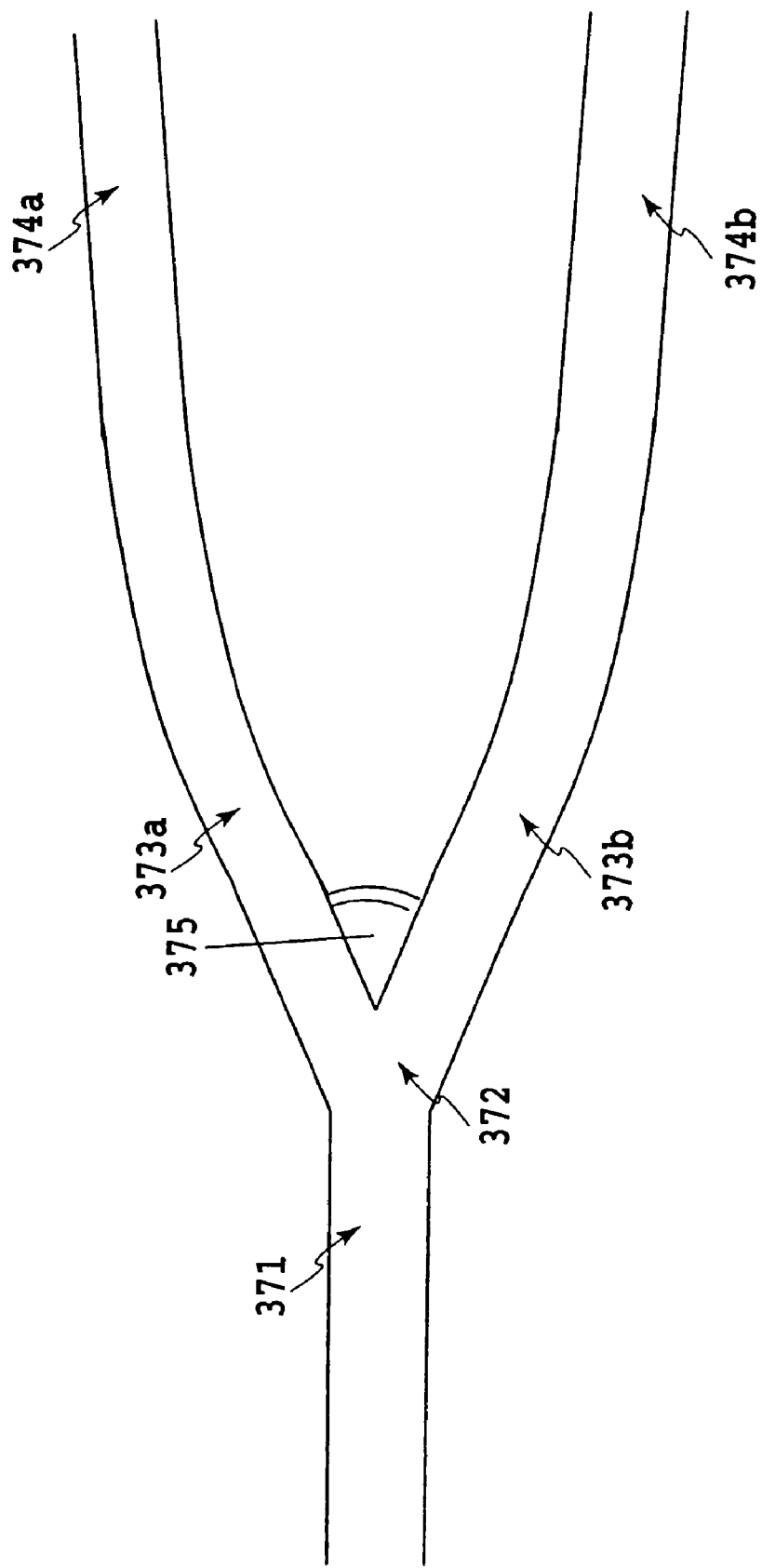
FIG. 42 is a view representing the configuration of a prior-art Y-branch waveguide.
Figure 43:
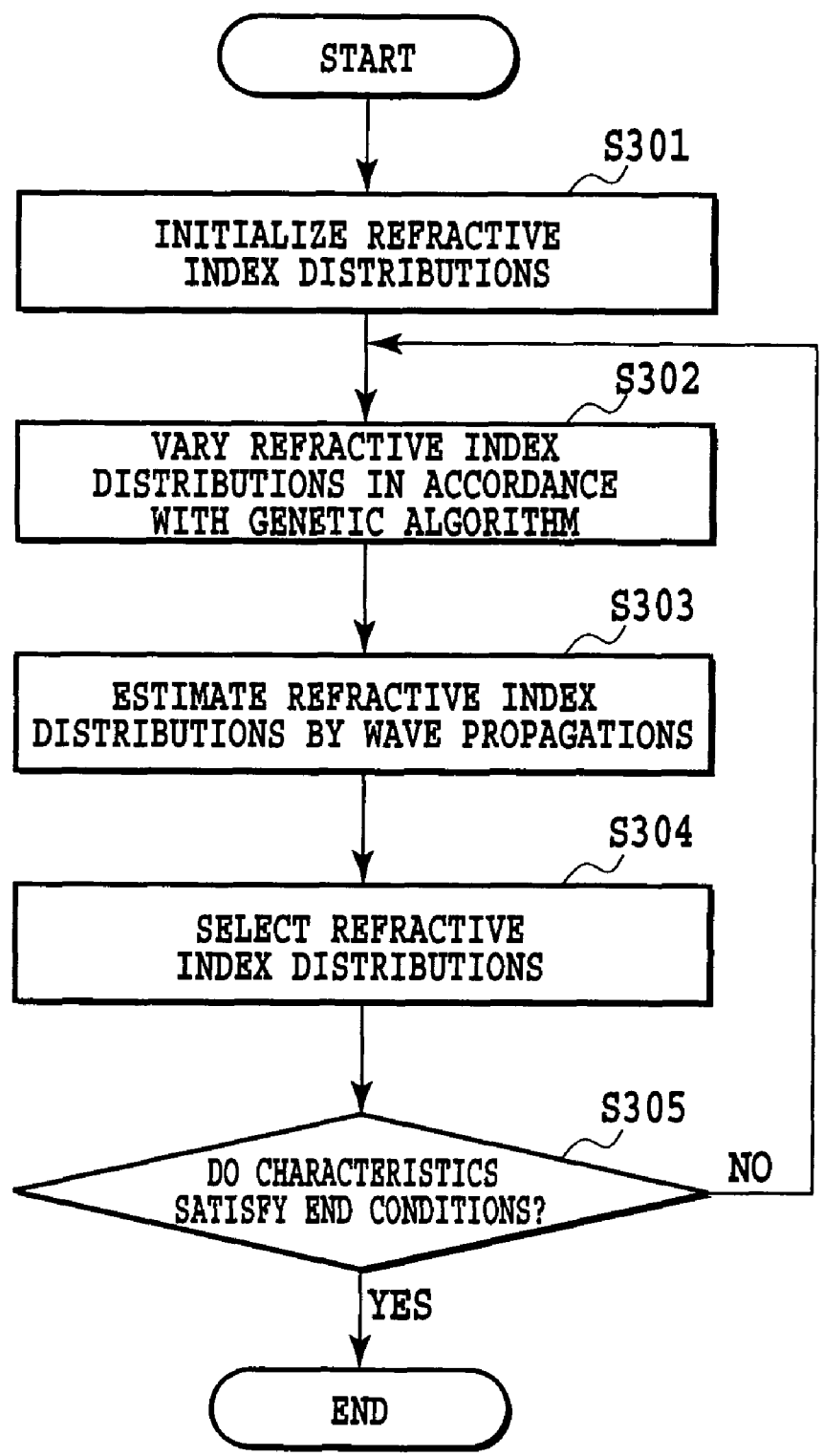
FIG. 43 is a chart showing the algorithm of a prior-art method of designing a wave propagation circuit.

FIG. 39 shows the characteristic of a wave propagation circuit which was optimized by the design method for the wave propagation circuit in the thirteenth embodiment of the invention as shown in FIG. 35. FIG. 39 has been obtained by measuring a loss in such a way that two pairs of waveguide lenses as shown in FIG. 38 were employed and that they were opposed with a spacing of 200 μm through an optical slab waveguide. It is seen that the favorable characteristic has been attained over a wide wavelength region.

The invention claimed is:

1. A planar lightwave circuit having a core and a clad which are formed on a substrate, comprising: at least one input optical waveguide which inputs signal light; mode coupling means for coupling a fundamental mode which is part of the inputted signal light, to at least either of a higher-order mode and a radiation mode, or mode re-coupling means for re-coupling at least either of the higher-order mode and the radiation mode to the fundamental mode; and at least one output optical waveguide which outputs signal light; said mode coupling means or said mode re-coupling means being an optical waveguide which has at least one of a core width and height varied irregularly continuously.

2. A planar lightwave circuit as defined in claim 1, wherein the variation of at least one of the core width and height of the optical waveguide is within ±8 μm per unit length (1 μm) in a propagation direction of the signal light.

3. A planar lightwave circuit as defined in claim 1, wherein said mode coupling means or said mode re-coupling means is an optical waveguide which has at least one of the core width and height made zero partly.

4. A planar lightwave circuit as defined in claim 2, wherein said mode coupling means or said mode re-coupling means is an optical waveguide which has at least one of the core width and height made zero partly.

5. A planar lightwave circuit as defined in claim 1, wherein at least one of said mode coupling means and said mode re-coupling means includes at least one insular core portion which is spaced from the core of said optical waveguide.

6. A planar lightwave circuit as defined in claim 2, wherein at least one of said mode coupling means and said mode re-coupling means includes at least one insular core portion which is spaced from the core of said optical waveguide.

7. A planar lightwave circuit as defined in any of claims 1, wherein at least one of said mode coupling means and said mode re-coupling means includes at least one insular clad portion having a refractive index equal to that of the clad, within the core of the optical waveguide.

8. A planar lightwave circuit as defined in any of claims 2, wherein at least one of said mode coupling means and said mode re-coupling means includes at least one insular clad portion having a refractive index equal to that of the clad, within the core of the optical waveguide.

9. A planar lightwave circuit comprising an optical waveguide lens which has a core and a clad formed on a substrate, wherein the optical waveguide lens comprises: at least one input optical waveguide which inputs signal light; mode coupling means for coupling part of the inputted signal light to a higher-order mode and a radiation mode; mode re-coupling means for re-coupling the signal light coupled to the higher-order mode and the radiation mode by said mode coupling means, to output signal light; and at least one output optical waveguide for outputting the output signal light; said mode coupling means and said mode re-coupling means being optical waveguides each of which has at least one of a core width and height varied irregularly continuously.

10. A planar lightwave circuit comprising a cross waveguide in which at least two optical waveguides having a core and a clad formed on a substrate cross, wherein the cross waveguide comprises:

at least two input optical waveguides which input signal light;

mode coupling means for coupling part of the inputted signal light to a higher-order mode and a radiation mode;

mode re-coupling means for re-coupling the signal light coupled to the higher-order mode and the radiation mode by said mode coupling means, to output signal light;

at least two output optical waveguides which output the output signal light, and an optical-waveguide crossing portion being a part at which two virtual optical waveguides rectilinearly extending from the input waveguides toward the output waveguides overlap;

said mode coupling means and said mode re-coupling means being optical waveguides each of which has a core width varied continuously;

said optical-waveguide crossing portion being such that a core width of an optical waveguide at a position between an end of said optical-waveguide crossing portion on a side of said input optical waveguides and a central part of said optical-waveguide crossing portion is greater than the core width of the optical waveguide at an end of said optical-waveguide crossing portion on the side of said input optical waveguides and the core width of the optical waveguide at the central part of said optical-waveguide crossing portion, and that the core width of the optical waveguide at a position between the central part of said optical-waveguide crossing portion and an end of said optical-waveguide crossing portion on a side of said output optical waveguides is greater than the core width of the optical waveguide at the central part of said optical-waveguide crossing portion and the core width of the optical waveguide at the end of said optical-waveguide crossing portion on the side of said output optical waveguides.

11. A planar lightwave circuit comprising an optical branch circuit which has a core and a clad formed on a substrate, wherein the optical branch circuit comprises: one input optical waveguide which inputs signal light; mode coupling means for coupling part of the inputted signal light to a higher-order mode and a radiation mode; mode re-coupling means for re-coupling the signal light coupled to the higher-order mode and the radiation mode by said mode coupling means, to output signal light; and at least two output optical waveguides which output the output signal light; said mode coupling means and said mode re-coupling means being optical waveguides each of which has a core width varied irregularly continuously.

12. A planar lightwave circuit comprising a slab type coupler which has a core and a clad formed on a substrate, wherein the slab type coupler comprises: at least one, first input/output optical waveguide which inputs/outputs a light signal; an optical slab waveguide which is optically connected to the first input optical waveguide; and at least two, second input/output optical waveguides which are optically connected to said optical slab waveguide, and which input/output light signals; and that said second input/output optical waveguides comprise mode coupling means for coupling part of the inputted/outputted signal light to at least either of a higher-order mode and a radiation mode, and converting the coupled part into a plane wave at an end of said optical slab waveguide; said mode coupling means being an optical waveguide which has a core width varied irregularly continuously.

13. A planar lightwave circuit comprising an arrayed waveguide grating filter which has a core and a clad formed on a substrate, wherein the arrayed waveguide grating filter comprises: at least one input optical waveguide which inputs signal light; a first optical slab waveguide which is optically connected with said input optical waveguide; arrayed optical waveguides which are optically connected with said first optical slab waveguide, and which become longer with a predetermined waveguide length difference in succession; a second optical slab waveguide which is optically connected to said arrayed optical waveguides; and at least one output optical waveguide which is optically connected to said second optical slab waveguide; and that each of said arrayed optical waveguides comprises: mode re-coupling means for re-coupling a higher-order mode and a radiation mode to the signal light, at a part optically touching said first optical slab waveguide; and mode coupling means for coupling the signal light to the higher-order mode and the radiation mode, at a part optically touching said second optical slab waveguide; said mode coupling means and said mode re-coupling means being optical waveguides each of which has a core width varied irregularly continuously.

* * * * *